March 21, 1944.  S. N. WIGHT ET AL  2,344,760
AIRPLANE DISPATCHING SYSTEM
Filed Aug. 11, 1942  18 Sheets-Sheet 1

INVENTORS
S.N.Wight and O.S.Field
BY
THEIR ATTORNEY

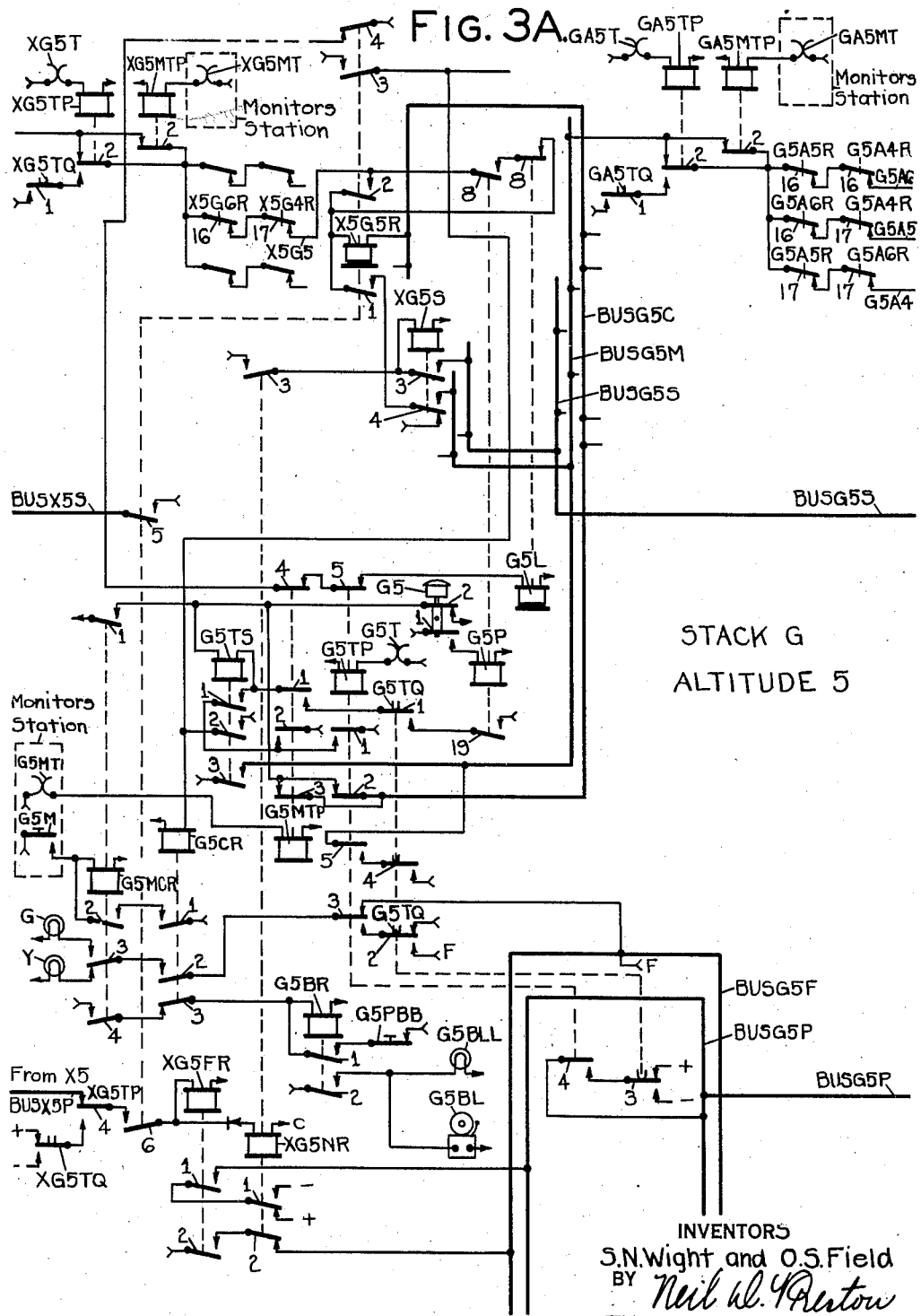

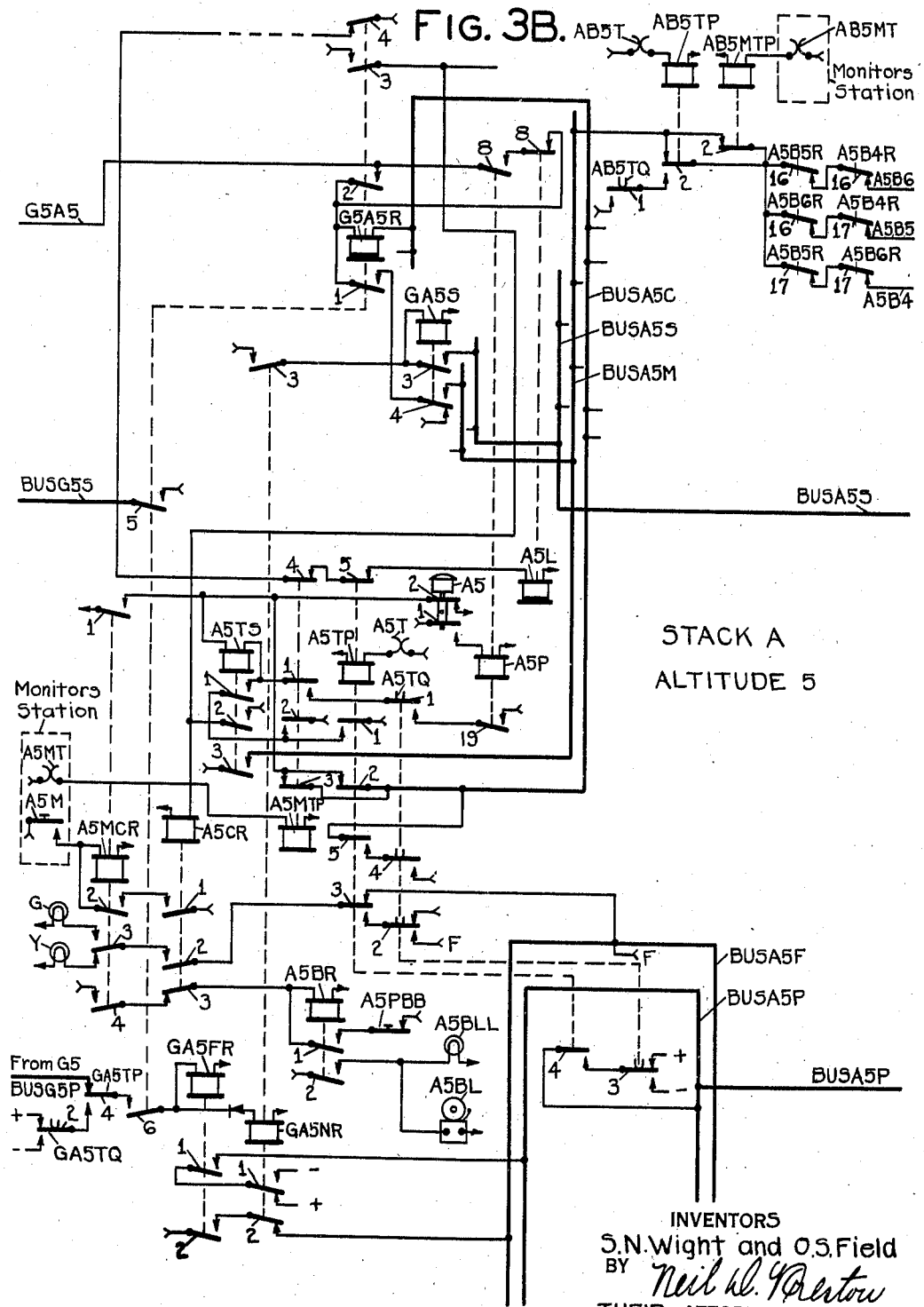

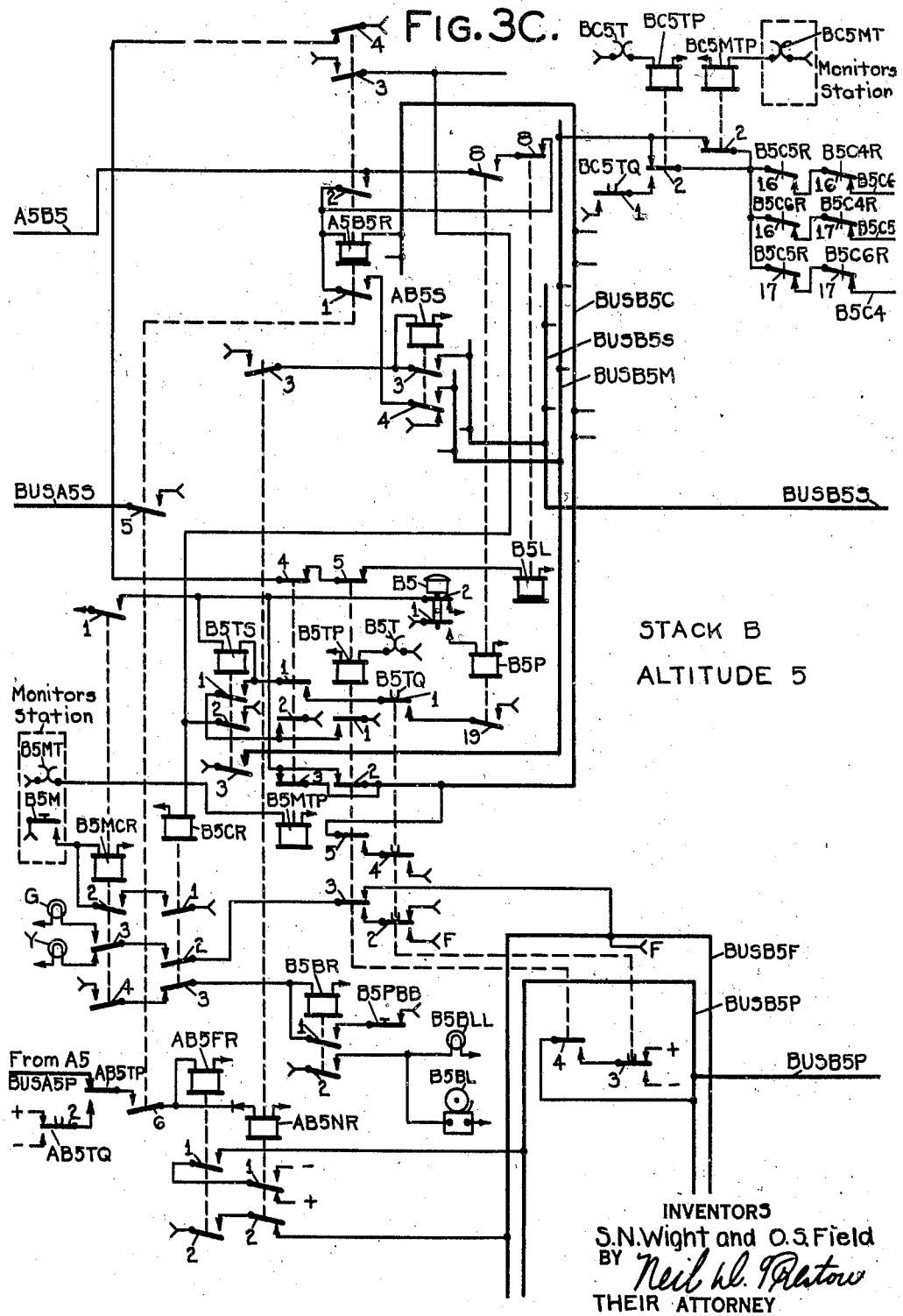

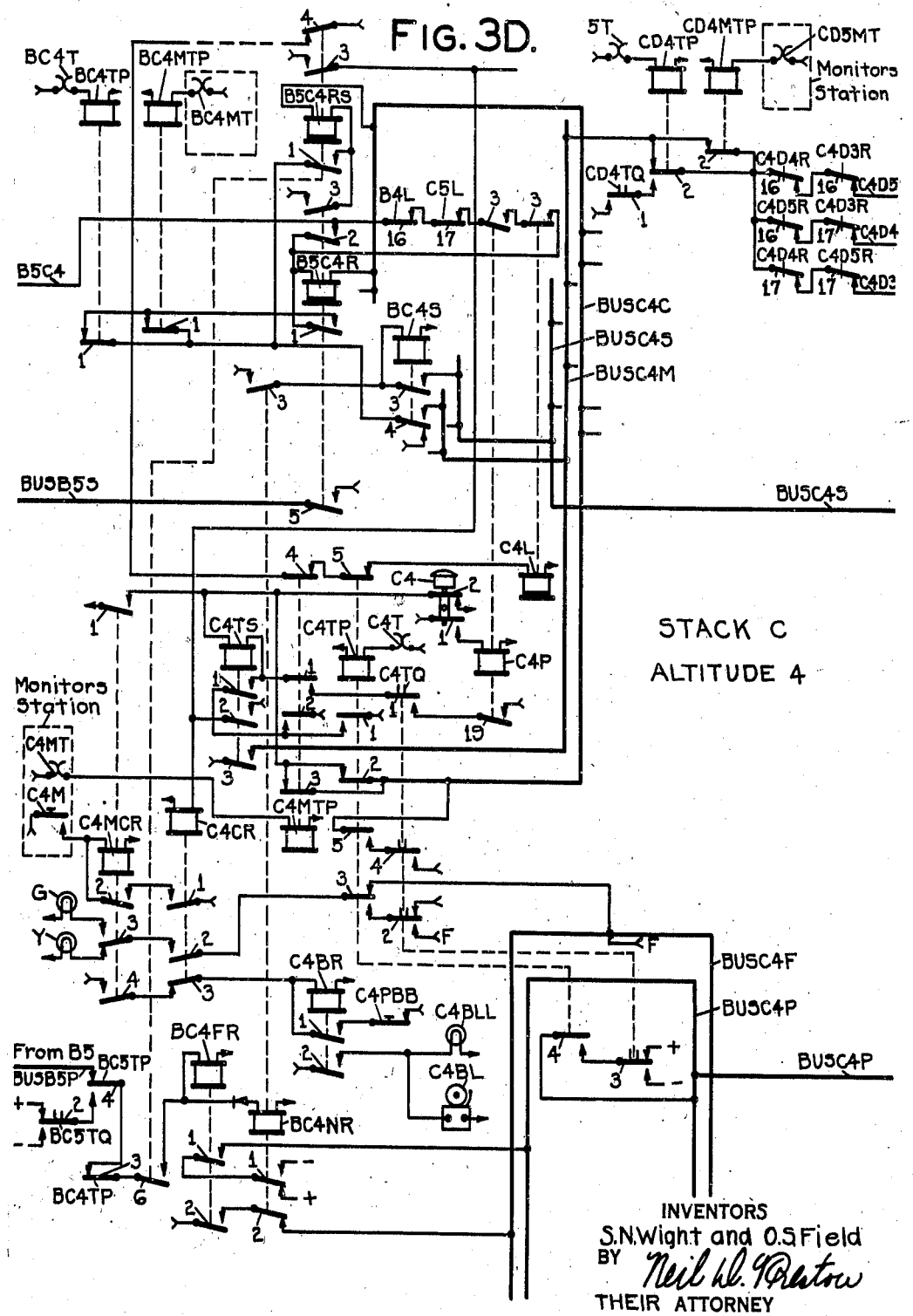

March 21, 1944.   S. N. WIGHT ET AL   2,344,760
AIRPLANE DISPATCHING SYSTEM
Filed Aug. 11, 1942   18 Sheets-Sheet 7

INVENTORS
S. N. Wight and O. S. Field
BY
THEIR ATTORNEY

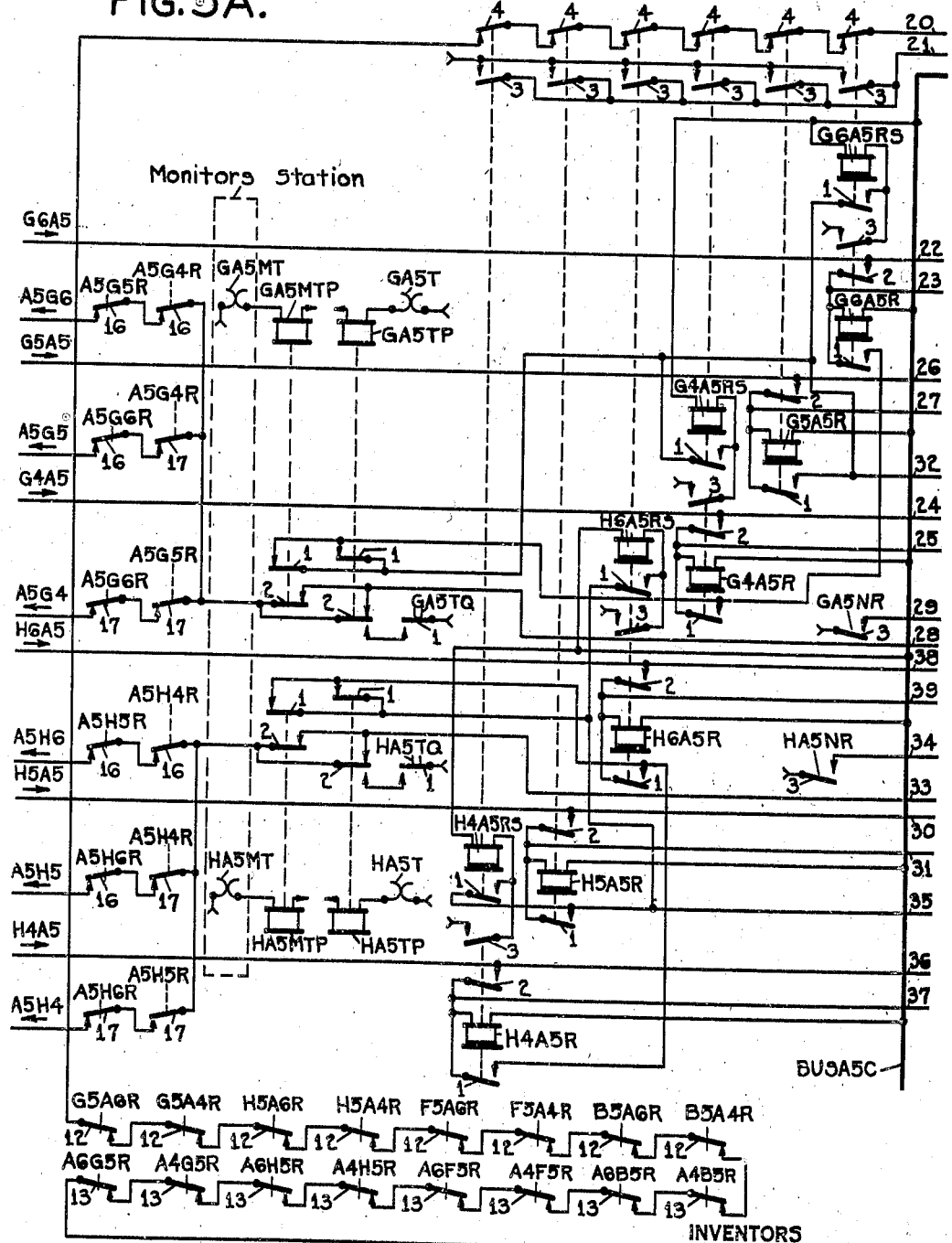

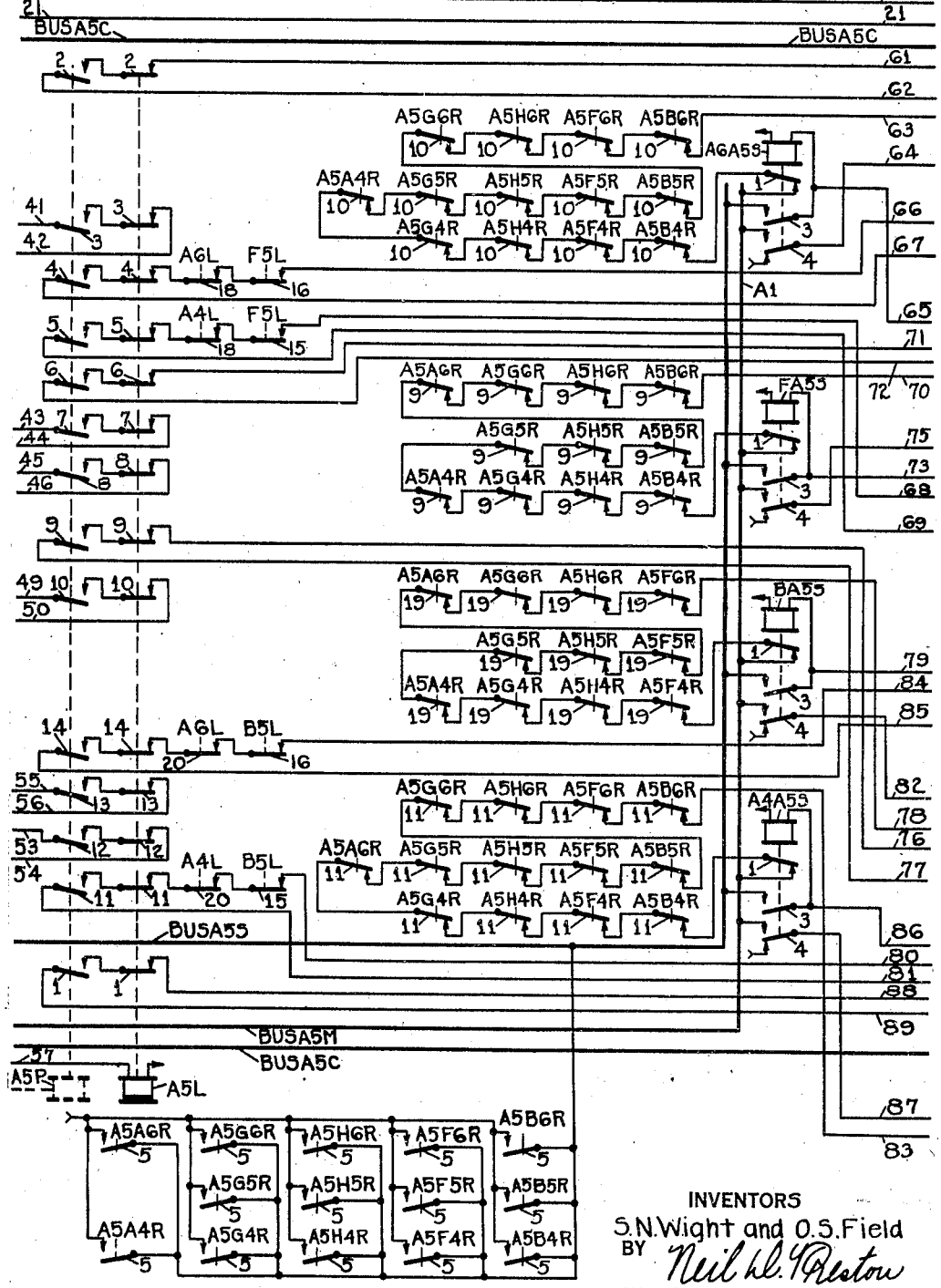

March 21, 1944. S. N. WIGHT ET AL 2,344,760
AIRPLANE DISPATCHING SYSTEM
Filed Aug. 11, 1942 18 Sheets-Sheet 11

INVENTORS
S. N. Wight and O. S. Field
BY Neil W. Preston
THEIR ATTORNEY

March 21, 1944.　　　S. N. WIGHT ET AL　　　2,344,760
AIRPLANE DISPATCHING SYSTEM
Filed Aug. 11, 1942　　　18 Sheets-Sheet 14
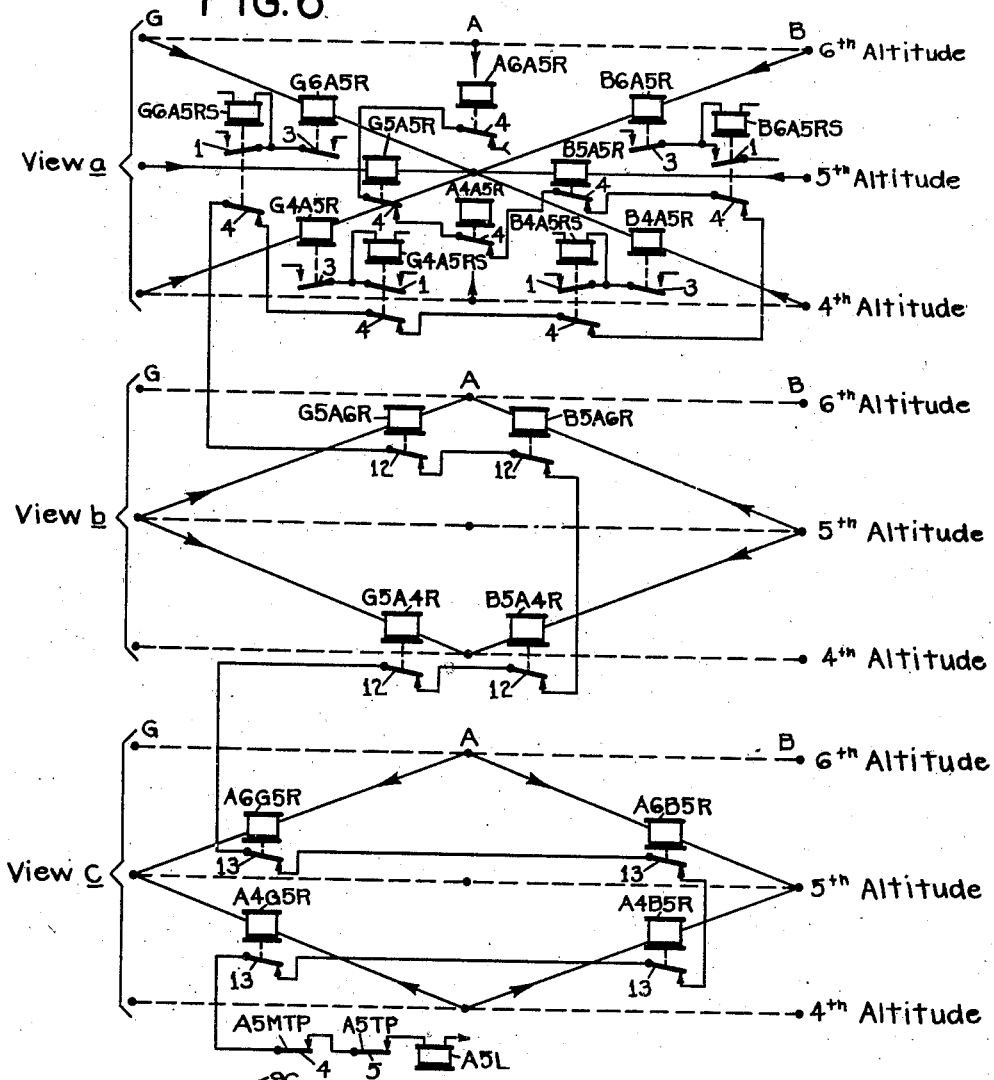
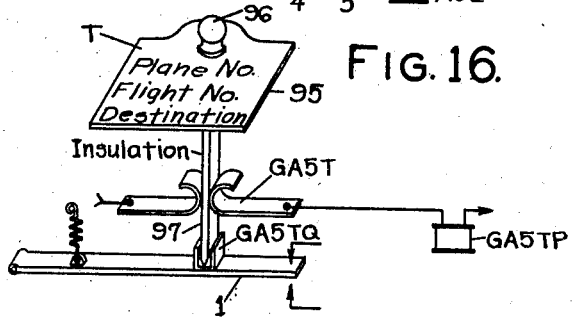
INVENTORS
S.N.Wight and O.S.Field
BY
THEIR ATTORNEY March 21, 1944.    S. N. WIGHT ET AL    2,344,760
AIRPLANE DISPATCHING SYSTEM
Filed Aug. 11, 1942    18 Sheets-Sheet 15
FIG. 7.
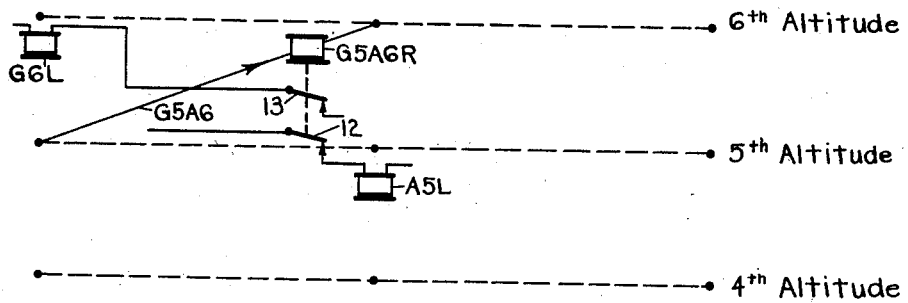
FIG. 8.
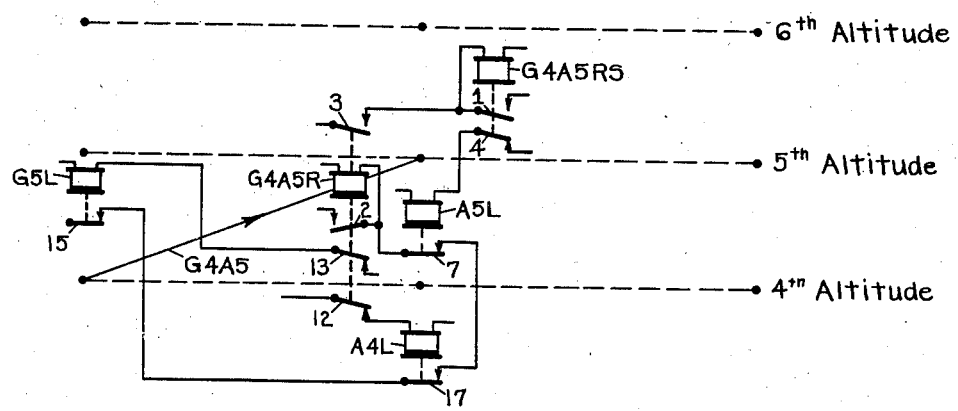
FIG. 9.
| Fig. 5A | Fig. 5B | Fig. 5C | Fig. 5D |
|---------|---------|---------|---------|
|         | Fig. 5E | Fig. 5F |         |
INVENTORS
S. N. Wight and O. S. Field
BY Neil W. Preston
THEIR ATTORNEY March 21, 1944.  S. N. WIGHT ET AL  2,344,760
AIRPLANE DISPATCHING SYSTEM
Filed Aug. 11, 1942    18 Sheets-Sheet 17

INVENTORS
S.N. Wight and O.S. Field
BY Neil W. Reston
THEIR ATTORNEY

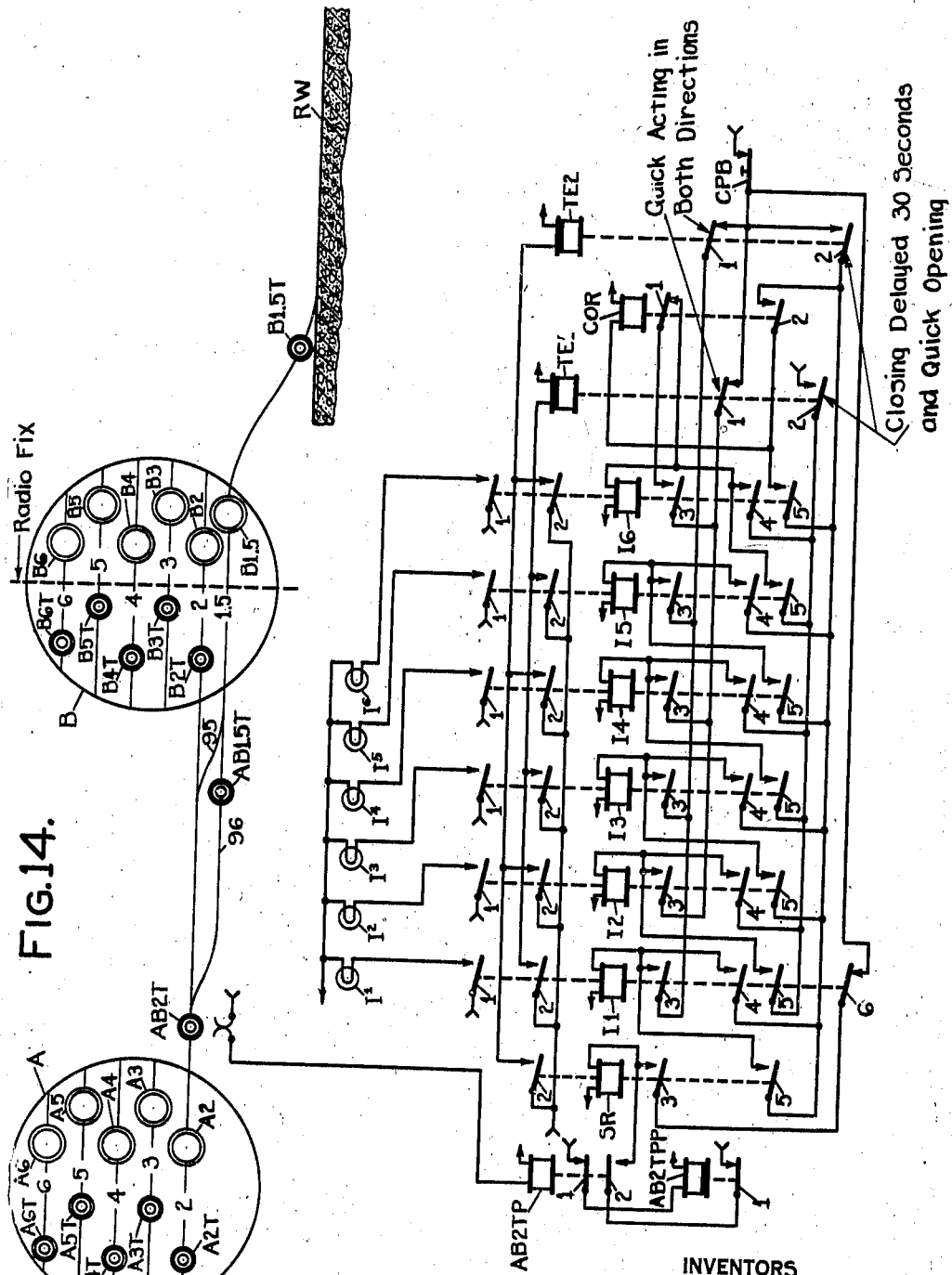

Patented Mar. 21, 1944

2,344,760

UNITED STATES PATENT OFFICE 2,344,760

AIRPLANE DISPATCHING SYSTEM

Sedgwick N. Wight and Oscar S. Field, Rochester, N. Y., assignors to General Railway Signal Company, Rochester, N. Y.

Application August 11, 1942, Serial No. 454,452

26 Claims. (Cl. 177—353)

The present invention relates to a system of airplane dispatching which may be applied to exterior airways (airway routes between cities) or to approach control (airway routes from point to point in congested areas adjacent a large airfield).

Airway plane dispatching may be likened to railway train dispatching, but the location of an an airplane in flight is not nearly as easily manifested in an office as is the location of a train on a railway which is track circuited, this handicap renders the problem of airplane dispatching much more difficult.

In the dispatching of airplanes the human element must be relied upon to a great extent in determining where an airplane is located, at what altitude and in what direction it is flying and the visibility to the pilot at the time of his report. In accordance with present practice a dispatcher radio-phones to the pilot of the plane instructing him as to the altitude that he shall fly and over what radio range and route. As a safeguard it is also the practice for the pilot to repeat back or answer back to the dispatcher the instructions given by the dispatcher. It is readily seen that these instructions can very easily be given wrongly and properly understood or be given correctly and differently understood to cause routes in conflict with each other to be assigned to different planes and pilots at same time. In this connection it may be stated that commercial airplanes fly over routes defined by overlapping radio beams called radio range legs or courses, each course consisting of two rather wide slightly overlapping radio beams on each of which is superimposed a telegraph code, the telegraph code on one beam in practice consisting of spaces each separated by a dash followed by a dot (N) and the other telegraph code consists of spaces separated by a code consisting of a dot followed by a dash (A). These two radio beams, of the same carrier frequency, have their superimposed codes so interrelated that the dots and dashes of one code fill the "off" periods of the other code, as a result of which if both beams are detected at slightly different strengths, called the twilight zone, both codes one louder than the other will be heard in the radio receiver. When the plane flies precisely over the radio range also known as the "on course" beam all these dots and dashes will be of the same intensity and in overlapped relation so that no dots or dashes will be discernible, this resulting in a continuous hum or mono-tone. It is this balance of intensity and continuous hum that advises the pilot that he is flying over the "on course" beam. In practice the pilot selects a course of travel to the right of this "on course" beam namely, a course over the right-hand twilight zone where both codes can be heard although one is louder than the other.

In accordance with the present invention it is proposed to employ a board or panel before the dispatcher in the dispatcher's office showing the various routes, each of which route is provided with lamps to indicate whether such route is available or whether such route has already been either tentatively or finally set up. By tentative is meant that the route has been set aside and locked against use by others but not yet verified or assigned to a pilot of a plane. These lamps are controlled in accordance with the present invention by push buttons and token contacts and through circuits and relays so interlocked that it is impossible to set up a second route in conflict with a route already either tentatively or finally set up. It is further proposed in accordance with the present invention to provide a monitor's office isolated from the dispatcher's office as to both visibility and audibility. It is proposed that this monitor's office be provided with tokens and token receptacles and push buttons in exactly the same way as the dispatcher is provided with such tokens, token receptacles, and push buttons, although in accordance with the first form of the invention it is proposed not to provide any indicating lights or lamps on the monitor's board.

It is further proposed to so construct and arrange and interlock the circuits that a route cannot be set up by the illumination of the route lamps in a particular manner to identify such route unless the monitor operates the push buttons of his board in response to the repeat-back or answer-back information given by the pilot on the plane and then only if the repeat-back instructions given by the pilot and heard by the monitor and translated by him into push button operations are in conformity with the operations of push buttons made on a dispatcher's board when instructions were originally issued by the dispatcher to such pilot. It should be understood that the monitor cannot hear the instructions issued by the dispatcher to the pilot. In other words, it is proposed to check the actions of the dispatcher and the repeat-back information given by the pilot by a third person (the monitor) who is ignorant of the instructions given by the dispatcher to the pilot and who is also ignorant of the actions by the dispatcher in depressing his push buttons on the board when these instructions were originally issued by the dispatcher to the pilot on the airplane.

Other objects, purposes and characteristic features of the invention reside in the provision of radio-phone apparatus whereby the dispatcher may transmit information to the pilot without directly transmitting this information to the monitor, together with the provision of means including a radio telephone whereby the pilot on the airplane may repeat back instructions not only to the dispatcher who gave such instructions to him but also to the monitor, who up to this time has been ignorant of these instructions. This monitor is expected to translate these repeat-back instructions into manual manipulations of push buttons, and in case of cancellation of a route into the movement of tokens defining airplanes from place to place. This movement of a token from one receptacle to another receptacle defines the location and progress of a plane over the airplane route.

Another object of the present invention resides in the provision of means for cancelling a portion of an established route on the dispatcher's board only if the report from the pilot that he has passed over this portion of the route has been heard by both the dispatcher and the monitor and has by each of them been translated into token movements reflecting such progress of the plane.

It is further proposed, since a large number of indicating lamps defining various routes may be illuminated at the same time, to provide means whereby depression of a token in its receptacle will cause all of the lamps associated with the route over which a particular plane is to fly, defined by this token, to flash. This flashing of the lamps of a route is to be accomplished by the depression of such token.

It is further proposed to provide a series of lamps for the airfield on the panel together with means for successively illuminating these lamps to indicate the approximate location of a plane flying toward such airfield and to cause such series of lamps to start their successive illumination in response to the insertion of a token in a token receptacle by the dispatcher in response to a pilot's report that he is proceeding toward the airfield following instructions by the dispatcher that he is to proceed toward making a landing.

In accordance with a modified form of the present invention it is proposed to require the dispatcher to successively depress push buttons defining a particular route in order to ascertain whether this route is available and to again successively depress these same push buttons after he has instructed the pilot that this particular route has been set aside for his use and after the pilot has repeated these instructions back to him, this route however not being fully set up on the board until the monitor has depressed corresponding push buttons on his monitor's board in accordance with repeat-back instructions heard by the monitor defining this same route.

In accordance with another modification of this invention it is proposed to also provide indicating lamps on the monitor's board which indicate the route to the monitor only after it has been completely set up, so that the monitor is not given any information on his board until he has verified by push button manipulation the answer back of the pilot's instructions which are repeated back by the pilot to both the dispatcher and the monitor.

In another modified form of the present invention a much more restricted form of interlocking is employed.

Other objects, purposes and characteristic features of the present invention will be in part described in detail in the following specification and will in part be obvious from the accompanying drawings in which:

Fig. 1 illustrates conventionally the dispatcher's office and the monitor's office illustrating their control panels, the radio receiver in the monitor's office, the radio transmitter and radio receiver in the dispatcher's office, and the radio transmitter and radio receiver on the airplane;

Fig. 2 illustrates a control board showing a group of so-called stacks which may be defined in space by crossing radio beams and each of which is capable of storing an airplane at each of numerous altitudes determined by altimeters say from the 2000 foot altitude up, adjacent altitudes being spaced safe distances apart preferably 1000 feet apart, of which only the altitudes of 2000, 3000, 4000, 5000 and 6000 feet have been illustrated and for a certain stack a 1500 foot altitude is also indicated.

Fig. 3A, Fig. 3B, Fig. 3C and Fig. 3D, when laid side by side illustrate the most essential apparatus for the 5000 foot altitude of each of stacks G, A and B and of the 4000 foot altitude of stack C;

Fig. 4 illustrates the stacks G, H, A, B and F in a different conventional manner and also illustrates all the airplane routes which enter and leave the 5000 foot altitude in stack A from or to these adjacent stacks and also to or from the adjacent altitude of the same stack;

Figs. 5A to 5F, inclusive, when pasted together as indicated in Fig. 9, and constituting Fig. 5 of the drawings, show the interlocking circuits and apparatus associated with the 5000 foot altitude of stack A and which is typical of the interlocked circuits and apparatus for each of the altitudes of stack A and of each of the altitudes of the other stacks employed, so that if this Fig. 5 is reproduced photostatically and the reference characters changed to correspond to the stack and altitude in which each is used and these Figs. 5 are then laid side by side and above each other and with the outgoing and incoming wires connected together, as will be evident from the appended reference characters applied thereto, the entire system of wiring may be built up by the use of twenty-eight such photostats;

Fig. 6 illustrates the energizing circuit for the lock relay A5L to graphically tie up each contact therein with a particular route and route relay;

Fig. 7 illustrates how back contacts of a single route relay control the energizing circuits of two lock relays;

Fig. 8 illustrates how a single route relay controls the energizing circuits of three lock relays and how this same route relay is controlled by each of these lock relays;

Fig. 9 shows how the sheets of Fig. 5 should be arranged side by side and above each other;

Fig. 14 illustrates the apparatus for successively illuminating timing lamps to show the progress of a plane;

Fig. 16 illustrates how a token cooperates with a token receptacle and a token mechanism.

Figure 1:
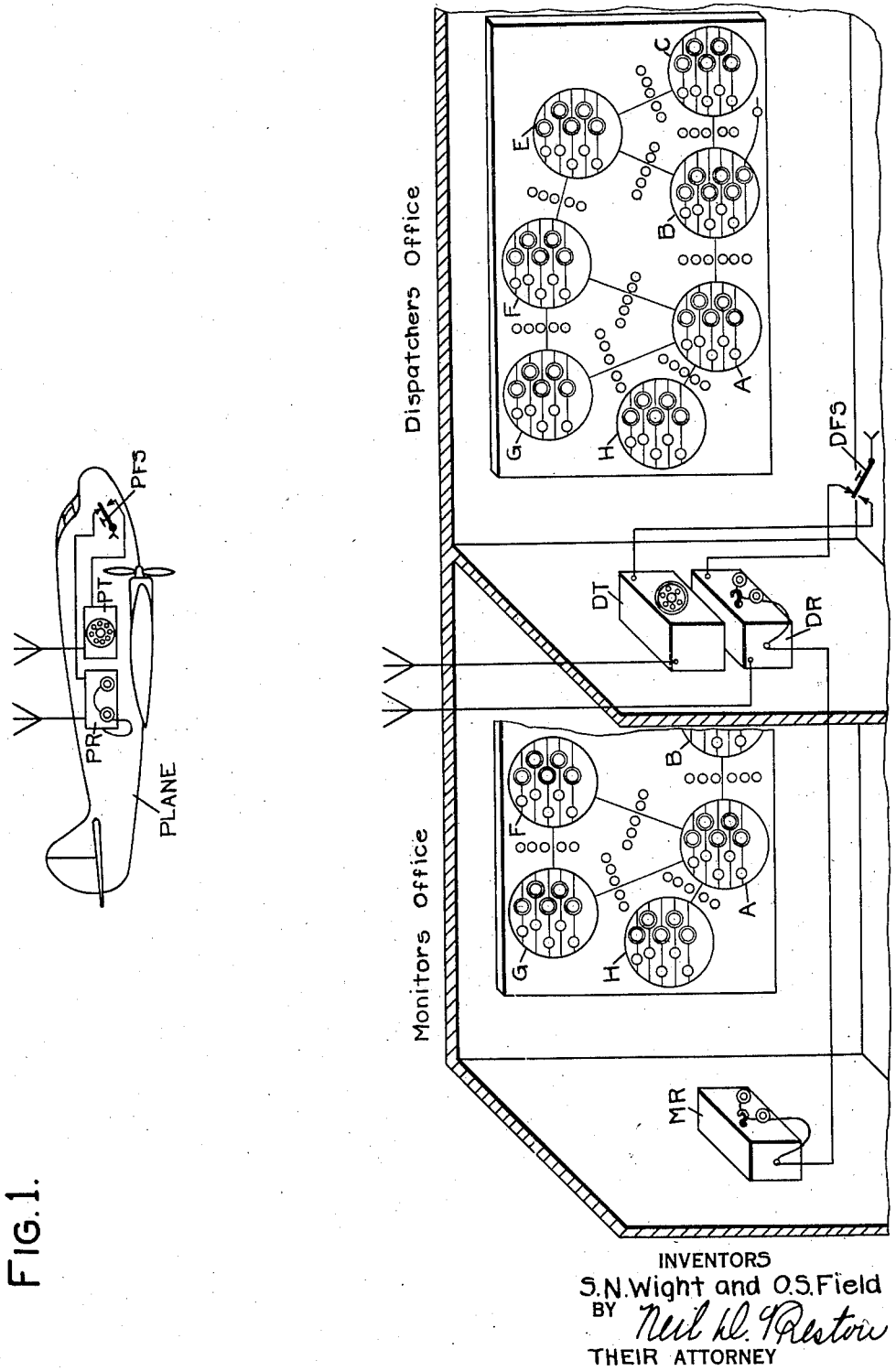

*System in general.*—Generally it is proposed in the system disclosed to have a route from each altitude in each stack to the same altitude of each adjacent stack and to the altitudes just above and just below this same altitude in the adjacent stack and to adjacent altitudes of the same stack. Each of these routes are preferably provided with a route relay (such as relay G5A5R, see Figs. 3B and 5A) at the exit end stack-altitude of the route. Obviously, the system can be extended to provide for routes extending to other altitudes. It is proposed to employ a lock relay (such as lock relay A5L, see Figs. 3B and 5B), which among other things, includes in its energizing circuit a back contact of the route relay, or a repeater thereof, of each entering route to that stack-altitude, this lock relay being sufficiently slow dropping to allow a route relay to be picked up through a front contact of such lock relay before the route relay picked up causes the lock relay to assume its deenergized position by the opening of a back contact of such route relay or its repeater. It is further proposed to employ a so-called transfer stick relay for each group of route relays of entering routes from the same adjacent stack which enter at a particular altitude (see stick relay GA5S, Fig. 5B for entering route relays G6A5R, G5A5R and G4A5R, Fig. 5A). This transfer stick relay is used to supply energy from the rear to a bus in advance, such as bus BUSA5M (Figs. 3B and 5), so as to feed energy to routes radiating in each direction from that altitude in that stack to the same altitude and adjacent altitudes of all adjacent stacks and to adjacent altitudes of the same stack. This bus conveniently called a "main bus" is employed to permit the route to be extended to an adjacent stack to an adjacent altitude of the same stack. This transfer stick relay upon picking up also disconnects at its back contact 1 (see back contact 1 of relay GA5S) all of the routes radiating back to the stack from which a route was set up toward the stack under consideration (see routes A5G6, A5G5, and A5G4 for transfer stick relay GA5S, Figs. 5A and 5B which are cut off by back contact 1 of stick relay GA5S). It is further proposed to provide a "stick bus" from which each transfer stick relay, such as stick relay GA5S, receives its stick energy through a front contact of the route relay of the next adjacent stack to which the route is extended (see contact 5 of route relay A5B5R, Figs. 3C and 5C for supplying energy to stick bus BUSA5S for instance). One stick relay only is energized at one time from this stick bus when the route in question has been extended beyond the stack and altitude under consideration. Since each of the route relays, such as route relay G5A5R, is provided with a stick circuit which is connected to a source of energy either through a back contact of the associated transfer stick relay, such as back contact 4 of transfer stick relay GA5S, or from this main bus through a front contact 4 of such stick relay, this main bus being energized through the back contact 4 of the next stick relay in advance, such as stick relay AB5S. It is thus seen that a route relay no longer depends for its energization upon current derived from the next station in the rear, as was earlier the case, except when a token in the rear is depressed. This enables the route relays to have their respective stick circuits broken by the opening of a token contact located in the outgoing route from that stack and which contact is opened only when the tokens, two in number, identifying the plane traveling over such route have been inserted in a receptacle identifying a check point in the route beyond the storage stack under consideration. It should be understood that the lock relay circuit includes many other contacts and that numerous other interlocking contacts are necessary to protect against the simultaneous establishment of two routes in conflict with each other than those contacts illustrated in Figs. 3A–3D of the drawings, these other contacts are however illustrated in Figs. 5A–5F. These interlocking features will be further evident from the reference characters assigned to relays and contacts as discussed hereinafter. Each of these plane identifying tokens T preferably consists of a small plate 95 provided with a holding knob 96 on the front face thereof and an insulating pin 97 projecting from the back side thereof as shown in Fig. 16. This front face has proper identifying data thereon, such as plane number, flight number and destination. A flight card bearing the same flight number may be employed to give more details, such as the make of the plane, the loading, the name of the pilot and the starting point of the plane.

*Structure of Fig. 1.*—Referring to Fig. 1 it should be understood that the monitor's office M although it is shown adjacent the dispatcher's office D is isolated from this dispatcher's office insofar as either visual or audible communication is concerned. Above these offices M and D has been illustrated an airplane PLANE which is provided with a pilot's radiophone transmitter PT and a pilot's radiophone receiver PR, both of these instrumentalities preferably employing the same carrier frequency and receiving energy from the same source through the foot switch PFS. Since both of these instrumentalities employ the same carrier frequency it is necessary to employ this pilot's switch PFS, which must be depressed by the pilot each time he speaks into his transformer PT, this in order to connect the transmitter to the source of energy to render it active and which switch at the same time disconnects such source of energy from the pilot's radiophone receiver PR. Other forms of interlocking between the transmitter and receiver may obviously be used.

Figure 2:
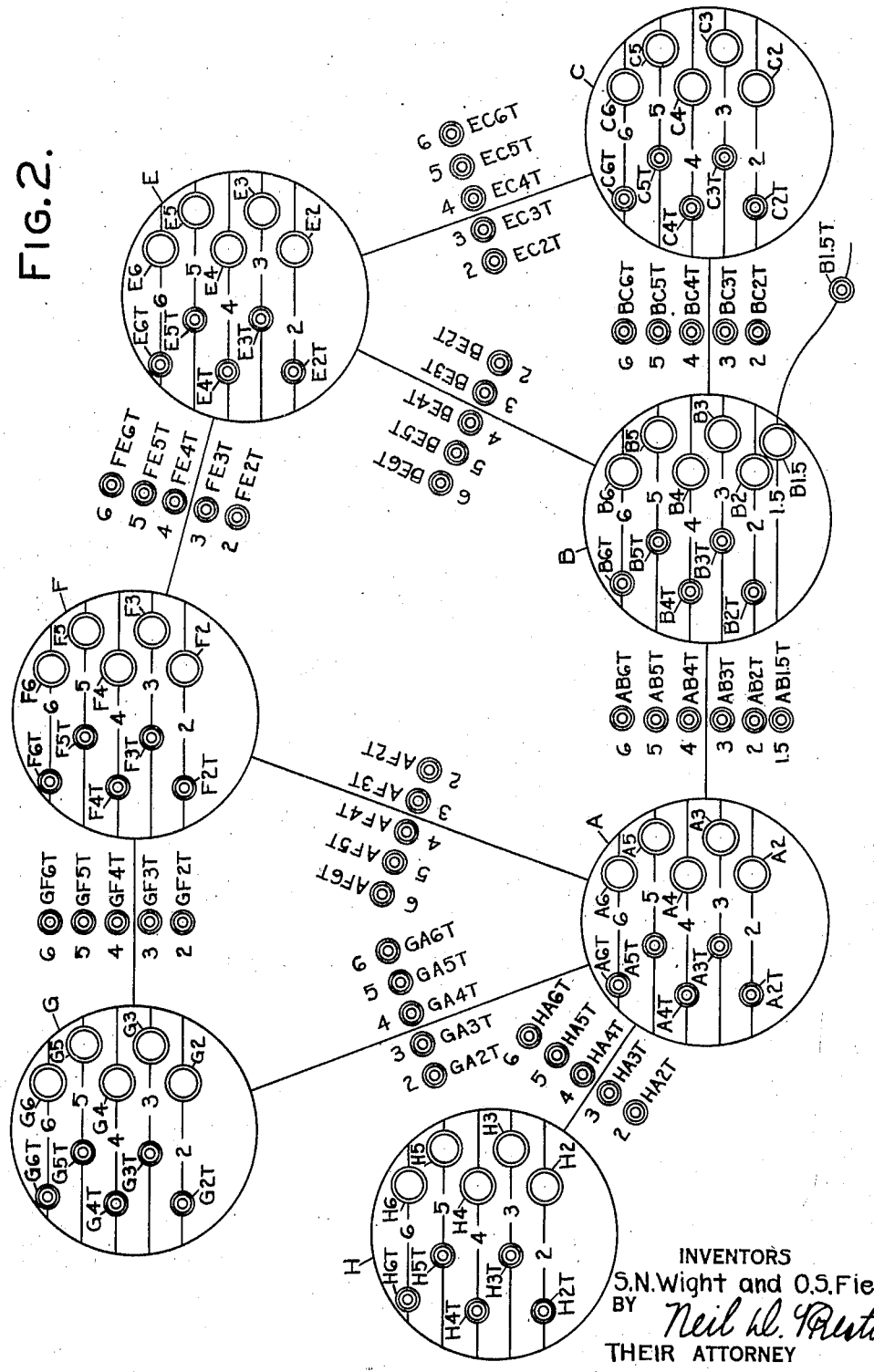

Supported vertically in each the monitor's office and the dispatcher's office are a map-like control board or panel which in appearance are identical and which are shown on a larger scale in Fig. 2 of the drawings. In addition the dispatcher's office is provided with a dispatcher's radiophone transmitter DT and a dispatcher's radiophone receiver DR. This transmitter and receiver in like manner, as in the airplane carried apparatus just described, is provided with a dispatcher's switch, such as the foot switch DFS which normally connects a source of current to the receiver and which if depressed disconnects the source from the receiver DR and connects it to the transmitter DT. As a result of this construction only the transmitter or receiver can be rendered active at one time. It will be observed that the monitor's receiver MR, preferably comprising a set of earphones only, is connected in multiple with the earphones of the dispatcher's receiver DR from which it is apparent that the monitor can only receive the speech that is received by the dispatcher but cannot receive the speech that is transmitted by the dispatcher and received by the pilot. In other words, the dispatcher and pilot are provided with two-way radio communicating apparatus whereas the monitor is only provided with receiving apparatus capable of receiving radio communication from the pilot of the airplane. It should be understood that other arrangements of communication may be employed so long as they provide two way communication between the dispatcher and the pilot and provide one way communication from the pilot to the monitor.

*Structure of Fig. 2.*—Fig. 2 illustrates on a panel by way of a map or control board the airplane stations or stacks G, H, A, F, B, E and C in a territory near an airfield (see Fig. 14). This control board is used for the purpose of guiding by radio beams an airplane from stack to stack until it reaches the airfield, these stacks being defined by radio range courses crossing each other, or other radio fixes or check points, these stacks being radio defined points adjacent which planes may be held or stored until instructions are given by the dispatcher that a plane may proceed to another stack either at the same or an adjacent altitude. Fig. 2 may be considered to be a map insofar as the circular stacks and the lines connecting them are concerned but the horizontal lines 2, 3, 4, 5 and 6 within each stack signify altitudes above each other and illustrate altitudes of 2000, 3000, 4000, 5000 and 6000 feet respectively within such stacks. For a better understanding of the nature of these stacks, constituting positions in space, attention is directed to Fig. 4. These stacks are of course more or less imaginary and define positions only and their locations are fixed by crossing radio range courses. Each of the altitude lines of the stack is provided with a token receptacle, such as token receptacle A5T of stack A, and is provided with a combined push button and lamp bull's-eye, such as the push button bull'e eye A5 of stack A (see also Figs. 3B and 5B). This token receptacle A5T and bull's-eye A5 for stack A signify that these devices refer to the 5000 foot altitude of this stack A whereas corresponding devices A3T and A3 signify that these latter devices are associated with the 3000 foot altitude of this stack A. The lines connecting the various stacks represent radio range courses connecting the stacks. For instance, the line HA signifies a course from stack H to stack A or from stack A to stack H. This course HA is provided with token receptacles HA3T, HA4T, HA5T, and HA6T which represent the four altitudes of 3000, 4000, 5000 and 6000 feet respectively, and if a token is present in one of these receptacles it signifies that a plane has progressed to or beyond the entrance into the course between stack H and stack A, at the altitude under consideration. The remaining altitudes, radio range courses, token receptacles, and push-button-bull's-eyes have been designated by similar reference characters which are distinctive by having their letters signify the stacks and token receptacles and their numbers signify the altitudes.

*Structure of Figs. 3 and 5*

*Main route network.*—In order to simplify the circuits illustrated in Figs. 3 and 5 the signs plus (+) and minus (—) have been employed to signify the terminals (+) and (—) of a source of current, whereas an arrow point with the letter "C" adjacent thereto signifies the midpoint of a battery or similar source of current, which midpoint or common return wire will return current of either (+) or (—) polarity to the battery or other source. In order to avoid confusion and save space the tail-end of an arrow has at times been illustrated to indicate one terminal of a suitable source of current the other terminal of which has been illustrated by the point of such arrow. Also, relays have been shown conventionally by a small rectangle and have each been designated by a reference character which has a definite relation to the function performed by that relay and each of the contacts of such relay has been separately designated by a numeral to signify the number of the contact for that particular relay.

Attention is directed to the fact that each of the relays NR, having a prefix to designate what stack and altitude it is associated with, has a rectifier shown in series therewith which signifies that this relay will pick up only when current of negative polarity is applied to the wire leading to such relay. These rectifiers have been conventionally shown by the point of an arrow in engagement with a short vertical line.

Certain of the contacts illustrated in Figs. 3 and 5 are engaged at the upper side thereof by a conventional showing representing a socket to receive the end of a token pin and hereinafter called a token mechanism (see, for example, contact XG5TQ in the upper left-hand corner of Fig. 3A and G5A5TQ of Fig. 16). It should be understood that the contacts of these token mechanisms normally assume their raised position and will assume their depressed position only so long as the token in the associated token receptacle is being manually depressed, this will become more apparent as the description of the system and its operation progresses. The token receptacles themselves have been shown conventionally by two curved spring fingers engaging each other (see for instance token receptacles G5T and G5A5T near the middle of Fig. 3A and in Fig. 16 of the drawings). These spring fingers normally engage each other and conduct current from one terminal of a source indicated by the tail-end of the arrow through the associated token repeating relay to the other terminal of said source conventionally indicated by the point of such arrow. These token receptacles (see Fig. 16) upon insertion of a token therein, preferably consisting of a round rod 97 of insulating material, will cause the energizing circuit for the associated token relay (such as relay GA5TP) to be broken and the relay to drop to its deenergized position. If this token T is specially depressed the token depression contact 1 of token mechanism GA5TQ located directly below the token receptacle GA5T will be shifted to open its front contact and close its back contact.

Figure 5B:
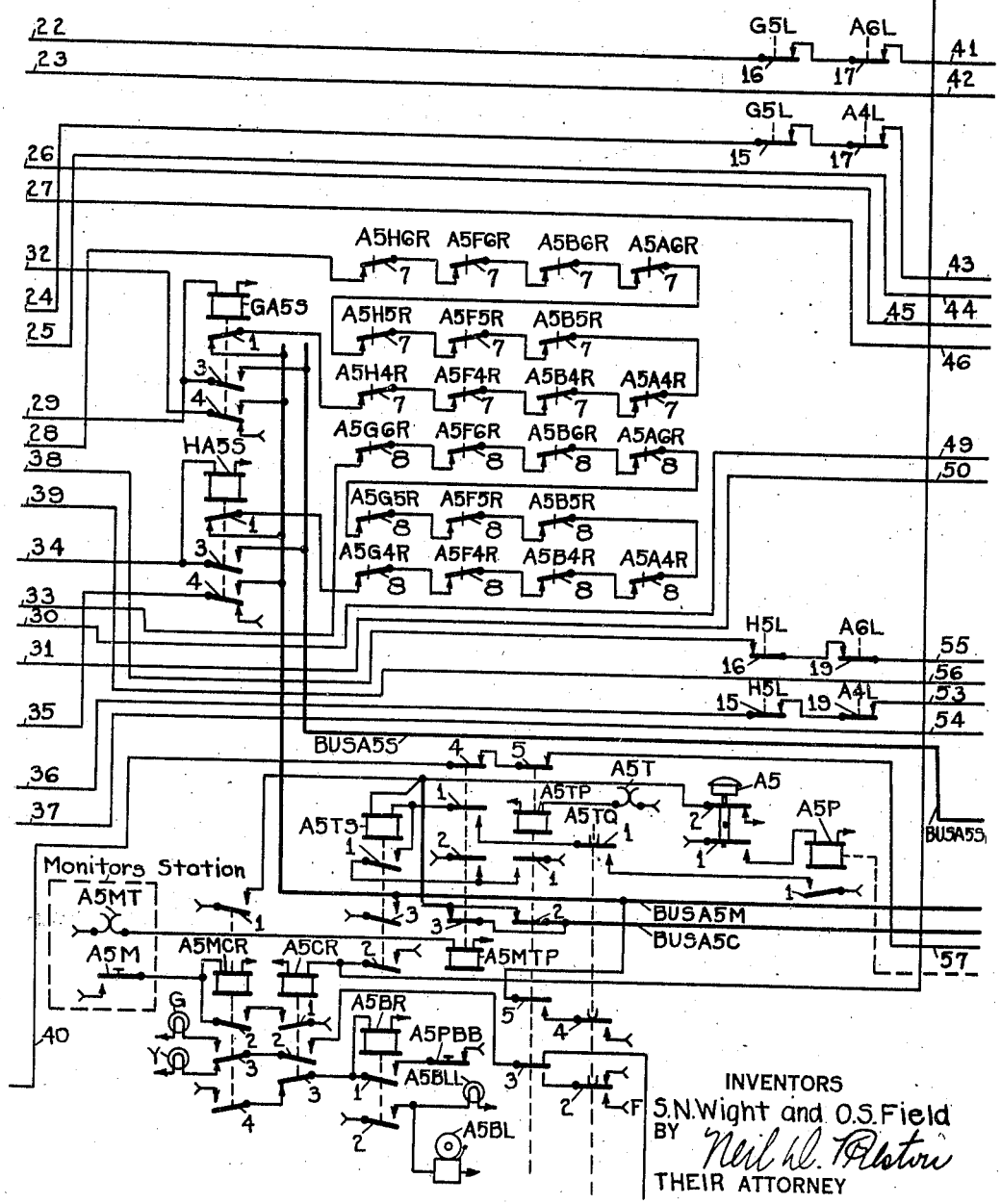

Each of the combined push-button-bull's-eyes (such as push-button-bull's-eye A5 of stack A see Figs. 3B and 5B) is shown in the drawings as a combined push-button and lamp receptacle (see push button A5 near the middle of Fig. 3B of the drawings) the dispatcher's lamps G and Y located in this combined push-button-bull's-eye A5 have been illustrated in the lower left-hand corner of Figs. 3B and 5B of the drawings.

Each altitude of each stack is provided with five buses, these buses for the 5000 foot altitude of stack A having been designated BUSA5M (signifying main bus), BUSA5C (signifying manual cancel bus), BUSA5S (signifying stick bus), BUSA5P (signifying polarity bus), and BUSA5F (signifying flashing bus). Like buses for other altitudes and other stacks have been similarly designated the fourth letter of each designation signifying the stack and the number signifying the altitude. Each of these buses constitute a common point into which any one of a large number of route circuits may enter or from which any one of a large number of route circuits and relays may be fed and controlled, respectively. These buses have been shown in each of Figs. 3A, 3B, 3C, 3D and 5A–5F.

Each altitude for each stack is provided with a large number of route relays the route relays for altitude 5000 for stack A, and illustrated in Figs. 5A–5F, being identified by the reference characters A6A5R, G6A5R, G5A5R, G4A5R, H6A5R, H5A5R, H4A5R, F6A5R, F5A5R, F4A5R, B6A5R, B5A5R, B4A5R and A4A5R. The route relay G5A5R only has been illustrated in Fig. 3B, which figure constitutes an abbreviated disclosure of altitude 5000 stack A, illustrated in Fig. 5 in detail, the altitude 5000 of each of stacks G and B and of altitude 4000 for stack C having been illustrated in abbreviated form in Figs. 3A, 3C and 3D, respectively. The complete wiring for altitude 5000 of stack A is shown in Figs. 5A–5F of the drawings. In this connection it may be pointed out that a large number of the interlocking contacts and all of the entering and leaving routes, except one, illustrated in Figs. 5A–5F, have been omitted from Fig. 3B of the drawings (Figs. 3A, 3C and 3D are similar to Fig. 3B except that Fig. 3D shows a 4000 foot altitude). Each altitude for each stack, as illustrated for altitude 5000 of stack A (see Figs. 3B and 5B) is provided with an entering or transfer stick relay for each adjacent stack and for each adjacent altitude of the same stack (see stick relay GA5S of Fig. 3B for stack G for instance). In other words, there are six such transfer stick relays for altitude 5000 of stack A and these have been designated GA5S, HA5S, FA5S, BA5S, A6A5S and A4A5S (see Figs. 5A–5D). The latter two of these transfer relays do not relate to adjacent stacks but to adjacent altitudes of the same stack. These relays are called "transfer relays" because the movable contact 4 transfers the route network from one source point to another. The route relays for the ascending and descending routes, such as route relays G6A5R and G4A5R (see Fig. 5A) are provided with individual repeater relays such as repeater relays G6A5RS and G4A5RS (see Fig. 5A). These repeater relays are provided to delay release of the lock relay circuit, that is delay reclosing thereof, at the altitude and stack at which the relay is located, whereas the associated route relay such as route relay G6A5R and G4A5R, for instance, is released earlier to release locking at an adjacent stack or an adjacent altitude of the same stack. In other words, although locking is imposed simultaneously at two different locations upon the picking up of a route relay which signifies a change of altitude, such as route relay G6A5R, the locking at these different locations is released at different times in order to facilitate the movement of airplane traffic. For instance back contact 4 of route repeater stick relay G6A5RS in the circuit of lock relay A5L (Fig. 5A), the back contact 13 of its associated route relay G6A5R in circuit of lock relay G5L (not shown but see contact 13 of route relay A6B5R in circuit of lock relay A5L) are closed simultaneously but are opened at different times. The relay G6A5R is dropped when tokens are inserted in token receptacles GA5T and GA5MT simultaneously (see contacts 1 of token repeater relays GA5TP and GA5MTP, Fig. 5A) whereas the repeater stick relay G6A5RS does not drop until tokens are inserted in an outgoing route circuit, such as when tokens are simultaneously inserted in the receptacles AB5T and AB5MT (see contacts 2 of token repeater relays AB5TP and AB5MTP, Figs. 3B and 5D). In other words, the lock relay at an adjacent stack is released earlier than the lock relay at the stack under consideration when an ascending or a descending route has been set up to such stack under consideration. Each token receptacle, such as the token receptacle GA5T (see Fig. 16 and top of Fig. 5A) is provided with a token repeater relay such as relay GA5TP.

Referring to the lower part of Fig. 5B it will be observed that the combined push button bull's-eye A5, also illustrated in Figs. 1, 2 and 3B, is provided with a push button repeater relay A5P which, among other things, has front contacts included in series with each of the route relays illustrated in Figs. 5A–5D inclusive.

The light control relay, such as relay A5CR (see lower part of Figs. 3B and 5B), is employed to, when in an energized position, illuminate one or the other of the lamps G or Y under the bull's-eye of the associated dispatcher's push button, such as bull's-eye A5, and may be picked up when any one of the route relays or an associated route repeater stick relay, such as repeater relay G6A5RS for route relay G6A5R of Fig. 5A, assumes an energized position.

The auxiliary relay A5TS (see lower part of Figs. 3B and 5B) is provided so that when the lamps G or Y within the push button A5 in stack A is extinguished, as by the insertion of a dispatcher's token and the monitor's token in the token receptacle A5T, resulting in the dropping of the route relay for a route entering that stack and altitude by the opening of front contacts 2 and 3 of token repeater relays A5TP and A5MTP included in the stick circuit for such route relay (see route relay G5A5R), and resulting in the dropping of lamp control relay A5CR, these lamps may again be lighted by energization of the relay A5TS and the closing of its front contact 3 included in an energizing circuit for control relay A5CR. This picking up of relay A5TS may be accomplished by depressing the push button A5, when the dispatcher's and monitor's tokens are in place in token receptacle A5T and A5MT, respectively, if the dispatcher's token is depressed to close back contact 1 of token mechanism A5TQ. This functioning of the apparatus will be more clearly pointed out hereinafter.

The monitor's lamp control relay, such as relay A5MCR (see Figs. 3B and 5B) is employed to determine whether the illuminated lamp on the dispatcher's board shall be a green lamp or a yellow lamp and this relay A5MCR may be picked up by the monitor depressing his monitor's push-button-bull's-eye A5M, which is located on the monitor's board at the corresponding location as where the push-button-bull's-eye A5 is located on the dispatcher's board. Neither of these lamps G or Y will however be energized unless the dispatcher has caused energization of the associated lamp control relay A5CR by extending a route to that stack and altitude.

The bell ringing relay, such as relay A5BR (see lower portion of Figs. 3B and 5B), is provided to sound a bell, such as bell A5BL, and illuminate the associated bell lamp A5BLL if the monitor's lamp control relay A5MCR is picked up before the dispatcher's indicating relay A5CR is picked up. If this bell relay A5BR is once energized it is stuck up through a stick circuit including the push button contact A5PBB, and the bell A5BL will ring and will not cease ringing and the lamp A5BLL will not be extinguished until the cancelling button A5PBB has been depressed. In practice only one bell relay and its associated bell and light may be used in common for all stacks and altitudes. This construction is employed in order to give a special indication or warning, and a penalty in the form of undesirable sounds and possibly a record to disclose carelessness, if the monitor has depressed a push button out of correspondence with action taken by the dispatcher. The sounding of this bell does not necessarily reflect carelessness of the monitor in that he may have been improperly informed by the pilot. In other words, if the pilot has misunderstood the dispatcher and has repeated back the misunderstood instruction or the monitor has incorrectly understood the pilot, either due to carelessness or otherwise, the monitor being ignorant of the original instruction, and the monitor will depress a push button different in its location on the monitor's board from the push button depressed by the dispatcher on the dispatcher's board this discrepancy will be manifested by the continued sounding of an alarm until manually cancelled. This bell and lamp is preferably located in the dispatcher's office and may be duplicated in the monitor's office or at any other point.

Figure 5D:
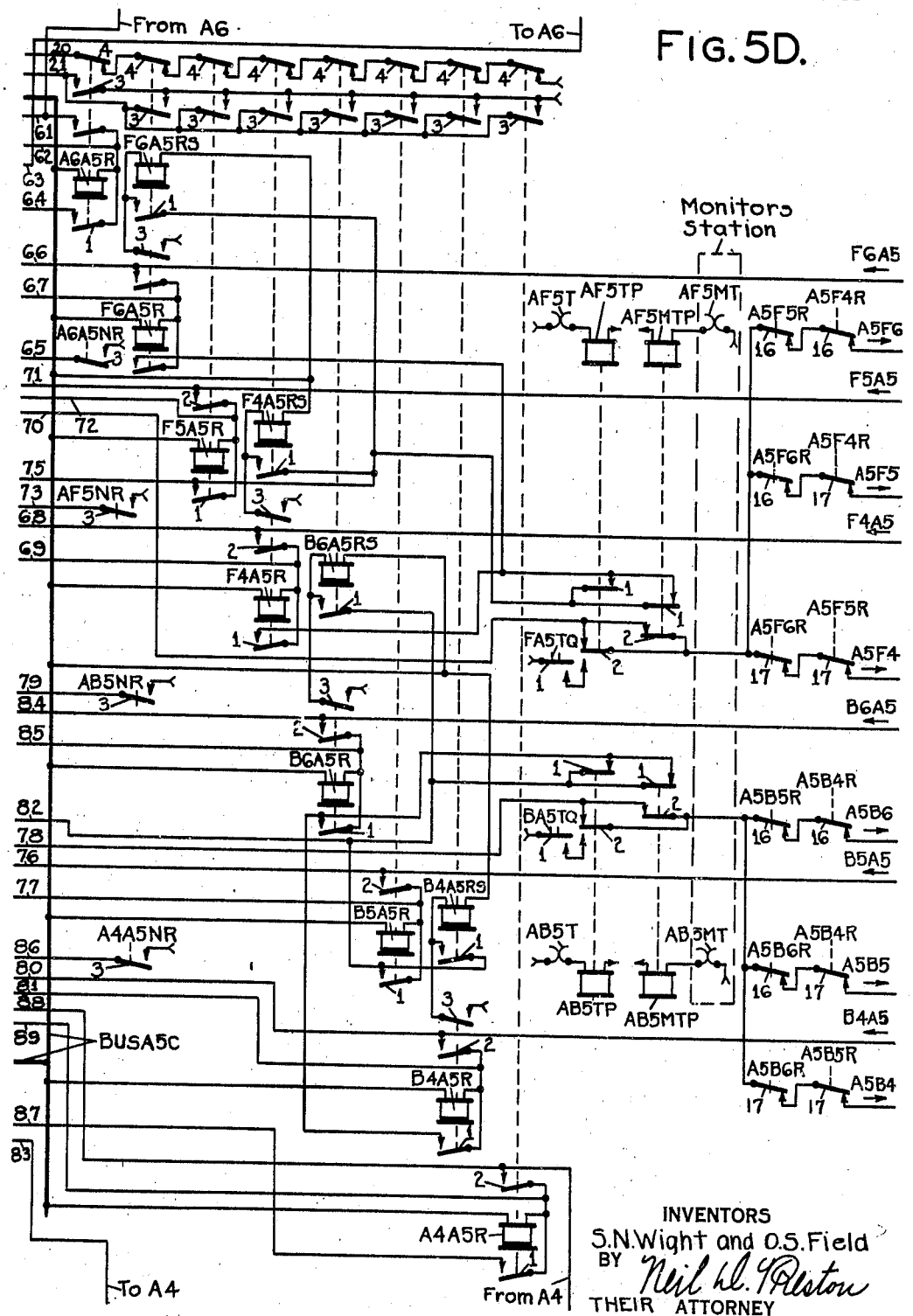
Figure 5E:
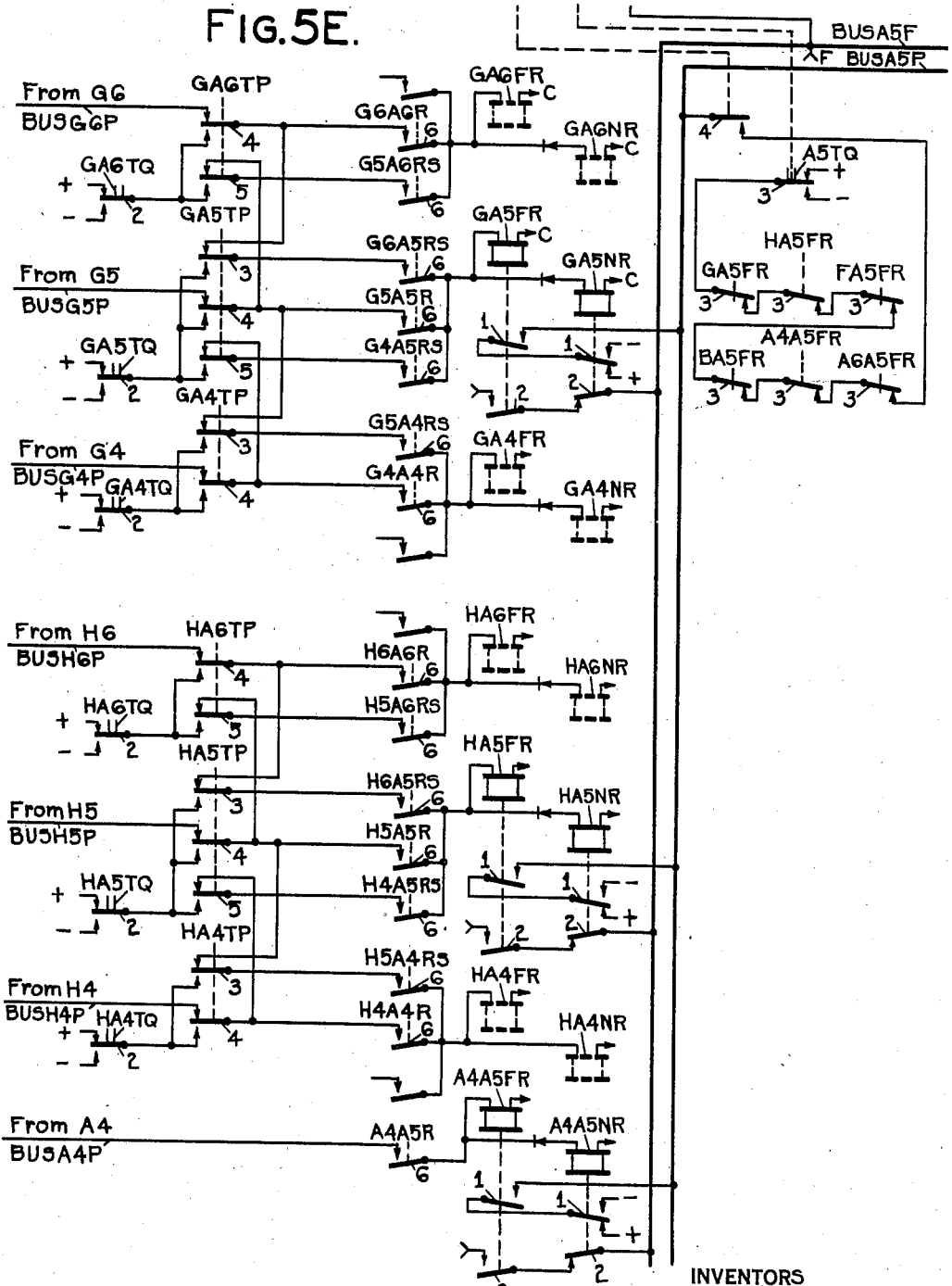
Figure 5F:
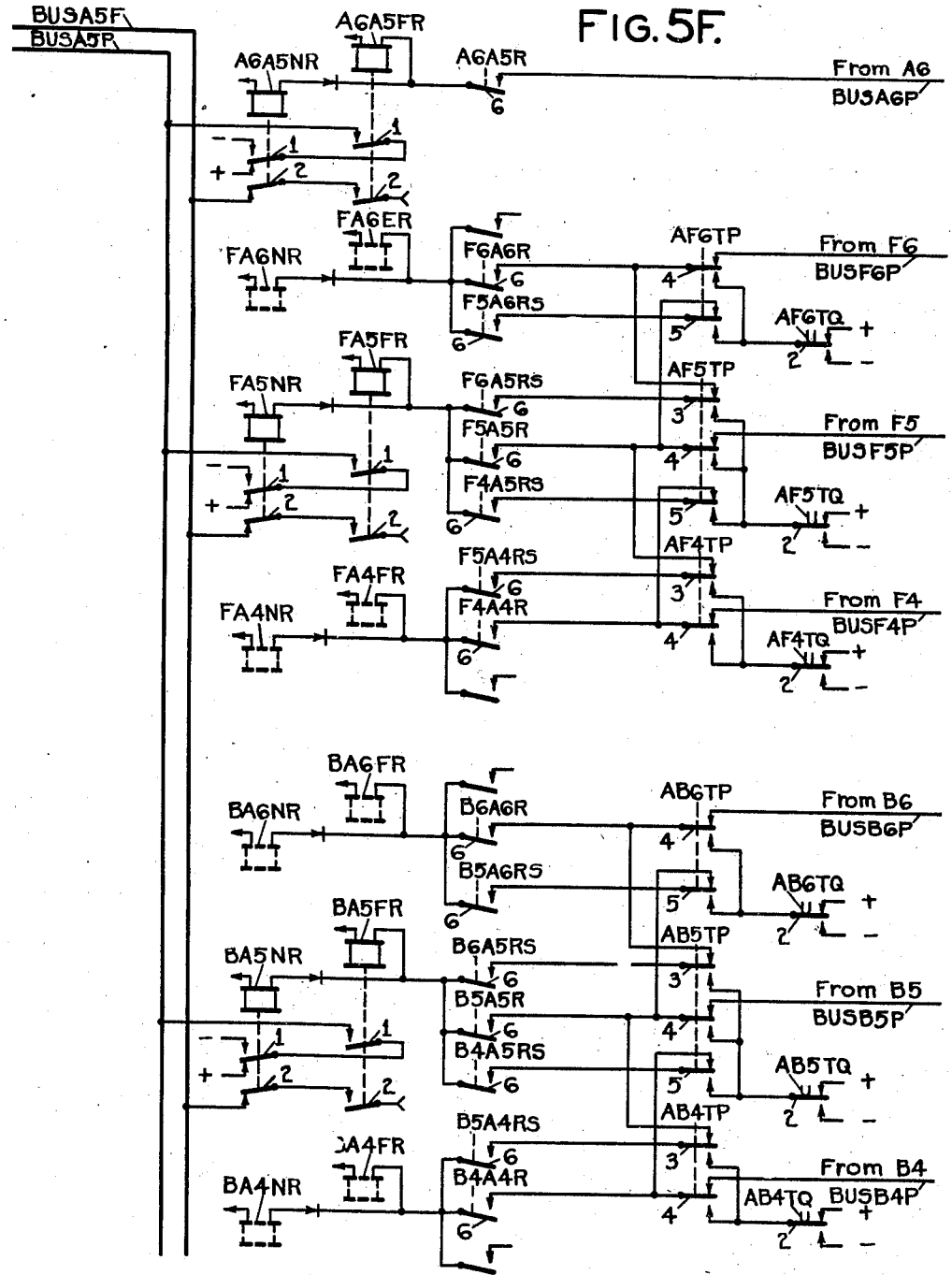

*Polarity bus network.*—Referring now to the lower part of Figs. 3A, 3B, 3C and 3D and to Figs. 5E and 5F of the drawings wherein the "polarity bus" and the "flashing bus" and their associated relays and contacts are illustrated, it will be seen that the 5000 foot altitude of stack A is provided with neutral polarity controlling relays GA5FR, HA5FR, FA5FR, BA5FR, A6A5FR and A4A5FR whereas of these relays only the relay GA5FR has been illustrated in Fig. 3B of the drawings. Similarly, Figs. 5E and 5F, illustrating the apparatus for the 5000 foot altitude of stack A, show minus (—) polarity responsive relays GA5NR, HA5NR, FA5NR, BA5NR, A6A5NR and A4A5NR whereas only the minus polarity responsive relay GA5NR has been illustrated in Fig. 3B of the drawings. Instead of using one neutral relay FR and one polarity responsive relay NR a single polar or polar-neutral relay obviously may be substituted. Referring to Fig. 5E and the lower part of Fig. 3B of the drawings it will be observed that if the relay GA5FR is energized the polarity bus BUSA5P is energized by current of positive polarity, whereas if both of the relays GA5FR and GA5NR assume their energized position this polarity bus BUSA5P is energized by current of negative polarity. Attention is also directed to the fact that the flashing bus BUSA5F (see Figs. 3B and 5F) is permanently connected to flashing energy as conventionally indicated by the tail-end of the arrow having the letter F adjacent thereto. In this connection it should be understood that a separate flashing contact is preferably employed for each stack-altitude and that if unflashed energy such as indicated by the tail-end of an arrow connected to the contact 2 of the relay GA5FR (see Figs. 3B and 5E) is applied to this bus BUSA5F this flashing contact is as a matter of fact bridged by the branch circuit including contacts 2 of relays GA5FR and GA5NR in series and no flashing results. This is because the energy is continuously applied to this bus BUSA5F.

*Characteristics of reference characters.*—An effort has been made to employ reference characters which are symbolic of their function and helpful in a written circuit disclosure (circuit diagram in which the contacts are not all directly associated with the relay of which they are a part). It should be noted that the reference characters for the lock relay for altitude 5000 stack A is A5L where "A" denotes the stack and "5" denotes the altitude and "L" indicates that it is a lock relay. The contacts of this lock relay may be divided into two groups; first, those included in pick-up circuits for route relays at the same altitude and stack, namely, contacts 1 to 14, inclusive, (see Fig. 5C) and second, those contacts included in pick-up circuits for route relays at adjacent stacks or at adjacent altitudes of the same stack, namely, contacts 15 to 20 inclusive (see Figs. 5B and 5C).

The reference character of a route defines from what altitude and stack to what altitude and stack the route extends. For instance, the reference character G6A5 (Fig. 5A) signifies that the route enters at stack G altitude 6000 and exits at stack A altitude 5000.

The first four characters of a route relay reference character defines the route and the last character "R" signifies that it is a relay. If a route relay is supplied with a repeater stick relay this repeater stick relay is assigned the same reference character with the letter "S" added.

The front contacts 3 of all route repeater stick relays, and of all route relays which are not supplied with a route repeater stick relay, are included in multiple to separately energize the dispatcher's lamp control relay, such as A5CR.

The back contacts 4 of all route relays, except those having repeater stick relays, and of all route repeater stick relays, are included in series in the circuit for the lock relay for the altitude and stack into which the routes extend (see Figs. 5A and 5D). The contact 3 of each route relay which has an associated repeater stick relay is included in the pick-up circuit of such repeater stick relay. The contact 5 of each route relay (see Fig. 5C) is included in a stick circuit for the transfer stick relay associated with the entrance end of the route circuit in the exit end of which route circuit such route relay is located.

The front contact 6 of each route relay (see Figs. 5E and 5F) is included in the energizing circuit of the associated polarity relay FR and NR.

The back contacts 7, 8, 9, 10, 16 and 17 of various route relays (see Figs. 5A–5D) at one stack and altitude are included in the pick-up circuits for route relays for routes extending from that altitude and stack to the same and adjacent altitudes of an adjacent stack whereas back contacts 10 and 11 of various route relays (see Fig. 5C) are included in pick-up circuits of route relays for routes extending from that altitude and stack to an adjacent altitude of the same stack.

The back contacts 12 of route relays (see Fig. 5A) for routes extending from the same altitude of an adjacent stack to the adjacent altitude of the same stack are included in the circuit of the lock relay for said same altitude and stack under consideration; whereas the contacts 13 of route relays (see Fig. 5A) of routes which extend from the adjacent altitude of the stack under consideration to the altitude under consideration of an adjacent stack are included in the circuit for the lock relay for the altitude and stack under consideration.

There is only one transfer stick relay, such as relay GA5S (see Fig. 5B), for each adjacent stack with respect to a particular altitude and stack for which reason the first and second letter of each reference character for such transfer stick relay signifies the adjacent stack and the stack under consideration, respectively, whereas the number signifies the altitude for the latter stack. Each of these transfer stick relays is provided with a contact 1 to open all route circuits extending to the adjacent stack characteristic of that transfer relay. These transfer stick relays are also provided with a contact 4 to determine if energy shall be fed to route wires in the rear or if energized route wires in the rear shall feed energy toward an exit end in advance.

The polarity relays, the reference characters of which end with the letters FR and NR (see Figs. 5E and 5F) respond to current of both and only one polarity respectively. Since there is only one such pair of relays for the same and adjacent altitudes for each adjacent stack the first and the second letter of the reference character denote the entrance and the exit stack respectively whereas the number denotes the altitude of the exit stack. The polarity relay FR is provided only with front contacts 1 and 2 of which front contact 1 when up closes a circuit extending to the polarity bus and front contact 2 when up closes a circuit applying continuous energy to the flashing bus, whereas the contact 1 of polarity relay NR when down and up respectively connects energy of positive and negative polarity respectively to said circuit extending to said polarity bus, and the back contact 2 when up opens said circuit supplying continuous energy to said flashing bus to allow flashing energy to prevail. Each of the polarity relays NR is also provided with a front contact 3 which is included in a pick-up circuit for the corresponding transfer stick relay, such as relay GA5S (Fig. 5A) for the polarity relay GA5NR (Fig. 5E).

The intermediate token repeater relays, such as relays GA5TP and GA5MTP (see Figs. 5A and 16) are dropped when tokens are inserted in token receptacles GA5T and GA5MT, respectively, and by opening of their front contacts 1 open stick circuits of route relays of routes starting at an adjacent altitude of an adjacent stack and ending at the altitude and stack under consideration whereas their front contacts 2 are included in the route circuits of route relays of routes starting at the altitude and stack under consideration and ending at the same or an adjacent altitude of an adjacent stack. These intermediate token relays are also provided with contacts 3, 4 and 5 (see Figs. 5E and 5F) included in the three polarity route circuits which extend between the same two stacks and which exit at the same altitude as that represented by such token repeating relay.

Figure 4:
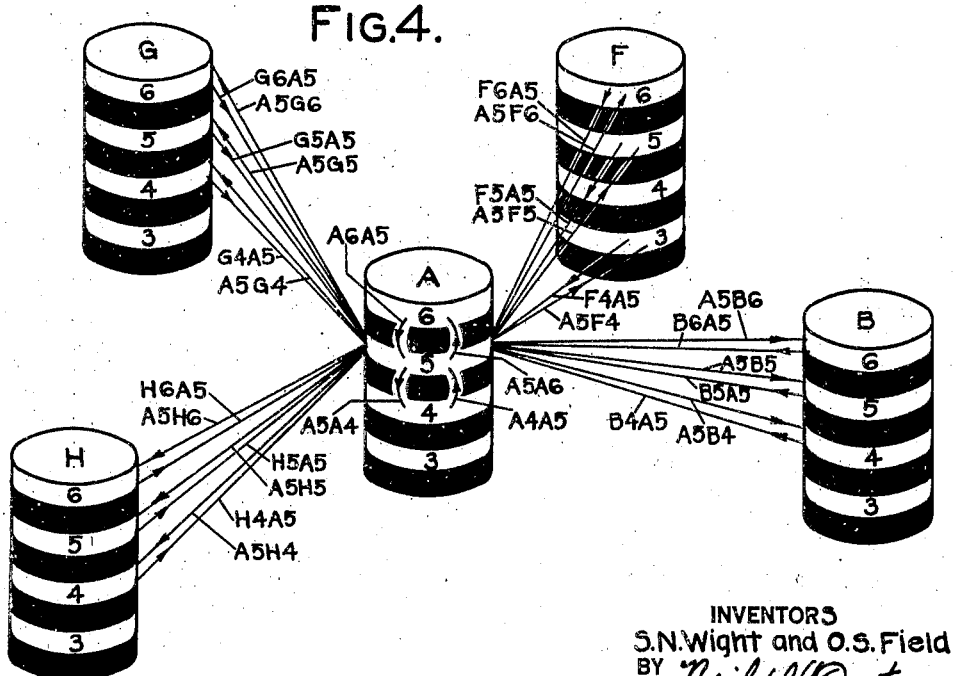

*Fig. 4 illustration.*—The incoming routes from stack G terminating at the 5000 altitude of stack A illustrated in Fig. 4 and the corresponding route wires illustrated in Fig. 5A have been designated G6A5, G5A5 and G4A5 whereas the corresponding outgoing routes and their respective wires have been designated A5G6, A5G5 and A5G4. Similarly, the outgoing routes from the 5000 altitude of stack A and terminating at stack H have been designated A5H6, A5H5 and A5H4, whereas the corresponding incoming routes have been designated H6A5, H5A5 and H4A5 in Figs. 4 and 5A. Similarly, the outgoing routes from the 5000 foot altitude of stack A to stack F have been designated A5F6, A5F5 and A5F4 whereas the corresponding incoming routes have been designated F6A5, F5A5 and F4A5 respectively in Figs. 4 and 5D. Also, the outgoing routes from the 5000 foot altitude of stack A to the stack B have been designated A5B6, A5B5 and A5B4 and their corresponding incoming routes have been designated B6A5, B5A5 and B4A5 respectively. The routes illustrated in Fig. 4 have been given the same reference characters as the route wires in Figs. 5A-5D. Routes also extend to and from altitudes 4000 and 6000 of stack A as shown in Figs. 4 and 5A-5D. The direction in which airplane traffic may move over a particular route or the direction in which current flows through the route wire have been indicated by an arrow. Fig. 4 therefore shows only all of the routes and the route wires which are shown in Fig. 5 of the drawings.

*Operation of system with particular reference to the abbreviated illustration of system shown in Figs. 3A-3D.*—This is called an abbreviated illustration of the system because all conflicting routes, substantially all interlocking and a large part of each of the lock relay circuits has been omitted and what has been illustrated has been selected to get an understanding of the underlying principles of the system. Referring first to Fig. 2 let us assume that an airplane is flying eastwardly (to the right) at some point to the west of stack G. It will be observed that there is no stack illustrated to the left of stack G in Fig. 2 and for this reason it will be necessary to bring the plane in at an intermediate point between the stack G and an imaginary location somewhere to the west thereof, this imaginary location, in that it is of unknown destination and location, has been assumed to be location "X" in Fig. 3A of the drawings.

Let us now assume that the pilot on this airplane reports to the dispatcher that he is approaching in an eastbound direction and is about to approach the stack G and requests permission to enter stack G at an altitude to be determined by the dispatcher. The dispatcher will look at his map board, or diagram and let us assume that he finds the lamp G5 of stack G extinguished and that the dispatcher proposes to have the plane enter the stack G at the 5000 foot altitude. The dispatcher will now place a token identifying the plane under consideration into the token receptacle XG5T which will result in the deenergization of the token repeating relay XG5TP and the closure of its back contacts 2 and 4 (see upper and lower left-hand corner of Fig. 3A). The operator will then depress this token and will at the same time depress the push button G5. The depression of this token closes token mechanism contacts 1 and 2 of token mechanism XG5TQ and depression of push button G5 results in the picking up of push button repeater relay G5P, and closure of its front contact 8 will result in the closure of the following pick-up circuit for the route relay X5G5R: beginning at one terminal of a source of current, back contact 1 of token mechanism XG5TQ which is closed by depressing the token in token receptacle XG5T, back contact 2 of token relay XG5TP, back contact 16 of the route relay X5G6R, back contact 17 of the route relay X5G4R, front contact 8 of the push button G5P, front contact 8 of the lock relay G5L, winding of the route relay X5G5R, to the cancel bus BUSG5C which through front contacts 2 and 3 in multiple of the token repeater relays G5TP and G5MTP, and back contact or cancelling contact 2 of the push button G5 is connected to the other terminal of said source. This will result in the picking up of the route relay X5G5R which will then stick up through two stick circuits connected to the same source one of which includes the stick contact 2 of this route relay and the major portion of the circuit just traced and the other of which includes the stick contact 1 of this relay X5G5R and the back contact 4 of the entering stick relay XG5S. The depression of the token at the 5000 foot altitude and to the left of stack G will also result in the closure of the back contact 2 of the token mechanism XG5TQ (see the lower left-hand corner of Fig. 3A) and since the token repeater relay XG5TP is now de-energized and its back contact 4 is closed and since the route relay X5G5R is now energized and its front contact 6 is closed the polarity relays XG5FR and XG5NR will both assume their energized position and thereby will through their contacts 1 apply current of negative polarity to the polarity bus BUSG5P. With the polarity relay XG5NR assuming its energized position its front contact 3 will close a pick-up circuit for the stick relay XG5S. This pick-up circuit for transfer relay XG5S includes only a front contact 3 of the polarity relay XG5NR, and the winding of this relay XG5S. This pick-up circuit for relay XG5S will only remain closed so long as the token is depressed in that upon release of the token the front contact 3 of relay XG5NR will open. The picking up of the route relay X5G5R will through the medium of the opening of its back contact 4 open the energizing circuit for the lock relay G5L. Since, however, this lock relay G5L, as well as all of the other lock relays, is slow dropping, it will not drop until after the route relay which caused this dropping has fully assumed its energized position with its stick circuit closed. It should be understood that the circuit for lock relay G5L includes numerous other locking contacts see, for example, the circuit for lock relay A5L in Figs. 5A–5D and 6 and the modified circuit for the lock relay A5L shown in Fig. 10 of the drawings. Also, the picking up of the route relay X5G5R by closure of its front contact 3 will result in energization of the lamp controlling relay G5CR. The picking up of this relay G5CR will close an energizing circuit for the lamp Y which may be traced from the flashing bus BUSG5F, through front contact 3 of the token relay G5TP, the front contact 2 of the lamp control relay G5CR and the back contact 3 of the monitor's lamp control relay G5MCR. The closure of this circuit will cause the display of a lighted yellow lamp under the bull's-eye of the push button G5 on the dispatcher's board and this lamp will flash so long as the token T which is being held down by the dispatcher remains in its depressed position (see contact 2 of token mechanism XG5TQ) resulting in the energization of both relays XG5FR and XG5NR to cause back contact 2 of relay XG5NR to remove the steady energy from the flashing bus BUSG5F.

Let us now assume that the dispatcher wishes to set up a route for the plane under consideration from the stack G through stacks A and B at altitude 5000 through stack C of altitude 4000 and that he continues to hold his token contained in token receptacle XG5T down and then depresses the push button A5 for the 5000 foot altitude of stack A shown in Figs. 3B and 5B of the drawings. It is, of course, understood that Fig. 3A shows only the most essential portions of the complete wiring network for the 5000 foot altitude of stack A illustrated in detail in Figs. 5A–5F of the drawings. Depression of the push button A5 with the token contained in token jack or token receptacle XG5T depressed and with the route relay X5G5R and the stick relay XG5S assuming their energized position the route relay G5A5R is energized through a circuit which may be traced from a source of current through the back contact 1 of token mechanism XG5TQ (see the upper left-hand corner of Fig. 3A), back contact 2 of the token repeater relay XG5TP, back contacts 16 and 17 of route relays X5G6R and X5G4R respectively, front contact 2 of the route relay X5G5R, front contact 1 of this same route relay, front contact 4 of the transfer stick relay XG5S, main bus BUSG5M, front contact 2 of token repeater relays GA5TP and GA5MTP in multiple, back contacts 16 and 17 of route relays G5A6R and G5A4R, respectively, front contacts 8 of the push button relay A5P and lock relay A5L, winding of the route relay G5A5R, to the cancelling bus BUSA5C connected through the medium of contacts 2 and 3 of relays A5TP and A5MTP respectively in multiple and through back contact 2 of the push button A5 to the opposite terminal of said source. It was, of course, assumed that all the back contacts in the circuit for lock relay A5L shown in Figs. 5A–5D were closed, only one of these contacts having been illustrated in Fig. 3B of the drawings. The route relay G5A5R is therefore picked up and stuck up through a stick circuit including its own front contact 2 and the major portion of the pick-up circuit just traced and is also stuck up by another stick circuit including its stick contact 1 and the back contact 4 of the transfer stick relay GA5S. This transfer stick relay GA5S will, however, pick up almost immediately after route relay G5A5R picks up for reasons already given in connection with Fig. 3A. It is understood that the yellow lamps Y under the push buttons G5 and A5 are now illuminated by flashing energy and it should be understood that this illumination of lamps Y changes to a steady illumination if the token in token receptacle XG5T is no longer depressed. This change from a flashing light to a steady light is due to the dropping of the contact 2 of the polarity relay XG5NR which results in the application of steady energy to the flashing bus BUSG5F upon release of the token. Also, since the transfer stick relay GA5S picked up immediately in response to the picking of the route relay G5A5R for reasons heretofore pointed out and through a circuit including the front contact 3 of the polarity relay GA5NR, this stick relay GA5S is again dropped when the token in token receptacle XG5T is released from its depressed position. It may also be pointed out that such release of the token in the token receptacle XG5T removes energy transmitted from left to right toward the route relays X5G5R and G5A5R but this energy is immediately replaced by the dropping of the transfer stick relay GA5S through the medium of a circuit branch including back contact 4 of this stick relay GA5S. This energy may flow to the stick circuits for relays G5A5R and X5G5R each including a stick contact 1 of such relay. In this connection it should be observed that all of the route relays, such as route relay X5G5R, for instance, are slow dropping to a sufficient extent so as not to drop away during the drop away period of a transfer stick relay, such as stick relay GA5S for instance, so that any picked up route relay will not drop away during the transfer of energy from one circuit to another caused by the depression or release of a token and movement of a transfer stick relay from its energized to its deenergized position or vice versa. It should also be noted that the transfer stick relay XG5S did not drop away during the release of the token in receptacle XG5T with route relay G5A5R now energized because this transfer stick relay XG5S is now stuck up through a stick circuit including the front contact 5 of the route relay G5A5R (see Figs. 3B and 5C). For like reasons as pointed out in connection with the apparatus shown in Fig. 3A the route relay G5A5R of Fig. 3B will not be picked up unless the associated lock relay A5L was then energized and the picking up of this route relay G5A5R by the opening of its back contact 4 will deenergize such associated lock relay A5L. The picking up of the route relay G5A5R through the medium of its front contact 3 will, of course, cause energization and the picking up of the lamp control relay A5CR and the illumination of the yellow lamp Y under the bull's-eye of the push button A5 for reasons already explained in connection with altitude 5000 of stack G.

Let us now assume that the dispatcher wishes to continue the route already set up through stacks B and C and at the 5000 and 4000 foot altitude respectively. To accomplish this it will, of course, be necessary for the lock relays B5L and C4L to be in their energized condition as is only the case if it is safe for a plane to enter these stacks at the 5000 and 4000 foot altitudes respectively. To accomplish this it will, of course, be necessary for the lock relay B5L and C4L to be in their energized condition as is only the case if it is safe for a plane to enter these stacks at the 5000 and 4000 foot altitudes respectively. In order to tentatively (yellow lamp energized) set up the route through stacks B and C the dispatcher will again be required to depress his token in token receptacle XG5T thereby causing (+) energy to be changed to (—) energy on the polarity buses BUSG5P (Fig. 3A) and BUSA5P (Fig. 3B). This will also cause the route relays X5G5R and G5A5R to receive their holding energy from the route circuit in the rear as distinguished from the source ahead through the back contact 4 of the transfer stick relay GA5S, because the depressing of the token in token receptacle XG5T causes energy to be applied to the route relays X5G5R and G5A5R at contact 1 of token mechanism XGTQ and also causes the transfer stick relay GA5S to again pick up and connect its movable contact 4 to the formerly deenergized main bus BUSA5M to which the front contact 4 of this relay GA5S now applies energy.

Let us now assume that the dispatcher while still depressing the token in token receptacle XG5T he also depresses the push button B5 (see Fig. 3C). The depression of push button B5 will, of course, cause energization of the relay B5P and cause closure of its front contact 8 and the energization of the route relay A5B5R, this on the assumption that the front contact 8 of the lock relay B5L is closed signifying that the 5000 foot altitude at stack B is unoccupied and not tentatively or finally assigned for occupancy to any other airplane. This pick-up circuit for route relay A5B5R may be traced from main bus BUSA5M through back contact 1 of transfer relay BA5S (Fig. 5C) through back contacts 19 of route relays A5F6R, A5F5R, A5F4R, A5H6R, A5H5R, A5H4R, A5G6R, A5G5R, A5G4R, A5A6R and A5A4R included in series, front contacts 2 of token relays AF5TP and AF5MTP in multiple, back contacts 16 and 17 of route relays A5B6R and A5B4R, respectively, in series, route wire A5B5 (see Fig. 3C), front contacts 8 of relays B5P and B5L, winding of relay A5B5R to stick bus BUSB5C. The picking up of the route relay A5B5R will, of course, as herein before described stick up and by the opening of its back contact 4 deenergize the lock relay B5L and through the medium of its front contact 3 close an energizing circuit for the lamp controlling relay B5CR, resulting in the flashing illumination of the yellow lamp Y under the push button bull's-eye B5 because polarity relays AB5FR and AB5NR are now both energized. The moment the route relay A5B5R assumes it energized position it will close its front contact 6 to extend by relaying action energy to polarity bus BUSB5P. The picking up of the polarity relay AB5NR through the closure of its front contacts 3 will result in the picking up of its associated transfer stick relay AB5S to cause its movable front contact 3 to be connected to the then deenergized stick bus BUSB5S. Also, the closure of the front contact 5 of the route relay A5B5R causes energization of the stick bus BUSA5S and establishes an energized stick circuit for the transfer stick relay GA5S, which stick circuit will hold the transfer stick relay GA5S energized even though the dispatcher releases the token in the token receptacle XG5T.

Let us now assume that the dispatcher contemplates a descent of the plane during its movement from stack B to stack C and in order to tentatively set up a route for such movement of the plane he will depress the push button C4 for stack C (see Fig. 3D). The depression of the push button C4 will cause energization and the picking up of the push button repeater relay C4P. This picking up of the push button repeater relay C4P through the medium of its closed front contact 3 will close a pick-up circuit for the route relay B5C4R which pick-up circuit may be traced from the main bus BUSB5M (see Fig. 3A) (which bus derives its energy from the back contact 1 of the token mechanism XG5TQ) through the front contacts 2 of token repeater relays BC5TP and BC5MTP, in multiple, the back contact 17 of route relay B5C5R and the back contact 17 of route relay B5C6R, the route wire B5C4, the front contacts 16, 17, 3 and 3 of the relays B4L, C5L, C4P and C4L, respectively, and through the winding of this route relay B5C4R to the cancel bus BUSC4C which derives its energy through front contacts 2 and 3 of relays C4TP and C4MTP, in multiple, and through back contact 2 of the push button C4. The picking up of this route relay B5C4R now stuck up through its contact 2, will result in the establishment of a stick circuit for the transfer stick relay AB5S through the medium of its front contact 5, all in a manner already described in connection with the stick relays XG5S and GA5S. The picking up of the route relay B5C4R, this being a change altitude route relay, will of course result in the picking up of the route repeater stick relay B5C4RS whereby the opening of its back contact 4 causes deenergization of the slow dropping lock relay C4L. This repeater stick relay B5C4RS upon picking up will be stuck up through a stick circuit including its stick contact, to a source of energy either in advance or in the rear as heretofore described in connection with stick circuits for route relays. The closing of the front contact 3 of this repeater stick relay B5C4RS establishes an energizing circuit for the lamp control relay C4CR causing the yellow lamp Y under the bull's-eye of push button C4 to be flashed.

Upon the release of the token in the token receptacle XG5T by the dispatcher all of the yellow lamps under the bull's-eyes of push buttons G5, A5, B5 and C4 will cease flashing and will be continuously illuminated, this being the case because the release of the token in the receptacle XG5T changes the energy applied to the polarity relays XG5FR and XG5NR from (—) polarity to (+) polarity which change in polarity is relayed to corresponding polarity relays from stack to stack, which in turn causes the various polarity relays having reference characters terminating with the letters NR to be deenergized and to cause through the medium of their back contacts 2 the continuous application of energy to the various flashing buses BUSG5F, BUSA5F, BUSB5F and BUSC4F. This dropping of the relay BC4NR by the opening of its front contact 3 causes transfer stick relay BC4S to drop to supply energy to the route network through its back contact 4, so that removal of energy at back contact 1 of token mechanism XG5TQ will not cause dropping of route relays X5G5R, G5A5R, A5B5R, or B5C4R, or their associated stick repeater relays.

The dispatcher has now tentatively set up a route at the 5000 foot altitude through stacks G, A and B and then descending to the 4000 foot altitude at stack C, and at the same time has locked out all conflicting routes. The dispatcher will now by radio-telephone, and in secrecy so far as the monitor is concerned, advise the pilot of the plane that a tentative route has been set up for him at the 5000 foot altitude through stacks G, A and B and to the 4000 foot altitude at stack C. The pilot will then repeat back this instruction to the dispatcher and in so doing will make this repeat-back instruction manifest to the monitor who is capable of listening to the radio-phone communication from the pilot to the dispatcher but is unable to hear the radio communication from the dispatcher to the pilot. Upon the monitor hearing the repeat-back instructions to the effect that a tentative route has been set up for the pilot through stacks G, A and B at the 5000 foot altitude and to station C at the 4000 foot altitude he will insert his token identifying the plane under consideration in token receptacle XG5MT and will successively depress his push buttons G5M (see Fig. 3A), A5M (see Figs. 3B and 5B), B5M (see Fig. 3C), and C4M (see Fig. 3D). The depression of these push buttons G5M, A5M, B5M and C4M will cause the monitor's lamp control relays G5MCR, A5MCR, B5MCR and C4MCR, respectively, to pick up and then stick up through stick circuits including their respective stick contacts 2 and the front contacts 1 of the dispatcher's lamp control relays C5CR, A5CR, B5CR and C4CR, respectively. The picking up of these monitor lamp control relays G5MCR, A5MCR, B5MCR and C4MCR will cause the lamps under the push button bull's-eyes in the dispatcher's office designated G5, A5, B5 and C4, respectively, to be changed from yellow illumination to green illumination manifesting to the dispatcher that the monitor's check of these repeat-back instructions are in agreement with the original tentative route. That is, if all of the yellow illuminations have been changed to green he is convinced and assured that the pilot has properly understood his instructions, has properly repeated these instructions back, and that the monitor has properly heard these instructions and has translated them into manual manipulations of his push buttons. The dispatcher will now instruct the pilot to proceed over the route heretofore tentatively assigned to him. If the monitor had failed to depress one of these buttons the corresponding bull's-eye would have remained yellow, and if he had depressed a wrong button the corresponding alarm bell such as bell A5CL (not shown) would have been sounded.

*Cancellation of authorized route by tokens.*—Let us now for a moment refer to Fig. 2 of the drawings and remember that the pilot of the airplane moving eastwardly toward stack G has been given full authority to fly through the stacks G, A and B at the 5000 foot altitude and has been further authorized to descend from the 5000 foot altitude to the 4000 foot altitude in his movement from stack B to stack C. It may be stated here that neither the dispatcher nor the monitor alone can cancel a fully authorized route.

Let us now assume that the pilot reports having left the stack G. In response to this report, which is heard by both the dispatcher and the monitor, the dispatcher will remove his token, identifying this plane from the token receptacle XG5T, and will insert it in the token receptacle GA5T. In like manner the monitor in response to the report heard by him directly from the pilot will remove his corresponding token from the token receptacle XG5MT and insert it in the token receptacle GA5MT. The removal of the token from the token receptacle XG5T and XG5MT will cause reenergization of the token repeating relay XG5TP and XG5MTP. Deenergization of the respective token repeater relays GA5TP and GA5MTP causes the main bus BUSG5M to be deenergized at the front contacts 2 of these token repeater relays GA5TP and GA5MTP so that this main bus BUSG5M is now completely deenergized to cause deenergization of the route relay X5G5R.

Let us now assume that the pilot has not reported since he arrived at the approach to the stack G and that he continues his flight over the route assigned to him namely over stacks G, A and B at the 5000 foot altitude and over stack C at the 4000 foot altitude and does not report until he has left the stack A. In response to this report the dispatcher will remove his token from the token receptacle XG5T and insert it in the token receptacle AB5T. In like manner the monitor will remove his token from the token receptacle XG5MT and insert his corresponding token in the token receptacle AB5MT. Since the main bus BUSG5M now depends for its energization on current derived through back contact 4 of transfer stick relay BC4S fed back over the route wires B5C4, A5B5 and G5A5 the insertion of the token in token receptacles AB5T and AB5MT respectively causes this current to be cut off at the front contacts 2 of the token repeater relays AB5TP and AB5MTP respectively. In other words, the route relays X5G5R and G5A5R are deenergized by the insertion of tokens in advance of their stacks and the route relay G5A5R by the opening of its front contact 5 causes deenergization of the transfer stick relay XG5S. Also, the dropping of the route relay G5A5R by the closing of its back contact 4 and the opening of its front contact 3 causes reenergization of the lock relay A5L and deenergization of the lamp control relay A5CR respectively. The dropping of relays G5CR and A5CR will, of course, cause extinguishment of the lamps G under the push-button-bull's-eye G5 and A5 by the opening of their respective contacts 2.

The dropping of route relays X5G5R and G5A5R by the opening of their front contacts 6 (see Figs. 3A, 3B and 5E) will cause deenergization of polarity relays XG5FR and GA5FR and deenergization of the polarity buses BUSG5P and BUSA5P. The polarity bus BUSB5P will however not be deenergized because polarity relay AB5FR is still energized because it receives current through front contact 2 of token mechanism AB5TQ, back contact 4 of token repeater relay AB5TP and front contact 6 of route relay A5B5R (see Fig. 3C). It is thus seen that the route network can be cancelled progressively at each check point or in sections including a plurality of check points or at the last check point in the route.

*Partial release of lock relays.*—Let us now assume that the pilot continues his flight over the route assigned to him (stack A to stack B at 5000 feet and descending to 4000 feet at stack C) and does not report until he leaves stack B. In response to this report the dispatcher and operator will remove their respective tokens from receptacles AB5T and AB5MT and will insert them in their respective token receptacles BC5T and BC5MT. The insertion of the token in these latter token receptacles will cause their respective token repeater relays BC5TP and BC5MTP to be deenergized, and the opening of the contacts 2 thereof (see Fig. 3C) will cause the main bus BUSB5M to be deenergized thereby causing deenergization of the route relay A5B5R and in turn the dropping of lamp control relay B5CR and the extinguishment of the lamp G under the bull's-eye of the push button B5 for reasons heretofore described. Also, the dropping of the route relay A5B5R will by the opening of its contact 5 cause the opening of the stick circuit for the transfer stick relay GA5S (see Fig. 3B) and dropping of this relay. Dropping of the route relay A5B5R will also at its back contact 4 reclose the energizing circuit for the lock relay B5L at that point; it of course being understood that this lock relay circuit inclues many other contacts which have been illustrated for stack A in Figs. 5A–5D and 6 of the drawings which may not all be closed.

Figure 10:
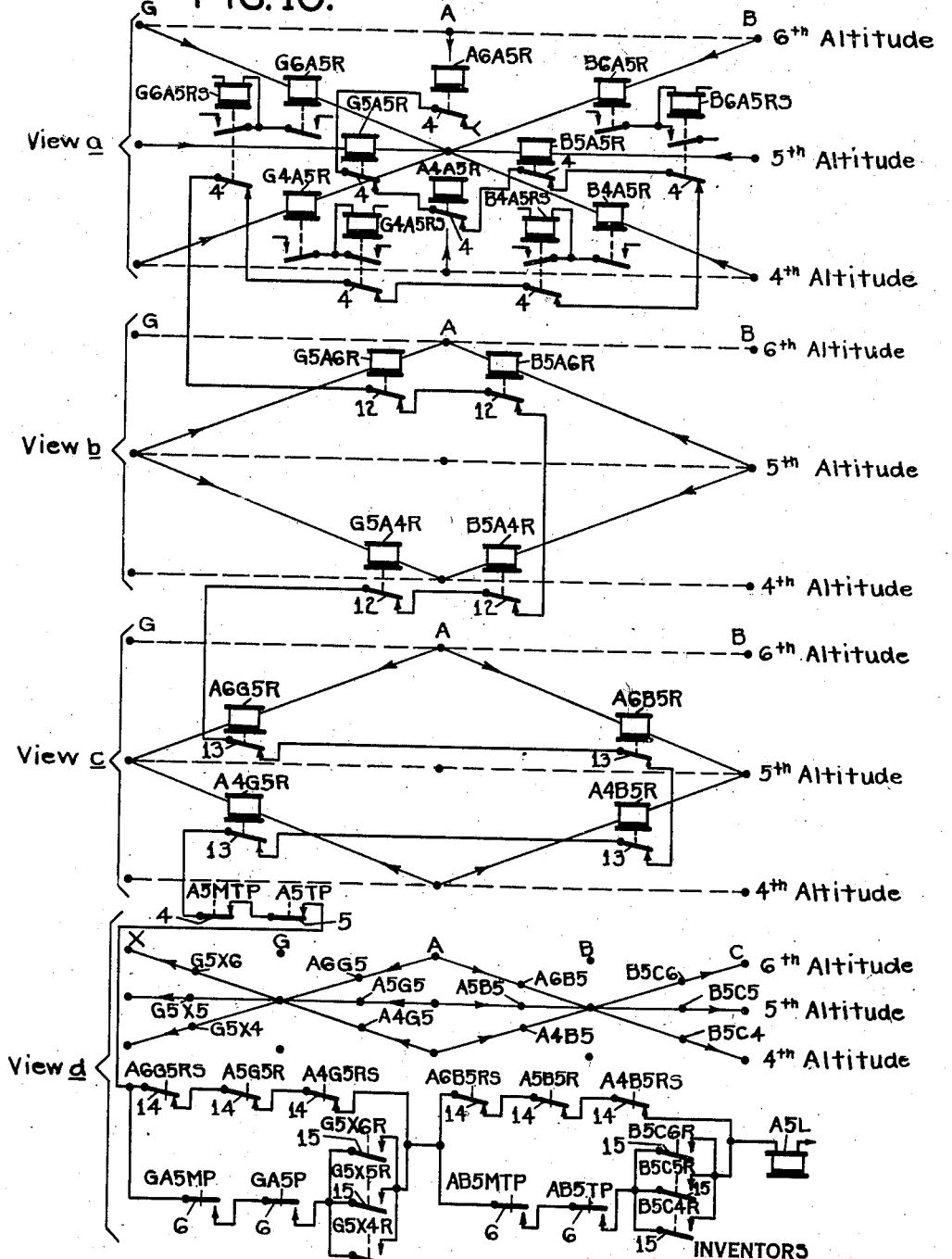
Fig. 10 shows a modified form of lock relay energizing circuit.

Let us now assume that the pilot reports flying between stacks B and C (see Fig. 2) and that he has completed his descent to altitude 4000. In response to this report both the dispatcher and the monitor will remove their tokens from the token receptacles BC5T and BC5MT respectively and will insert them directly below in token receptacles BC4T and BC4MT respectively (see Figs. 2, 3C and 3D). This movement of the dispatcher's and monitor's token will cause opening of the contacts 1 of the token repeater relays BC4TP and BC4MTP included in the stick circuit of route relay B5C4R, thereby causing deenergization of this route relay. In this case, however, the dropping of this route relay will not cause the extinguishment of the lamp at that altitude 4000 for that stack C because the route relay B5C4R does not have a front contact capable of energizing the associated lamp control relay C4CR. The route relay B5C4R, as heretofore pointed out, has associated therewith a repeater stick relay B5C4RS, and this repeater stick relay is not dropped by the insertion of the dispatcher's token and the monitor's token in the token receptacles BC4T and BC4MT respectively but may be dropped if these tokens are inserted in the token receptacles C4T and C4MT or in token receptacles beyond stack C. The dropping of the route relay B5C4R will however at its back contact 13 allow reclosing of the energizing circuit for the lock relay B4L located at the 4000 foot altitude of stack B and also at its back contact 12 allow reclosing of the energizing of the lock relay C5L located at the 5000 foot altitude of the stack C, as more clearly pointed out hereinafter. If, however, the modified lock relay circuit of Fig. 10 is employed, which will be described hereinafter the circuit for the lock relay B5L will not yet be reclosed because this circuit will be held open at back contact 14 of route repeater stick relay B5C4RS (not shown but see similar back contact 14 of repeater stick relay A6B5RS for lock relay 5AL in Fig. 10 of the drawings). Although the back contacts 12 and 13 of the route relay B5C4R which by closing allow such releasing of lock relays for both the entering altitude (5000 feet) at stack C and the exit altitude (4000 feet) at stack B have not been shown in Fig. 3D such contacts 12 of the route relays G5A6R, G5A4R, H5A6R, H5A4R, F5A6R, F5A4R, B5A6R and B5A4R and contacts 13 of route relays A6G5R, A4G5R, A6H5R, A4H5R, A6F5R, A4F5R, A6B5R and A4B5R have been illustrated for the circuit of the lock relay A5L in Fig. 5A. Each of the contacts 12 of relays G5A6R, G5A4R, H5A6R, H5A4R, F5A6R, F5A4R, B5A6R and B5A4R in the circuit of lock relay A5L are contacts controlled by relays of diverging routes exiting into stack A at altitudes 4000 and 6000 feet, and the contacts 13 of relays A6G5R, A4G5R, A6H5R, A4H5R, A6F5R, A4F5R, A6B5R, A4B5R are contacts of relays of converging routes departing from stack A at altitudes 4000 and 6000 feet (see Fig. 5A) and entering the 5000 altitude of adjacent stacks. From this analysis it is evident that dropping of route relay B5C4R causes the closing of back contacts 12 and 13 in the circuits of lock relays C5L and B4L respectively. Relay B5C4R is, of course, also as above pointed out provided with a repeater route relay B5C4RS (see Fig. 3D) having a back contact 3 included in the circuit (see Fig. 3D) of lock relay C4L. This repeater route relay B5C4RS, however, still remains energized.

Let us now assume that the pilot of the plane under consideration arrives at stack C at altitude 4000 feet and reports this arrival by radiotelephone. This report is of course heard by both the dispatcher and the monitor and in response to this report they will move their respective tokens from the token receptacles BC4T and BC4MT and insert them in the token receptacles C4T and C4MT (see lower part of Fig. 3D of the drawings). The insertion of the tokens in these latter receptacles cause the associated token repeater relays C4TP and C4MTP to be deenergized and by the opening of their contacts 2 and 3 in multiple cause deenergization of the cancelling bus BUSC4C and deenergization of the route repeater relay B5C4RS. Dropping of this route repeater relay B5C4RS will cause reclosure of its back contact 4 in the energizing circuit of lock relay C4L but this lock relay C4L will not pick up because token repeater relays C4TP and C4MTP are still in their deenergized position and at their open front contacts 5 and 4, respectively, hold lock relay C4L down. In this connection it should be remembered that the transfer stick relay BC4S has assumed its deenergized position since the depression of the dispatcher's taken in one of the dispatcher's token receptacles of the route was discontinued by the dispatcher, which token was depressed to cause flashing of all of the lamps of the route. This release of the token caused the polarity of the various polarity buses to be changed from minus (—) to plus (+) thereby causing deenergization of the various polarity relays having a reference character ending in "NR" and causing opening of the contact 3 of the polarity relay BC4NR included in the energizing circuit of the transfer stick relay BC4S. Also, the dropping of the route repeater stick relay B5C4RS by the opening of its front contact 3 caused dropping of the lamp control relay C4CR and estinguishment of the lamp G under the bull's-eye of the push button C4. We may now assume that the plane has been authorized to enter an adjacent control area and that the dispatcher and monitor will remove their respective token from the token receptacle C4T and C4MT returning all circuits and apparatus to their normal condition.

Let us now again assume that there is a plane approaching from the west toward the stack G (see Fig. 3A) and that the dispatcher inserts a token identifying this plane in the token receptacle XG5T and then depresses the push button G5 (Fig. 3A) and A5 (Fig. 3B) on the assumption that the airplane is to be held at stack A altitude 5000. If the lock relays G5L and A5L at the stack G and A respectively are both energized this depression of the push buttons G5 and A5 will result in the illumination of the yellow lamps Y under these bull's-eyes of these push buttons G5 and A5 for reasons already given. The dispatcher will now advise the pilot of the plane under consideration that he is to enter the stack G at the 5000 foot altitude and is then to proceed to the 5000 foot altitude of stack A where he is to hold. The pilot upon receipt of these instructions by radio-phone will repeat them back to the pilot and these repeat-back instructions will, of course, be heard by the monitor. The monitor will then insert his token identifying the plane under consideration in token receptacle XG5MTP (Fig. 3A) and will then depress his push buttons G5M and A5M as a result of which the yellow lamp Y in the dispatcher5s office under the push button bull's-eyes G5 and A5 will be extinguished and in place thereof the green lamps G will be lighted. This advises the dispatcher that the montor has checked or verified the repeat-back instructions and that the pilot must have been properly informed as to his procedure toward stack A to hold at stack A 5000 foot altitude, and the dispatcher will then advise the pilot that the route has been finally and officially assigned to him and that he may proceed as instructed. As soon as the pilot reports having left stack G, which will be heard by both the dispatcher and the monitor, these men will remove their respective tokens from the token receptacles XG5T and XG5MTP and insert them in token receptacles A5T and A5MT (Fig. 3B). The insertion of the dispatcher's and monitor's tokens in token receptacles A5T and A5MT will open front contacts 2 and 3 of the token repeater relays A5TP and A5MTP thereby removing energy from the stick bus BUSA5C causing deenergization of the route relay G5A5R and in turn deenergization of the dispatcher's lamp control relay A5CR. Since the route relay X5G5R was for obvious reasons also energized when the route was set up and was held energized through a stick circuit including its stick contact, 1, the front contact 4 of the transfer stick relay XG5S, the main bus BUSG5M, and through front contacts 2 of token repeater relays GA5TP and GA5MTP, in multiple, back contacts 16 and 17 of the route relays G5A6R and G5A4R, respectively, the route wire G5A5, the front contact 2 of the route relay G5A5R, the front contact 1 of this same route relay, and through back contact 4 of the transfer stick relay GA5S, it will be seen that this route relay X5G5R is deenergized when the route relay G5A5R drops to its deenergized position. It should be noted that even though back contact 4 of the route relay G5A5R, now deenergized, recloses the energizing circuit for the lock relay A5L at one point, this lock relay is still held deenergized at front contacts 4 and 5 of the token repeater relays A5MTP and A5TP respectively.

The plane under consideration is now held at stack A 5000 foot altitude, but in practice is not held within a narrow confined area but holds on the route between stacks G and A 5000 foot altitude. This holding of the plane under consideration at the 5000 foot altitude of stack A resides in the pilot turning his plane abruptly to the right as soon as he strikes the radio fix of stack A after which the plane is swung toward the left until he crosses the radio range leg extending from stack G to A and projecting beyond the same after which he will turn back toward the stack G for a time period of approximately four minutes after which he will make a similar turn to the right followed by a complete turn to the left until he again crosses the radio beam, that is, he flies over a holding route such as indicated at 90 in Fig. 11 of the drawings. This holding route of distorted dumb-bell shape will be repeated until the dispatcher gives the pilot instructions to proceed and where to proceed. As above pointed out the insertion of the monitor's and dispatcher's token in the token receptacles A5MT and A5T cause deenergization of the lamp control relay A5CR and extinguishment of the lamp G under the bull's-eye of push button A5. Although this light is extinguished and the presence of token at stack A 5000 foot altitude informs the dispatcher that a plane is being held at this point and, of course, the token itself identifies the plane in question.

Let us now assume that the dispatcher desires to relight a lamp under the bull's-eye of push button A5. This may be accomplished by depressing his token in token receptacle A5T and by again depressing the push button A5 resulting in the closure of a pick-up circuit for the relay A5TS through front contact 1 of the push button repeater relay A5P, the token contact 1 of the token mechanism A5TQ, the back contact 1 of the token repeater relay A5MTP, and the back contact 2 of the push button A5. The closure of this pick-up circuit will result in the energization of the relay A5TS which relay will then be stuck up through a circuit including its stick contact 1, and the back contact 1 and 2 of the relays A5TP and A5MTP respectively in multiple. With the auxiliary relay A5TS now picked up and stuck up its closed front contact 3 applies energy to the main bus BUSA5M at stack A altitude 5000 which is a necessary prerequisite to an extension of the route to other stacks or to other altitudes of the same stack A.

Referring now to Figs. 5A-5F, which show in complete detail the apparatus and circuits illustrated in abbreviated form in Fig. 3B of the drawings, let us assume that the dispatcher wishes to continue his route by making a descent to altitude 4000 of stack A. In order to ascertain whether it is safe for a plane to be instructed to descend to altitude 4000 of stack A the dispatcher will depress his push button A4 (not shown) and if the lock relay A4L (not shown) is energized depression of the push button A4 will result in the flow of current from the terminal of a source of current through front contact 3 of the auxiliary stick relay A5TS to the main bus BUSA5M through back contact 1 of the transfer stick relay A4A5S, through back contacts 11 of each of the route relays A5B6R, A5B5R, A5B4R, A5F6R, A5F5R, A5F4R, A5H6R, A5H5R, A5H4R, A5G6R, A5G5R, A5G4R and A5A6R, all connected in series, through wire 83 to the route relay A5A4R at altitude 4000 of stack A (not shown but see route relay A6A5R of Fig. 5D) through front contacts 2 of the lock relays A4L and A4P (not shown but see relays A5L and A5P, Fig. 5C) through the winding of the relay A5A4R to the cancel bus BUSA4C (not shown but see bus BUSA5C, Fig. 5C) through the front contacts 2 and 3 in multiple of token repeater relays A4TP and A4MTP (not shown but see contacts 2 and 3 of relays A5TP and A5MTP of Fig. 5B) through back contact 2 of push button A4 (not shown but see push button A5 of Fig. 5B) to the other terminal of the same source of current. The picking up of the route relay A5A4R (not shown but see relay A6A5R, Fig. 5D) will result in the closure of a stick circuit for this relay through its stick contact 1 and the back contact 4 of the transfer stick relay A5A4S (not shown but see transfer stick relay A6A5S of Fig. 5C). The picking up of the route relay A5A4R (not shown but see relay A6A5R) by the closing of its front contact 3 will result in the picking up of the relay A4CR (not shown but see relay A5CR of Fig. 5B) and will result in the illumination of the yellow lamp Y under the push button A4. This illumination of the yellow lamp under the bull's-eye of push button A4 will inform the dispatcher that it is safe for the plane to make its descent from altitude 5000 to altitude 4000 in stack A. The dispatcher will, however, not inform the pilot of this fact until he has first given him instructions as to a proposed route which instructions must be verified by the monitor. The dispatcher will then advise the pilot that a tentative route consisting of a descent from altitude 5000 to 4000 in stack A is under consideration. The pilot will report these instructions back to the dispatcher and these repeat-back instructions will be heard by the monitor who will then depress his monitor's push button A5M followed by the depression of the monitor's push button A4M. The depression of these push buttons A5M and A4M by the monitor will result in the energization of the monitor's lamp control relays A5MCR and A4MCR respectively which relays will then be stuck up through stick circuits including the front contact 1 of the dispatcher's lamp control relays A5CR and A4CR respectively, resulting in the energization of the green lamps under both of the push button bull's-eyes A5 and A4 in the dispatcher's office. The dispatcher is now convinced that the instructions as to a proposed route have been clearly understood by the pilot, have been clearly repeated back and have been clearly understood by the monitor and have been properly translated into push button manipulations by the monitor. The dispatcher will now instruct the pilot that the proposed route is now officially assigned to him and that he may proceed over this route. The pilot in making the descent from the 5000 foot altitude of stack A to the 4000 foot altitude of stack A will proceed back toward the stack G and in so doing will make a descent of about 500 feet during his westward flight after which he will make a turn as indicated for the holding route 99 shown in Fig. 11 of the drawings after which he will return toward the stack A making a further descent of about 500 feet so as to enter the stack A at the 4000 foot altitude. When the pilot reaches the 4000 foot altitude of stack A he will, of course, hold at the 4000 foot altitude in a manner as already described in connection with the 5000 foot altitude of stack A until further instructions are issued to him. From this point on the route may be extended either toward other stacks or to a lower altitude in stack A depending upon the destination of the plane and depending upon where routes are available depending upon routes set up for other planes.

It has been pointed out hereinbefore that depressing of a token in its receptacle by the dispatcher will cause all of the lamps in the set up route in advance of the plane identifying token to be flashed. This function is accomplished, for instance, by the back contact 2 of the token mechanism GA5TQ (see the lower part of Fig. 3B and the upper part of Fig. 5E), when a token is contained in an intermediate receptacle between two stacks. If the token is at that time located in a token receptacle of the stack itself, as for instance, the token receptacle A5T for stack A, as could be the case if a plane is held at stack A, then the flashing of the lamp at that stack is accomplished through the medium of back contact 2 of the token mechanism A5TQ (see the lower upper part of Figs. 3B and 5B of the drawings). It will be observed that the closing of the back contact 3 of this token mechanism A5TQ (see Fig. 5E) at times applies energy to the polarity bus BUSA5P. This back contact 3 is, however, only effective to energize this polarity bus BUSA5P by current of either polarity if each of the polarity relays FR for that altitude of that stack assume their deenergized position as is evident from the back contacts 3 of the polarity relays GA5FR, HA5FR, FA5FR, BA5FR, A4A5FR and A6A5FR included in a circuit portion between the contact 3 of the token mechanism A5TQ and the polarity bus BUSA5P (see Fig. 5E of the drawings). Also this circuit portion is not closed unless the back contact 4 of token repeating relay A5TP is closed as it obviously would be when a token in receptacle A5T is depressed. It is, of course, understood that the change from positive to negative polarity on the polarity bus BUSA5P is relayed through polarity relays to all of the polarity buses at subsequent stacks and altitudes of the route over which the plane identified by the token under consideration is to fly.

*Cancellation of tentative route.*—Hereinbefore the back contact 2 of the dispatcher's push button has been characterized as a cancelling contact. It should be noted that this contact supplies energy to the cancel bus and removes such energy if this push button is pulled out, thereby causing any route relay then stuck up at the corresponding altitude and stack to be deenergized.

*Locking of cancellation function.*—Another function is performed by the picking up of the monitor's lamp control relay, such as relay A5MCR (see Figs. 3B and 5B). This function is performed by the front contact 1 thereof and resides in it shunting the cancelling contact 2 of its associated push button A5 and the extinguishment of the cancelling function permitted by the back contact 2 of such dispatcher's push button. In other words, if a route has once been fully and finally set up on the dispatcher's board it cannot be cancelled by him by pulling out his push button but can only be cancelled by the cooperation of the dispatcher and monitor through the medium of their respective tokens.

*System in detail Fig. 5 duplicated*

The operation of the complete system as illustrated for altitude 5000 for stack A in Figs. 5A–5F operates in exactly the same way as does the abbreviated system illustrated in Figs. 3A–3D, which operation has just been described, except that numerous locking contacts in the circuit of the lock relay and in the circuits of the various route relays controlled by other route relays and repeater route relays have been omitted from Figs. 3A–3D of the drawings and have not been discussed. These various interlocking features between the various lock relays as well as a detailed discussion of the various contacts in the circuit for the lock relay A5L illustrated in Figs. 5A–5D will now be discussed.

*Lock relay.*—The first of these interlocking features to be considered is the lock relay of the particular altitude of the particular stack to which a route is to be extended, as for instance, the lock relay A5L shown in Figs. 3B and 5B of the drawings if a route is to be extended to stack altitude A5. Referring to Fig. 5B of the drawings it will be observed that the pick-up circuit for each of the route relays illustrated in Figs. 5A–5D includes a front contact of this lock relay A5L. These contacts have been numbered 1 to 14, inclusive. It will also be seen that this lock relay A5L is not only energized through a circuit including back contacts 4 of all of the conflicting entering route relays, or a repeater relay thereof, but also includes a back contact 4 of the route relay to be picked up. This is resorted to in order to require only one lock relay for each stack-altitude. In other words, if any one of the route raleys is up a second route relay cannot be picked up and furthermore a route relay when it is picked up is picked up through a front contact of a lock relay, which lock relay is energized through a back contact of such route relay. For this reason the lock relay has been made more slow dropping than the route relays so that a route relay may be picked up through a front contact of such lock relay before such lock relay actually drops in response to the picking up of such route relay. Furthermore, the circuit of each lock relay includes back contacts of route relays associated with adjacent stacks (see for instance back contacts 12 and 13 in the circuit for lock relay A5L an Fig. 5A).

As illustrated in Figs. 5A–5D of the drawings the circuit for the lock relay A5L includes back contacts 4 of the following route relays A4A5R, B5A5R, F5A5R, A6A5R, G5A5R and H5A5R and also includes back contact 4 of route repeater relays B4A5RS, B6A5RS, F4A5RS, F6A5RS, G6A5RS, G4A5RS, H6A5RS and H4A5RS, includes back contact 12 of the following route relays G5A6R, G5A4R, H5A6R, H5A4R, F5A6R, F5A4R, B5A6R, and B5A4R, and back contacts 13 of the following route relays A6G5R, A4G5R, A6H5R, A4H5R, A6F5R, A4F5R, A6B5R, A4B5R and front contacts 4 and 5 of the token repeater relays A5MTP and A5TP, respectively, all in series.

In order to more clearly analyze the relationship between the routes having back contacts of their respective route relays included in a locking circuit for a lock relay which controls other routes relays, these route relays have been graphically shown tied up with their respective pictorial routes and with their specific back contacts included in the energizing circuit for the lock relay A5L in Fig. 6 of the drawings. In order, however, to simplify this graphical or pictorial illustration the routes leading to and from altitudes 4000, 5000 and 6000 of adjacent stacks H and F have been entirely omitted from Fig. 6 of the drawings. The principle of locking, in spite of this omission, is however the same. Referring now to Fig. 6 let us more clearly analyze the contacts included in the energizing circuit for lock relay A5L shown in this figure of the drawings. It will be seen that three altitudes namely the fourth, the fifth and the sixth altitudes, signifying four, five and six thousand feet respectively, for stacks G, A and B have been illustrated in "view 1," in "view 2" and also in "view 3" of Fig. 6 of the drawings. These various locations in space have been reproduced three times in order to avoid confusion and in order to analyze the three locking features shown in these three views separately and without difficulty.

*Locking feature one.*—Referring now to view 1 of Fig. 6 it will be observed that the route relays and repeater route relays as identified by their reference characters and the lock contacts 4 of these route relays included in the locking circuit are the same as the route relays and their contacts 4 shown at the top of Figs. 5A and 5D of the drawings except for the omission of route relays of stacks H and F. It is also readily seen that the route and repeater route relays shown in view *a* of Fig. 6 are the route relays for all of the entering routes for entering the 5000 foot altitude of stack A (stacks H and F omitted). This interlocking feature one is obvious in that it allows only one route relay for an entering route to be picked up at a time and this is obviously necessary because it would be dangerous for more than one route toward the 5000 foot altitude of stack A to be set up at one time. In this connection, it should be remembered that the dispatcher can conveniently depress only one push button at a time, his other hand being occupied in depressing the token. That is, the system is of the entrance-exit type in that a manual act at the entrance end and a manual act at the exit end must be made simultaneously to set up a route extending from such entrance to such exit end. It should be understood that the various arrows illustrated in each of views a, b, and c of Fig. 6 illustrate the direction over which traffic may move over the route to which such arrow is applied. For instance, the line extending in view a from the sixth altitude of stack G to the fifth altitude of stack A represents route G6A5 and contains a route relay G6A5R. It should, however, be noted that this route relay G6A5R does not directly control the circuits for lock relay A5L but does control such lock relay through the medium of back contact 4 of the route repeater relay G6A5RS. For detailed circuits to show how this route repeater relay G6A5RS is controlled by the route relay G6A5R attention is directed to Fig. 5A of the drawings.

*Locking feature two.*—Referring now to view b of Fig. 6 of the drawings it will be observed that four route portions only have been shown therein (eight route portions in Figs. 5A–5D). These route portions may for convenience be called the approaching diverging routes in that they start at the same altitude as the one with which the lock relay A5L is associated and terminate at an adjacent altitude of the same stack with which lock relay A5L is associated. The four routes graphically illustrated in view b of Fig. 6 are routes G5A6, G5A4, B5A6 and B5A4. The lock relay A5L which locks every route extending toward the 5000 foot altitude of stack A should be deenergized when any one of the four route relays G5A6R, G5A4R, B5A6R or B5A4R for these routes is deenergized because an airplane travelling from altitude 5000 of stack G to altitude 6000 of stack A, for instance, might not have entirely cleared the 5000 foot altitude near stack A on its travel toward altitude 6000 of stack A. In other words, the lock features illustrated in view b of Fig. 6 allows a pilot complete freedom when he is to change his altitude in flying from one stack to another so that he can make that change in altitude abruptly and at any point in his flight between such two stacks. Thus if there were a route set up from G5 to A6 or over any one of the four diverging routes illustrated in view b of Fig. 6 no route to altitude 5000 stack A could be set up. The safe-guard imposed by contacts 12 of the route relays are therefore desirable where such freedom of altitude change is allowed. If the stacks are far apart and the pilot is required to make his ascent or descent immediately this locking feature of view b, Fig. 6 may be dispensed with. Also this locking feature is cancelled as soon as the pilot reports having reached the new altitude as pointed out hereinafter by the inserting of the tokens at the new altitude.

*Locking feature three.*—For similar reasons as discussed in connection with view b of Fig. 6 it is desirable to exercise the same locking protection for converging airplanes, that is, planes flying in the opposite direction over these same route paths with respect to planes entering stack A at the 5000 foot altitude, as illustrated in view c of Fig. 6. The locking feature conventionally illustrated in view b of Fig. 6 is performed by contacts 12 of the route relays; whereas, the locking feature exemplified in view c of Fig. 6 is accomplished by back contacts 13 of the route relays. Referring to view c of Fig. 6 of the drawings it will be seen that if a route is set up from altitude 6000 of stack A to altitude 5000 of stack G that the establishment of such a route, resulting in the picking up of the route relay A6G5R, will cause the lock relay A5L to be deenergized by reason of the opening of back contact 13 of such route relay. This is a necessary safe-guard in that the pilot is given complete freedom in making his descent between stacks A and G and from altitude 6000 to altitude 5000 in that he, at his own discretion, may select the starting point for his descent and for this reason it is necessary to prevent a route being set up to the 5000 foot altitude of stack A while a route extending from the 6000 foot altitude of stack A to the 5000 foot altitude of stack G is still effective. The front contacts 4 and 5 of the token repeater relays A5MTP and A5TP are employed to hold the lock relay A5L deenergized while tokens are inserted at that stack-altitude as is the case when a plane is holding at this location.

Let us now consolidate the teachings of views b and c of Fig. 6 into a more complete illustration. View b of Fig. 6 shows that picking up of route relay G5A6R by opening its back contact 12 drops lock relay A5L. View c of Fig. 6 shows that picking up of route relay A4B5R for a similar route by the opening of its contact 13 drops lock relay A5L. Since route A4B5 (see view c) has the same relation to point A5 as route G5A6 (see view b) has to point G6 then route relay G5A6R upon picking up and by the opening of its back contacts 12 and 13 drops lock relay A5L and G6L respectively. This is illustrated in Fig. 7 where the diagonal line containing an arrow point symbolizes route G5A6 and its route relay G5A6R has a back contact 12 included in the energizing circuit for lock relay A5L and has its back contact 13 included in the energizing circuit for lock relay G6L.

*Locking feature four.*—Locking feature four may be said to be the interlock effected by lock relays of one stack altitude upon route relays of adjacent stack altitudes. In Fig. 8 of the drawings the structure of Fig. 7 has been reproduced at the next lower altitude with certain features illustrated in Fig. 5 added thereto. Referring to Figs. 5A–5D it will be seen that route relay G4A5R is repeated in its picking up through front contact 3 by the picking up of route repeater stick relay G4A5RS and that a back contact 4 of this repeater relay is included in the energizing circuit of lock relay A5L (also shown in Fig. 8). It is also seen from Fig. 5B that the pick-up circuit of route relay G4A5R includes front contacts 7, 15 and 17 of lock relays A5L, G5L and A4L respectively (also shown in Fig. 8). From this it becomes apparent, bearing in mind that the entire system is symmetrical, that to set up an ascending or descending route the lock relays for both altitudes for the exit end stack of the route and the lock relay for the exit altitude at the entrance stack must all assume their energized position to allow picking up of the route relay for such route, and this route relay upon picking up deenergizes all of these three lock relays. In other words, to set up route G4A5 (see Fig. 8) altitude 5000 at stack G and altitudes 4000 and 5000 at stack A must be vacant and must have no route to them set up at this time. In other words, the interlocking between the circuits is such that the entire rectangle defined by the four locations G4, G5, A4 and A5 must be vacant, except for the plane under consideration, before the route G4A5 can be set up, also when this route G4A5 is once set up, as manifested by route relay G4A5R being up, not only does this assure against occupancy of this rectangle by another plane but also assures that no other plane shall fly toward the location G5, A4 or A5. This latter precaution is taken because a plane may easily fly beyond the stack it is to approach because the stack is located by a radio fix the presence of which is so abruptly manifested during the flight of a plane that the plane invariably flies beyond the radio fix and stack. That is, to locate a radio fix the plane must fly over the fix and must fly a considerable distance in making his procedure turn. It should, however, be understood that this restriction imposed by locking feature four is released as to locations G5 and A4 as soon as the plane flying over route G4A5 reaches and reports having reached altitude 5000 on its way from stack G to stack A over this route G4A5. This releasing of the locking through the medium of lock relays A4L and G5L by reclosing of back contacts 12 and 13 respectively of route relay G4A5R, without releasing of the locking function accomplished by lock relay A5L, may for convenience be called partial release and is accomplished through the independent dropping of route relay G4A5R and its repeater relay G4A5RS (see Figs. 5A and 8). Referring to Fig. 5A it will be seen that route relay G4A5R has its stick circuit broken by the insertion of the dispatcher's and monitor's tokens in token receptacles GA5T and GA5MT respectively, causing dropping of route relay G4A5R and the reclosure of back contacts 12 and 13 (see Fig. 8) in the circuits of lock relays A4L and G5L, respectively. The route repeater stick relay G4A5RS, however, remains energized and at its back contact 4 (see Figs. 5A and 8) holds lock relay A5L deenergized. This route repeater stick relay G4A5RS is deenergized when both of the tokens are inserted at the 5000 foot altitudes of stack A or at points beyond in the established route (see contacts 2 and 3 of relays A5TP and A5MTP in Fig. 5B). The insertion of the tokens in the same stack altitude does not, however, allow lock relay A5L to pick up. This is by reason of open front contacts 5 and 4 of the token repeater relays A5TP and A5MTP respectively included in the energizing circuit of lock relay A5L. It is also readily seen from Fig. 8 that two routes crossing each other cannot be set up.

It is also readily seen from Fig. 8 that routes parallel to route G4A5 which exit at locations G5 and A4 cannot be set up while route G4A5 is set up. Let us now observe if parallel routes which start at locations G5 and A4 and which exist or finish at locations A6 and G3 respectively can be set up. This may be answered in this way. No route can start from stack altitude G5 and A4 while route G4A5 is set up because no plane can reach these stacks because their respective lock relays G5L and A4L are down. Had a plane been located at one of these locations before route G4A5 was set up this latter route could not then have been set up.

Summarizing, the establishment or setting up of the route G4A5 prevents any route toward locations G5, A5 and A4 being set up, and prevents routes G5A6 and A4G3 from being established because no plane can reach the entrance locations of these two routes. Since, however, a plane can reach the location A5, namely, the plane designated to fly over route G4A5, routes from location A5 to the locations G6, A6, B6, B5 or B4 may be set up immediately and routes to locations G5 and A4 may be set up after route relay G4A5R has been dropped due to insertion of the dispatcher's token and monitor's token in token receptacles GA5T and GA5MT respectively, as is evident from the foregoing discussion in connection with Figs. 5A and 8 of the drawings. In this connection attention is directed to Figs. 5A–5D of the drawings from which it will be observed that all of the route relays of routes which extend from a 5000 foot altitude of an adjacent stack to the 5000 foot altitude of stack A or from an adjacent altitude of the same stack A have their pick-up circuits provided only with the front contact of one lock relay, namely the lock relay A5L, for that altitude and stack, whereas all of the ascending and descending routes entering the 5000 foot altitude of stack A have their route relays provided with a pick-up circuit including front contacts of three lock relays as already pointed out above. That is, the route relay G6A5R has included in its pick-up circuit front contacts 3, 17 and 16 of lock relays A5L, A6L and G5L, respectively, and similarly route relay G4A5R is picked up through front contacts 17, 7 and 15 of lock relays A4L, A5L and G5L, respectively, route relay H4A5R is picked up through front contacts 19, 12 and 15 of lock relays A4L, A5L and H5L, respectively, route relay H6A5R is picked up through front contacts 13, 19 and 16 of lock relay A5L, A6L and H5L, respectively, route relay F6A5R is picked up through front contacts 4, 18 and 16 of lock relays A5L, A6L and F5L, respectively, route relay F4A5R is picked up through front contacts 18, 5 and 15 of lock relays A4L, A5L and F5L, respectively, route relay B4A5R is picked up through front contacts 20, 11 and 15 of lock relays A4L, A5L and B5L, respectively, and route relay B6A5R is picked up through front contacts 14, 20, and 16 of lock relays A5L, A6L and B5L, respectively.

*Interlock between route relays.*—From the foregoing, it is evident that if a route is extended to a specific altitude of a particular stack that each of the route wires radiating from that stack, except the ones radiating toward the stack from which such route extends, will be energized if the proper lock relays are energized and the token at the originating end or entrance end of such route is depressed. This is due to the energization of the main bus due to the picking up of a transfer stick relay, as for instance, is the case when entering stick relay GA5S picks up and through its front contact 4 energizes the main bus BUSA5M (see Figs. 3B and 5B). The exception in the next to the preceding sentence is due to the opening of a back contact of the associated transfer stick relay, as for instance the back contact 1 of the stick relay GA5S, disconnecting the route wires A5G6, A5G5 and A5G4 from the main bus BUSA5M. This latter feature may be said to be the interlock by the transfer stick relays upon the route relays. The remaining radiating energized route wires are so interlocked that only one of them may be rendered available at one time.

It will be observed that each group of leaving route wires that are now energized receive their energy through a series of back contacts of route relays. These various series of back contacts are symmetrical and for that reason only one series or group need be specifically discussed. Referring for instance to the series of back contacts 19 connected to the back contact 1 of the transfer stick relay BA5S and which feed the route wires A5B6, A5B5 and A5B4, it will be seen that these back contacts 19 are all back contacts of route relays located at an adjacent stack for the stacks G, H and F and in addition thereto include back contacts 19 of the route relay A5A6R located at the altitude above the one under consideration and the back contact 19 of the route relay A5A4R located at the altitude below the one under consideration. If the dispatcher were to depress the push button at altitude 5000 stack B (see Fig. 3C) this would result in the flow of current through the back contact 1 of the transfer stick relay BA5S, the back contacts 19 of the route relays A5F4R, A5F5R, A5F6R, A5H4R, A5H5R, A5H6R, A5G4R, A5G5R, A5G6R, A5A4R and A5A6R, and would of course result in the picking up of the route relay A5B5R shown in Fig. 3C of the drawings. The picking up of this route relay A5B5R would cause the opening of its back contacts 7, 8, 9, 10 and 11 (see Figs. 5B and 5C) which would cause all of the outwardly radiating route wires from altitude 5000 of stack A to be deenergized except the route wires A5B6 and A5B4 (see Fig. 5D) and these latter route wires would be deenergized by the opening of back contacts 16 and 17 of the route relay A5B5R (see the extreme right-hand portion of Fig. 5D). In a similar way, if the route had instead been extended to the 5000 foot altitude of stack F the opening of back contacts 7, 8, 9, 10, 11, 16 and 17 of route relay A5F5R would have opened all the other outgoing route circuits. It is thus seen after a main bus of a particular altitude of a particular stack has once been energized by extending a route to that altitude and stack that this energy may radiate from its main bus to all (except for the exception above mentioned) of the route wires leading from that altitude and stack only so long as the route has not been extended beyond that stack and altitude (assuming the token to be depressed). Further that upon extending the route beyond that altitude and stack all of the outwardly radiating wires will be deenergized except the particular one which has been selected by the operation of a push button at the next adjacent stack and altitude in the route. This precaution is necessary because even though these outwardly radiating wires are energized only while the token is depressed so long as this particular stack is the last one in the route they would be permanently energized when the route is extended (transfer stick relay energized by stick circuit) were it not for the interlocking contacts provided as discussed above. In the groups of contacts discussed above there are two groups of contacts one shown at the top and one near the bottom of Fig. 5C of the drawings. These groups of series back contacts of route relays are included in the circuit for picking up the route relay A5A6R at the altitude above and the route relay A5A4R at the altitude below, respectively of stack A. By studying the contacts included in these two groups with respect to the relays which control them as well as the back contacts of route relays A5A4R and A5A6R included in the other four groups of contacts heretofore discussed it will be readily seen that the picking up of any one of the out-going route relays (located at adjacent stacks and altitudes) will deenergize all of the outwardly radiating route wires except the route wire which feeds the particular out-going route relay picked up.

*Entrance-exit feature.*—In this connection it should be remembered that to extend a route the token at the entrance end of such route must be depressed while the push button for the next stack and altitude for the route is depressed. This feature of operating two devices at a time is required to identify the route of the particular plane, by the flashing of lights, to be extended.

*Stick bus.*—Referring now to the extreme lower portion of Fig. 5C of the drawings it will be observed that front contacts 5 of all of the route relays for routes radiating from altitude 5000 of stack A have been grouped in multiple. These contacts are employed to provide energy to the stick bus BUSA5S for the purpose of providing a stick circuit for the transfer stick relay which has been picked up, as for instance, the transfer stick relay GA5S which will be in its energized condition if the route extending to altitude 5000 of stack A entered from stack G, and which will be stuck up through a stick circuit including one of these contacts 5 if this route is extended beyond this stack and altitude. This feature connects all of the main buses of an established route together.

*Polarity bus.*—In the foregoing discussion emphasis has been placed upon the route circuits extending from altitude to altitude and from stack to stack and containing the route relays. There is, however, also a polarity route wire for each main route wire and these polarity route wires are shown in the lower part of Figs. 3A–3D and in Figs. 5E and 5F of the drawings. Since many of these polarity route wires are directly connected to the same polarity bus without intervening contacts the incoming wires have been designated by the polarity bus from which they receive their energy. That is, the incoming wires for this same stack and altitude have been assigned the reference character of the bus they are connected to and have in addition been assigned a legend, such as "From G5" to show where such polarity bus is located. From the upper left-hand corner of Fig. 5E it can readily be seen that the polarity bus BUSG5P is connected to feed energy to any one of three pairs of polarity relays GA6FR, GA6NR; GA5FR, GA5NR, GA4FR, GA4NR but in each case the contact 6 of the corresponding route relay G5A6RS, G5A5R, or G5A4RS must assume the raised position. It is also readily seen that the insertion of the dispatcher's token in the token receptacle GA5T (see Figs. 5A and 5E) causes deenergization of the token repeater relay GA5TP and by opening of front contacts 3, 4, and 5 causes opening of each of the polarity wires extending from altitudes 6000, 5000 and 4000 respectively of stack G to the pair of polarity relays GA5FR and GA5NR, and in each case connects this pair of relays to the contact 2 of token mechanism GA5TQ. This is done so that depression of the dispatcher's token in token receptacle GA5T causes the polarity applied to the pair of polarity relays GA5FR and GA5NR to be changed from plus to minus each time the token is depressed irrespective of whether the energy was formerly received from the polarity bus BUSG6P, BUSG5P or BUSG4P.

Figure 11:
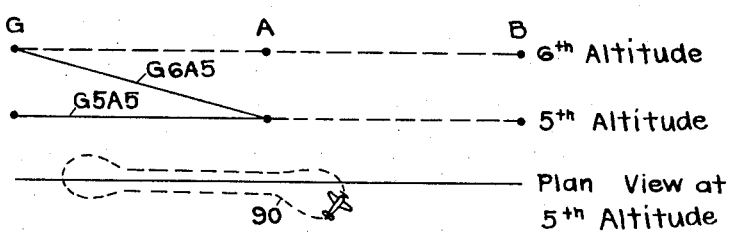
Fig. 11 shows a standard holding procedure storage route in a horizontal plane at the 5000 foot altitude and between stacks G and B via stack A.

*Modified circuit for lock relay.*—The lock circuit for the lock relay A5L shown in detail in Figs. 5A–5D and shown in abbreviated form and pictorially in Fig. 6 of the drawings has been developed to afford adequate protection if it is assumed that a plane stored at a particular stack is not endangered by or does not endanger a plane stored at a stack in advance on the same route. It should be remembered that the lock circuit shown in Fig. 6 has omitted therefrom, for purposes of simplicity, all contacts relative to adjacent stacks H and F and that by obvious interpolation or extension these contacts for stacks H and F can be added. This is also true of Fig. 10. When a plane has been assigned a route to a particular stack and no further, this plane is called upon to fly at its designated altitude at the approach to that stack until the route has been extended. Since it must be presumed that the plane at times, at least, flies entirely by its instruments, as in the case of a heavy fog, the pilot of that plane in this case is entirely guided by the radio range leg and by a radio fix on that leg. In practice the pilot will fly over the radio range leg until he encounters a radio fix after which he will make a rather sudden turn to the right and then circle toward the left to make a circle, of say three miles diameter, until he again crosses his original radio range leg after which he will fly to the right of that radio range leg in the twilight zone for a period of about four minutes towards the stack he came from after which he will make a similar left-hand turn after swinging slightly toward the right. Referring to Fig. 11 such a holding flight course has been indicated by the flight path 90 of distorted dumbbell shape on a horizontal plane at the 5000 foot altitude. As indicated in Fig. 11 this holding flight path 90 more closely approaches the stack G from which the plane came than it approaches stack B in advance. In other words, the holding flight path extends a greater distance to the rear of the radio fix than it does in advance of the radio fix, so that if the distance between radio fixes is rather short this holding flight path might interfere with the flight path of a following plane holding at the next radio fix in the rear. Therefore, if the distance between radio fixes is not appreciably longer than the length of the dumbbell shaped holding flight path, then additional overlapped protection must be provided. This additional protection is provided in Fig. 10 for following planes.

Referring to Fig. 10 of the drawings, it will be seen that views a, b and c are identical to views a, b and c of Fig. 6 and that the locking feature illustrated in view d of Fig. 10 is the additional protection provided by the modification of Fig. 10 to guard against the hazard discussed in connection with Fig. 11 of the drawings for following planes. Referring to view d of Fig. 10, it will be observed that if a route from either of altitudes 6000, 5000 or 4000 of stack A to the 5000 foot altitude of stack B has been set up that one of the contacts 14 of the route relays A6B5RS, A5B5R and A4B5RS will be open to hold lock relay A5L deenergized. These contacts have been provided so that a route from stack G to stack A 5000 foot altitude cannot set up if a route from stack A 4000, 5000 or 6000 foot altitude to the stack B 5000 foot altitude has been set up and the plane is held at stack B 5000 foot altitude. This has been done to prevent the plane flying on this latter route and being held at stack B from colliding with a following plane approaching stack A 5000 foot altitude. Certain shunting contacts have, however, been provided to shunt around these contacts 14 of route relays A6B5RS, A5B5R and A4B5RS to afford a release under certain conditions. These shunting contacts will release this locking feature accomplished by these contacts 14, if the first of the two planes has been authorized to fly beyond stack B, as for instance, to stack C. In other words, if one of the routes B5C6, B5C5 or B5C4 has been set up for the first of the two planes and if this first plane has passed stack A flying toward stack B, as would be manifested by a dispatcher's token and the monitor's token in the token receptacles AB5T and AB5MT to hold token repeater relays AB5TP and AB5MTP deenergized and their back contacts 6 closed, the shunting circuit around contacts 14 of route relays A6B5RS, A5B5R, and A4B5RS will be completed through back contacts 6 of token repeater relays AB5TP and AB5MTP connected in series with one of the front contacts 15 of route relays B5C6RS, B5C5R or B5C4RS. Summarizing in accordance with the structure shown in view d of Fig. 10, provision is made for preventing the setting up of a route from one stack (such as stack G) to another (such as stack A) if the first route from such another stack (stack A) to the next stack in advance thereof (such as stack B) has been set up and has not been extended beyond that stack, as for instance to stack C, but to release this additional locking feature if such route for the plane in advance has been extended beyond such stack in advance (stack B) and such plane in advance has actually left the other stack (stack A) to which the second route is to be extended.

The back contacts 14 of route relays A6G5RS, A5G5R, A4G5RS, the front contacts 15 of route relays G5X6R, G5X5R, G5X4R and the back contacts 6 of token relays GA5P and GA5MP (see view 4 Fig. 10) perform like locking and release functions for planes flying in the opposite direction over the same route above discussed. Obviously, similar contacts for stacks H and F must be provided to make the system complete. It is obvious that great flexibility is possible in the matter of dropping lock relays through the medium of the picking up of route relays and also in the matter of providing shunting or releasing circuits to cancel such locking to accomplish varying results as may be required by varying specific conditions. For convenience only one arrangement has been illustrated.

Figure 12:
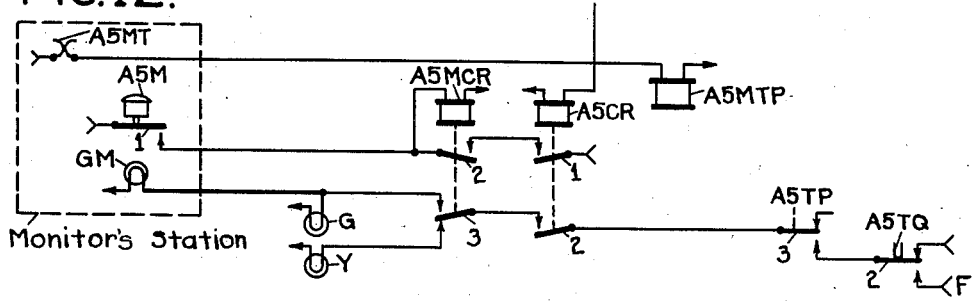
Fig. 12 illustrates a modified form of monitor's board and control circuits which includes indicating lamps.

*Modified monitor's board, Fig. 12.*—Referring to the lower part of Fig. 5B of the drawings and to the middle part of Figs. 3A, 3B, 3C and 3D of the drawings, it will be observed that although the monitor's board is provided with a bull's-eye over its push button A5M signifying that the push button may contain a lamp (see Figs. 3B and 5B) no such lamp is provided under this bull's-eye and the monitor is at all times in the dark as to the proposed route, as is evidenced by a lighted yellow lamp Y on the dispatcher's board, or the actual route, as evidenced by a lighted green lamp G on the dispatcher's board, that has been set up. The only information indicated on the monitor's board (Figs. 3 and 5B) is the location of the entrance point of routes as manifested by the presence by tokens identifying these planes in his token receptacles. It may be desirable to place a green lamp under each of these bull's-eyes of the monitor's push button, that is a lamp within a glass covered push button, and to light up such lamp when the corresponding green lamp on the dispatcher's board is lighted. Such a construction has been illustrated in Fig. 12 of the drawings where the dispatcher's green lamp G and the monitor's green lamp GM are connected in multiple. The lamps and wire shown in heavy lines is all that has been added to Fig. 5B to constitute the Fig. 12 modification. It is, of course, understood that this green lamp GM will not be lighted until the monitor has depressed the proper push button in response to repeat-back information received by him directly from the pilot of the plane, this pilot repeating the instructions given to him by the dispatcher, and this green lamp will be lighted only if these repeat-back instructions translated into push button manipulations by the monitor agree with the prior dispatcher's push button manipulations. This green lamp GM (see Fig. 12) in combination with other green lamps GM will inform the monitor of the route or routes actually set up and assigned to various pilots. In like manner as depression of the dispatcher's token flashes the dispatcher's green lamp G this monitor's lamp GM is also flashed. If, on the other hand, flashing of the green lamps on the monitor's board is not desired, this green lamp GM (Fig. 12) instead of being connected in multiple with the dispatcher's green lamp G may be energized through a separate circuit including front contacts of relays A5MCR and A5CR in series and a steady source of current.

Figure 13:
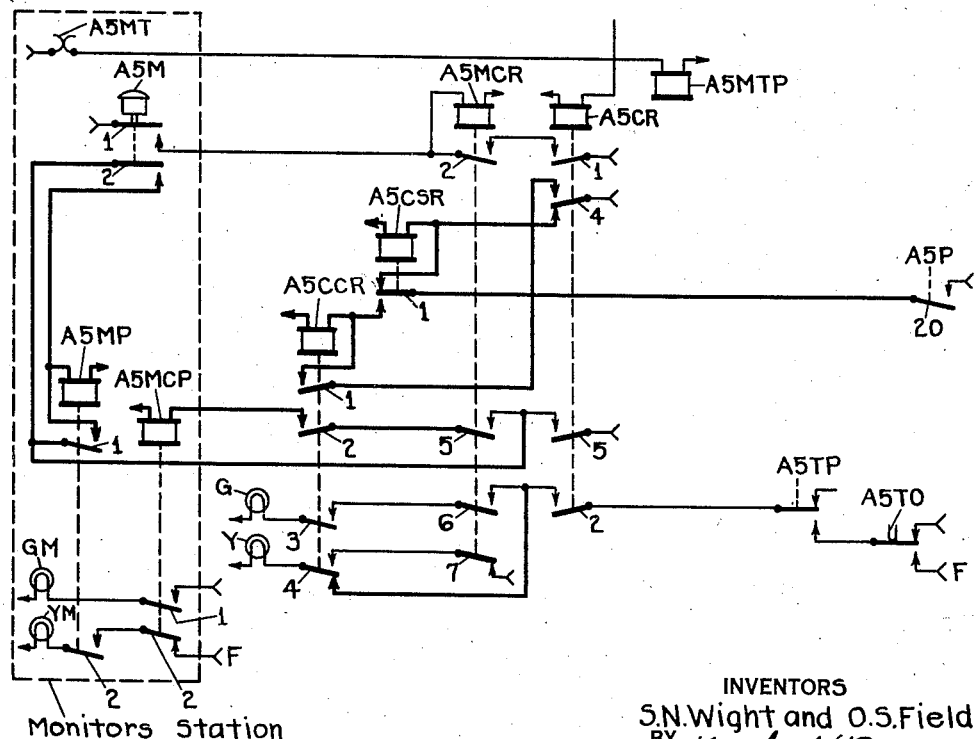
Fig. 13 shows a modified form of the invention in which the monitor is provided with two distinctive indicating lamps and in which the dispatcher must operate his push buttons of a route twice before this route is finally set up on his board.

*Modified dispatcher's and monitor's boards, Fig. 13.*—As heretofore pointed out in connection with Figs. 3 and 5 of the drawings, the dispatcher will depress a token identifying a particular plane and will simultaneously therewith depress in succession the push buttons at the various altitudes and stacks over which he proposes to set up a route. If the proposed route is available yellow lamps will be lighted successively under the various push buttons as they are depressed and this proposed route will then lock out other conflicting routes. The dispatcher will then inform the pilot of the plane in question as to the proposed route which has been tentatively set up for him defining its course from stack to stack and from altitude to altitude. The pilot of the plane will then repeat back these instructions and in response to this repeat-back instruction also heard by the monitor he, the monitor, will press his push buttons in succession as defined by the repeat-back instructions. If the route defined by the monitor corresponds in every detail to the proposed route set up by the dispatcher the green lamps on the dispatcher's board (and also the monitor's green lamps in the Fig. 12 construction) will be lighted and the corresponding yellow lamps will be extinguished. It is therefore seen that the dispatcher is required to depress the push buttons defining a route of the Figs. 5 and 12 structure only once. It may, however, be desirable to have him depress each of these push buttons a second time in response to the pilot's repeat-back of the original instructions.

In Fig. 13 of the drawings apparatus has been provided to require the dispatcher to so depress his push buttons a second time as acknowledgment of the repeat-back instructions and to require the monitor to depress corresponding push buttons once before the route is finally set up by the illumination of green lamps. Referring to Fig. 13 the lamp control repeater relay A5CCR, the push button release relay A5CSR, the composite lamp control repeater relay A5MCP, and the monitor's push button repeater relay A5MP and their control circuits have been added to the structure illustrated in Figs. 3B and 5B to constitute Fig. 13. Referring to Fig. 13 it will be seen that the push button release relay A5CSR is normally energized through the back contact 4 of the dispatcher's lamp control relay A5CR and is therefore normally held energized. This is done in order to hold the back contact 1 of this relay A5CSR open so that the dispatcher's lamp control repeater relay A5CCR cannot repeat the picking up of the dispatcher's lamp control relay A5CR during the first depression of the dispatcher's push button A5. In other words, the first depression of the dispatcher's push button A5, resulting in energization of the push button relay A5P, causes the push button release relay A5CSR to be held energized through a stick circuit including the front contact 1 of the push button release relay A5CSR and the front contact 20 of the push button repeater relay A5P. The pickup circuit for this push button release relay A5CSR, on the other hand, is broken at the back contact 4 of the dispatcher's lamp control relay A5CR as soon as this relay A5CR is picked up. This lamp control relay A5CR is picked up as soon as a route has been tentatively set up to this 5000 foot altitude of stack A. The closure of front contact 2 of the lamp control relay A5CR will, of course, cause lighting of the dispatcher's yellow lamp Y.

If now the monitor depresses his push button A5M he will close a pick-up circuit for the monitor's lamp control relay A5MCR at the contact 1 of his push button A5M and will close a pick-up circuit for the monitor's push button repeater relay A5MP at the front contact 2 of his push button A5M, it being assumed that the lamp control relay A5CR is now assuming its energized position, resulting in the energization of these relays A5MCR and A5MP. The picking up of the monitor's lamp control relay A5MCR will at its front contact 6 merely condition the circuits for the dispatcher's green lamp G and at its front contact 5 will condition an energizing circuit for the composite lamp control repeater relay A5MCP, whereas energization of the relay A5MP will through its front contact 2 cause illumination of the monitor's yellow lamp YM in the monitor's office. These relays A5MP and A5MCR upon picking up will stick up through their stick contacts 1 and 2 respectively. The lighting of this yellow lamp YM by flashing energy, through front contact 2 of relay A5MP and back contact 2 of relay A5MCP, informs the monitor that he has correctly interpreted the pilot's answer-back instructions but that the dispatcher has not yet operated his push buttons a second time to check the monitor's interpretations as manifested by the monitor's manipulations of his push buttons. Let us now assume that the dispatcher in response to the pilot's answer-back instructions operates his push buttons a second time and that these push button operations define the proposed route. When the dispatcher released his push button A5 after its initial depression he causes deenergization of the push button release relay A5CSR by the opening of the front contact 20 of the dispatcher's push button repeater relay A5P, the pick-up circuit for the push button release relay A5CSR being then open at back contact 4 of the lamp control relay A5CR. Consequently, depression of the push button A5 for the second time causes a pick-up circuit for the lamp control repeater relay A5CCR including the front contact 20 of the dispatcher's push button repeater relay A5P and the back contact 1 of the push button release relay A5CSR to be closed. This causes the dispatcher's lamp control repeater relay A5CCR to be picked up and then stuck up through a stick circuit including its own stick contact 1 and the front contact 4 of the lamp control relay A5CR. With this dispatcher's lamp control repeater relay A5CCR now energized an energizing circuit for the lamp Y and for the composite lamp control repeater relay A5MCP is closed. The picking up of this relay A5MCP will by the opening of its contact 2 cause a yellow lamp YM on the monitor's board to be extinguished and will by the closing of its front contact 1 cause the green lamp GM on the monitor's board to be lighted. Also, the picking up of the lamp control repeater relay A5CCR causes the yellow lamp Y on the dispatcher's board to be extinguished at back contact 4 and causes the green lamp G on the dispatcher's board to be lighted through front contact 3 of this relay A5CCR. The dispatcher and the monitor will thus both be informed that they have both properly interpreted the answer-back instructions repeated by the pilot and that the pilot has the proper instructions to accept the proposed route as soon as the dispatcher gives him the final approval.

The dispatcher will now advise the pilot that he may proceed over the proposed route formerly tentatively assigned to him and that he is now authorized officially to fly over this route. If the dispatcher should operate his push button the second time before the monitor operates his push button the yellow lamp Y would be flashed through a circuit including back contact 7 of relay A5HCR and front contact 4 of relay A5CCR. In Fig. 13, like in Fig. 12, the added circuit wires have been shown in heavy lines. In this connection it may be pointed out that front contact 4 of relay A5CCR and the back contact 7 of relay A5MCR of Fig. 13 correspond respectively to the front contact 2 of relay A5CR and back contact 3 of relay A5MCR of Fig. 5B; likewise, front contacts 3 and 6 of relays A5CCR and A5MCR respectively of Fig. 13 correspond to contacts 2 and 3 of relays A5CR and A5MCR respectively of Fig. 5B.

Figure 15:
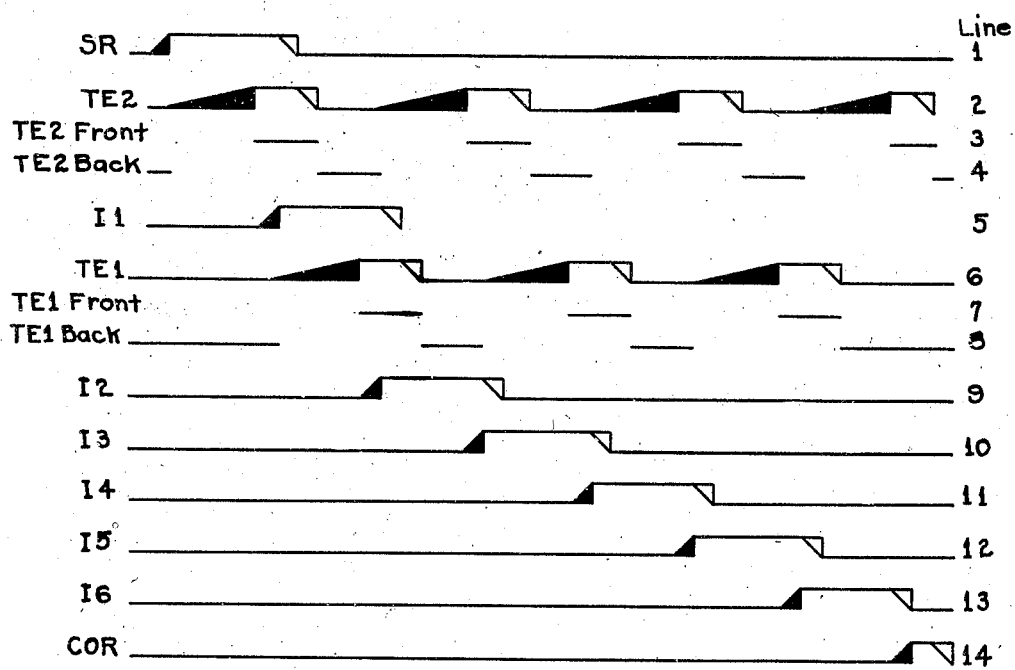
Fig. 15 illustrates a timing chart for the timing relay bank illustrated in Fig. 14.

*Timing lights, Figs. 14 and 15.*—In order to facilitate the landing of a plurality of planes in fairly close succession and onto the same runway of an airport it is desirable to employ timing lights to show the approximate location of a descending plane or planes. Although a plurality of these series of timing lights or plane progress lights may be employed, one for each runway, and although a plurality of stacks may have planes discharged therefrom into the same airport only one such runway and one such series of timing lamps have been illustrated in Fig. 14 of the drawings. These timing or plane progress lights are controlled by a series of steppings relays I1–I6 controlled by time measuring means for timing relays which may be of any suitable construction such, for instance, as shown in the patent to O. S. Field, No. 2,199,335 or the patent to J. E. Willing, No. 1,902,793. These timing relays are each provided with a back contact 1 which is quick acting in both directions and a front contact 2 which is delayed upon energization of the timing relay but is not delayed upon deenergization of the timing relay. The contact 1 may correspond to a back contact of the relay M of the Willing patent and the contact 2 may correspond to a front contact of the relay L of this Willing patent. If the structure of the Field patent is used the contact 1 may be a contact closed when the relay device S1 (Fig. 4 of Field) assumes the actuated position and the contact 2 may be the contact 109—111 of this Field patent.

Referring to Figs. 2 and 14 it will be seen that the stack A has illustrated therein an imaginary 2000 foot altitude containing a token receptacle A2T and a push button A2. Referring now to Fig. 14 it will be seen that a plane which is authorized to leave the 2000 foot altitude of stack A in the direction of the airfield containing a runway RW may take two different courses toward that runway the first, namely route 95, of which extends directly ahead at the 2000 foot altitude for a considerable distance whereas the other route 96 drops down to the 1500 foot altitude immediately upon leaving the stack A. In this connection it may be pointed out that a plane, which is about to make a landing, must fly at the 1500 foot altitude when it passes the radio fix of stack B illustrated in Fig. 14. The reason for defining two courses, one above the other, in space over which a plane may travel from stack A to the runway RW is to provide adequate altitude separation between two planes following each other toward the runway. These courses of travel 95 and 96 enable and require the first of two successive planes to immediately descend to the 1500 foot altitude whereas the second of these succeeding planes is required to fly in the 2000 foot altitude until the pilot is given instructions to descend to make his landing on the runway RW. In other words, the dispatcher may instruct the pilot of the first one of two planes leaving the 2000 foot altitude of stack A and who is planning to land on the runway RW to immediately descend to the 1500 foot altitude and make a landing. When this plane has been reported below the overcast (cloud formation) or in clear view of the field or landed on the runway RW the dispatcher may instruct the pilot of the second plane to drop to the 1500 foot altitude before he reaches the radio fix of stack B and to then make his landing on the runway RW. The purpose of the timing lights I1 to I6 is to show the approximate location of a plane authorized to fly from the stack C toward the radio fix of stack B.

When the first plane leaves the stack A the dispatcher will insert the token, identifying this plane, into the token receptacle AB2T thereby causing deenergization of the token repeater relay AB2TP and the token repeater relay AB2TPP. This will cause successive illumination of lamps I1 to I6, inclusive. Upon the second plane reporting his departure from stack A, the first plane having vacated the 2000 foot altitude, the dispatcher will remove the token identifying the first plane from the token receptacle AB2T and insert it in the token receptacle AB1.5T, which will be followed by the insertion of the token identifying the second plane in the token receptacle AB2T. The lights I1 to I6, inclusive, will be successively illuminated in response to the insertion of the token identifying the first plane which will be followed by the successive illumination of the indicating lamps I1 to I6 in response to the insertion of the token identifying the second plane in the token receptacle AB2T. The second successive lighting of lamps I1–I6 may start before the first successive lighting of these lamps has been completed as will be the case if these planes follow each other in rather close succession.

When the first plane reports having been landed on the runway RW, or in clear view of the field, the dispatcher will immediately look at his lamps I1–I6 and if the second plane has not advanced too far, say has advanced to the point identified by lighted indicating lamp I5, the dispatcher may instruct the pilot of the second plane to immediately make his descent to the 1500 foot altitude for a landing procedure. If, however, the dispatcher finds that the second plane has already advanced to an extent identified by the illumination of the indicating lamp I⁶ when the first plane reports having descended below the overcast or landed on the runway RW, the pilot of the second plane would be unable to reduce his altitude to an extent to fly across the radio fix of stack B at the 1500 foot altitude, in which case the pilot of the second plane will be instructed by the dispatcher to return to his holding position in stack A at the 2000 foot altitude and to thereafter descend to the 1500 foot altitude and make a landing on the runway RW. In other words, the lamps I¹ to I⁶, inclusive, are employed to show simultaneously the approximate location of a plurality of planes flying from the stack A toward the radio fix of stack B illustrated in Fig. 14 of the drawings.

Let us now discuss the apparatus and circuits for successively lighting the timing lamps I¹ to I⁶ inclusive. Obviously, other forms of indicators instead of lamps may be used if desired.

Referring to Fig. 14 it will be observed that a stepping bank employing lamp controlling stepping relays I1 to I6, inclusive, having associated therewith a starting relay SR and a clear-out relay COR have been provided. This starting relay SR is controlled by the token repeater relays AB2TP and AB2TPP whereas the operation of the stepping relays I1-I6 is determined by the time measuring relays TE1 and TE2 above described, and is stopped by the clear-out relay COR. In order to get a better understanding of the time controlled relay bank illustrated in Fig. 14 attention is directed to the timing chart illustrated in Fig. 15 of the drawings.

Let us first assume that the dispatcher instructs the pilot of a first plane to leave the stack A at the 2000 foot altitude and make a landing on the runway RW. As soon as the pilot reports having left the stack A the dispatcher will insert the token identifying the plane under consideration in the token receptacle AB2T, thereby causing successive deenergizations of the token repeater relays AB2TP and AB2TPP. Since the token repeater relay AB2TPP is much slower dropping than is the token repeater relay AB2TP a momentary circuit will be closed through the front contact 1 of the token repeater relay AB2TPP and the back contact 2 of the token repeater relay AB2TP for the starting relay SR. This momentary closure of the pick-up circuit for the starting relay SR will, of course, cause this relay to pick up and then stick up through its front contact 3 in series with the back contact 6 of the timing relay I1 and through front contact of the cancelling push button CPB connected to the same terminal of the same source to which the pick-up circuit for this starting relay SR is connected. The picking up of this starting relay SR is indicated in the first line of the relay time chart illustrated in Fig. 15 of the drawings. The first and darkened triangle shown in this line 1 indicates the time of pick up of the starting relay SR; whereas, the second and outlined triangle indicates the time of drop away of this relay. Similar triangles of time of pick up and time of drop away have been shown for the other relays. As soon as the starting relay SR assumes its energized position it closes its front contact 2 to complete a pick-up circuit for the time measuring relay TE2. This time measuring relay TE2, as is also true of the time measuring relay TE1, has a back contact 1 which is quick acting in both directions, that is, is quick to open upon energization of the time measuring relay TE2 and is quick to close upon deenergization of this time measuring relay TE2, and is also provided with a front contact 2 which is delayed say, for example, 30 seconds in closing upon energization of the time measuring relay TE2 but is quick opening upon deenergization of this time measuring relay TE2. It is thus seen that a considerable amount of time will elapse before the front contact 2 of the time measuring relay TE2 is closed, and this delay in the closure of the front contact 2 is indicated by the long leg of the first black triangle illustrated in line 2 of Fig. 15 and is also indicated by the starting end of the first dash in line 3 of this timing chart, which dash indicates the time during which front contact 2 of the time measuring relay TE2 is closed. As soon as the front contact 2 of the time measuring relay TE2 is closed a pick-up circuit including this front contact 2 and also including the front contact 5 of the starting relay SR for the stepping or light control relay I1 is closed. This closure of a pick-up circuit for the relay I1 is indicated by the first black triangle in the fifth line in Fig. 15 of the drawings. As soon as this relay I1 assumes its energized position an energizing circuit for the lamp I¹ is closed at front contact 1 and an energizing circuit for the time measuring relay TE1 is closed at front contact 2 of this relay I1. The closure of this circuit for time measuring relay TE1 is indicated by the left-hand end of the first black triangle indicated in line 6 of Fig. 14 of the drawings. Another function which takes place when the indicating relay I1 is energized resides in the immediate opening of the back contact 1 of the time measuring relay TE1 controlled thereby and another function performed by the picking up of relay I1 resides in breaking of the stick circuit for the starting relay SR1 by opening of the back contact 6 of this relay I1. This dropping of the starting relay SR is indicated by the triangle shown in outline in line 1 of Fig. 15 of the drawings. The dropping of relay SR by the opening of its front contact 2 causes deenergization of the time measuring relay TE2 as indicated by the first outlined triangle shown in line 2 of Fig. 15. Dropping of time measuring relay TE2 closes a stick circuit through its back contact 1 for the stepping relay I1, so that this relay I1 will not drop when its other stick circuit, including its stick contact 4, is opened at front contact 2 of time measuring relay TE2. After an interval of delay the front contact 2 of timing relay TE1 will close to pick up the stepping relay I2 through the front contact 5 of the stepping relay I1. The picking up of stepping relay I2 through its front contact 2 picks up the time measuring relay TE2 which immediately opens its back contact 1 included in the stick circuit for the stepping relay I1 and including stick contact 3 of this relay I1, and dropping of the stepping relay I1 will by opening of its front contact 2 drop the time measuring relay TE1. In the same way as the stepping relay I1 is picked up after a period of delay following energization of the time measuring relay TE2 by the front contact 2 of this time measuring relay TE2 the stepping relays I3 and I5 are later picked up through this same front contact 2, whereas all even numbered stepping relays I2, I4 and I6 are picked up successively through the medium of front contact 2 of the time measuring relay TE1 after similar periods of delay. Also, the lamp controlling stepping relays I3 and I5 are successively dropped by the picking up of time measuring relay TE2 and the opening of its back contact 1, and without imposing such delay. In the same manner as the opening of such back control 1 of time measuring relay TE2 dropped the stepping relay I1 and I5, as above pointed out, the opening of back contact 1 of timing relay TE1 drops stepping relays I2 and I4 and I6. As is readily seen from Fig. 14 the stick circuit for stepping relay I6 includes the back contact 1 of the clear-out relay COR so that this stepping relay I6 is deenergized immediately upon the picking up of this relay COR. The picking up of this relay COR is delayed by the delayed closing of front contact 2 of time measuring relay TE2 in the same way as the picking up of stepping relays I1, I3 and I5 is delayed by the retarded closing of this same front contact 2.

Referring now to the timing chart shown in Fig. 15 and remembering that the front contacts 2 of time measuring relays TE1 and TE2 are delayed in their closing about thirty seconds from the time of energization of their windings and remembering that the back contacts 1 of these timing relays as well as all the contacts of the stepping relays open and close rather quickly, it will be understood that the horizontal dimensions of the triangles shown in the timing chart of Fig. 15 are not all plotted to the same scale. In fact the horizontal dimensions of all forty-five degree right-angle triangles should, if the same scale were used, be about one-thirtieth of that of the horizontal dimensions of the black triangles shown in lines 2 and 6 of Fig. 15 instead of the one-fourth shown in this Fig. 15 of the drawings. This exaggeration of the horizontal dimensions of the forty-five degree right-angle triangles shown in Fig. 15 must be kept in mind during the study of this timing chart.

It should be noted that the stepping relay bank shown in Fig. 14 is self-restoring in that each stepping relay is restored to its deenergized position by the picking up of the timing relay picked up in response to the picking up of the next stepping relay in the series and that the last stepping relay is dropped directly by the picking up of the clear-out relay COR. This construction enables a second series of lamp flashings to start before a preceding series of lamp flashings has been completed.

The dispatcher may also restore the stepping bank to normal at any point in its cycle of operation by depressing the cancel button CPB.

Referring again to Figs. 2 and 14 let us now assume that there is a first plane holding the altitude 2000 stack A and that there is a second plane holding at altitude 3000 stack A and that the tokens identifying these planes are located in token receptacles A2T and A3T respectively. Let us further assume that the dispatcher desires to have these planes land on the runway RW of the airfield in close succession and that he first ascertains whether it is safe to make up a landing for the first plane by depressing the push buttons A2 and B1.5. If it is safe for a plane to fly from altitude 2000 of stack A to altitude 1500 of stack B, that is, if the lock relay B1.5L is energized the depression of the dispatchers token accomplished by the depression of the push buttons A2 and B1.5 will result in the illumination of the yellow lamps under these push buttons. The dispatcher will now radiophone the pilot that a tentative route for him to land on the runway RW is available. In response to these instructions from the dispatcher to the pilot the pilot will repeat these instructions back to the dispatcher and incidentally will also repeat these instructions to the monitor. The monitor will in response to this information depress his push buttons A2M and B1.5M as a result of which the illuminated push buttons A2 and B1.5 in the dispatcher's office will be changed from yellow illumination to green illumination, all for reasons heretofore pointed out. The dispatcher will now radiophone the pilot that he may proceed to the airfield to make a landing over the proposed route tentatively assigned to him.

As soon as the pilot leaves the stack A he will so inform the dispatcher by radiophone, this also being heard by the monitor, in response to which the dispatcher and monitor will remove their tokens identifying the first plane and will insert them in the token receptacles AB2T and AB2MT (not shown) respectively. The insertion of the dispatcher's token in the token receptacle AB2T will, of course, cause the timing lamps $I^1$ to $I^6$ inclusive to be successively flashed to indicate the progress of the first plane toward the runway. This insertion of the tokens in the token receptacles AB2T and AB2MT also causes the apparatus for altitude 2000 of stack A to be returned to its normal condition and the lamp under the push button A2 in the dispatcher's office to be extinguished. As soon as the pilot of the first plane reports that he has made a descent to the 1500 foot altitude, which is heard by both the dispatcher and the monitor, the dispatcher and monitor will move their tokens from the receptacles AB2T and AB2MT to the token receptacles AB1.5T and AB1.5MT respectively. The movement of the tokens to the 1500 foot altitude between stacks A and B will result in the dropping of the route relay A2B1.5R and in reenergization of the lock relay B2L by reason of the partial release heretofore discussed. The dispatcher will now ascertain whether a proposed route is available for the second plane from the 3000 foot altitude of stack A to the 2000 foot altitude of this stack and then to the 2000 foot altitude of stack B and in order to get this information will depress his token in the token receptacle A3T and will then depress the push buttons A3, A2 and B2 in that order. If no other plane has attempted to use an air-route which is in conflict with the route just mentioned the route relays A3A2R and A2B2R will pick up and the lamps within the push buttons A2 and B2 will be illuminated yellow thereby informing the dispatcher that the proposed route from altitude 3000 stack A to altitude 2000 stack A and then to altitude 2000 stack B is available and has been tentatively set up and has locked out all conflicting routes, this being manifested to the dispatcher by the illumination of yellow lamps in the push buttons A2 and B2. The dispatcher will now inform the pilot of the second plane that there is a proposed route available from altitude 3000 stack A to altitude 2000 stack A to altitude 2000 stack B, in response to which the pilot will repeat back this information to the dispatcher which is also heard by the monitor. The monitor upon hearing this information will depress his push buttons A3M, A2M and B2M as a result of which the lamps under the push buttons A3, A2 and B2 on the dispatcher's board will change from yellow illumination to green illumination. The dispatcher will now inform the pilot that he may make his descent from altitude 3000 stack A to altitude 2000 stack A and may then proceed at altitude 2000 to stack B. As soon as the pilot of the second plane reports having left stack A at the 2000 foot altitude, this being heard by both the dispatcher and monitor, the dispatcher and monitor will remove their tokens identifying the second plane from token receptacles A3T and A3MT respectively and will insert them in token receptacles AB2T and AB2MT respectively. This will result in the cancelling of all apparatus to the rear, that is, will result in extinguishment of the lamps under the bull's-eyes of push buttons A3 and A2 in the dispatcher's office. It will also result in the reinitiation of the timing relay bank and will cause a new successive illumination of the timing lamps $I^1$ to $I^6$, inclusive, even though the first series of illumination of these lamps may not have yet been completed.

As soon as the pilot of the first plane has descended below the overcast, that is, has descended within vision of the airfield, he will report this to the dispatcher which information will be heard by the monitor also, in response to which information the dispatcher and monitor will remove their tokens identifying the first plane from the token receptacles AB1.5T and AB1.5MT respectively, and will insert them in the token receptacles B1.5T and B1.5MT respectively as a result of which the green lamp in the dispatcher's push button B1.5 is extinguished due to the deenergization of the route relay A2B1.5R but will not result in the reenergization of the lock relay B1.5L because this lock relay will be held deenergized by reason of open front contacts 4 and 5 of the token repeater relays B1.5TP and B1.5MTP heretofore described. Since this first airplane is now within vision of the runway the dispatcher and monitor will immediately withdraw their respective tokens from the token receptacles B1.5T and B1.5MT respectively thereby allowing reenergization of the lock relay B1.5L. The dispatcher will now depress the push button B1.5 in order for the second plane to make its reduction in altitude from the 2000 foot altitude to the 1500 foot altitude on its course from stack A to stack B. This will, of course, assuming lock relay B1.5L to be energized, result in the illumination of the yellow lamp Y within the push button B1.5. The dispatcher will now look at the timing laps $I^1$ to $I^6$ inclusive and if the second plane has not advanced to a point as defined by the illumination of the indicating lamp $I^6$ the dispatcher will inform the pilot that a proposed route allowing him to descend to the 1500 foot altitude is available which information will be repeated back by the pilot and in response to which the monitor will depress his push button B1.5M. The depression of the monitor's push button will, of course, result in the change, from yellow to green, in illumination emitted by the dispatcher's push button B1.5 informing the dispatcher that the pilot has properly heard and interpreted his instructions. In response to this the dispatcher will advise the pilot of the second plane that he may now descend to the 1500 foot altitude through stack B descending thereafter to the runway RW of the flying field. Since it is assumed that the second plane has ample room to make its descent without making a round on a holding loop, such as shown in Fig. 11, he will descend over the route 95 shown in Fig. 14 of the drawings and so as to pass through the stack B at approximately a 1500 foot altitude after which he will land his plane on the runway RW.

As soon as this second plane has reported to the dispatcher that he is below the overcast, this also being heard by the monitor, the dispatcher and monitor will move their respective tokens identifying the second plane from the token receptacles A3T and A3MT and will insert them in token receptacles B1.5T and B1.5MT. This will, of course, result in extinguishment of the lamps under the bull's-eyes of push buttons A3, A2, B2 and B1.5 on the dispatcher's board and will result in the restoration of all of the apparatus for stack altitudes A-3000, A-2000 and B-2000 to normal but the lock relay B1.5L of the 1500 foot altitude of stack B will remain deenergized. This lock relay will, of course, be free to pick up as soon as the tokens identifying the second plane are removed from the token receptacles B1.5T and B1.5MT respectively. In this connection it may be pointed out that if desired the front contacts 4 and 5 of the token repeating relays B1.5MTP and B1.5TP may be omitted from the energizing circuit of lock relay B1.5L, so that this lock relay will be free to pick up as soon as tokens of the dispatcher and monitor are inserted in the token receptacles B1.5T and B1.5MT. In the event that the second plane has consumed enough time to illuminate the timing lamp $I^5$ the pilot of this plane will either on his own accord or by instructions by the pilot have started making a holding loop route at altitude 2000 between stacks A and B and in this case the pilot of the second plane may also follow the route 96 in Fig. 14 of the drawings instead of following the route 95 as would be the case if no holding procedure is required.

*Spiral route.*—In some cases where the various stacks are located rather closely together it may be desirable to lower a plane from an extremely high altitude to a much lower altitude by spiraling downwardly from stack to stack instead of spiraling down adjacent a single stack. To bring out this feature of applicant's invention let us assume that an airplane is located at the 6000 foot altitude of stack A and is to descend to the 3000 foot altitude of this same stack A in order to enter stack B at the same or a lower altitude. In order to make this descent the dispatcher may depress the push buttons F5, G4 and A3 and thereby set up a route comprising one spiral turn through stacks F, G and A by making a thousand foot descent in each travel from one stack to an adjacent stack. Without going into a detailed discussion of the operation of the various relays it is believed clear from the discussion hereinbefore given that such a route from altitude 6000 stack A through altitude 5000 of stack F through altitude 4000 of stack G and through altitude 3000 of stack A may be set up if there are no other conflicting routes. It is also readily understood that such a spiral route might consist of many spiral turns through these same stacks in succession.

It should be understood that if there are stacks where no holding is to be carried out so that these stacks constitute mere junction points having radio fixes, the token receptacles and their associated apparatus may be omitted from these stacks.

The applicants have thus described one complete system embodying their invention together with numerous modifications of certain portions of such system and it is desired to be understood that the particular arrangement of circuits and devices to exemplify an embodiment of the present invention has merely been resorted to for the purpose of disclosing the nature of the invention, its functions, and the manner in which the invention may be applied in practising the same and it should be understood that various changes, modifications and additions to the disclosure specifically illustrated may be made in practising the invention without departing from the spirit and scope of the invention except as demanded by the scope of the appended claims.

What we claim as new is:

1. In an airplane dispatching system, in combination, a plane location occupied by an airplane, a dispatcher location and a monitor location spaced therefrom and including a dispatcher's office and a monitor's office isolated from each other both visually and audibly, a route indicating panel in said dispatcher's office and in said monitor's office including devices manually operable to establish a proposed route and to vertify such proposed route into an actual route respectively, means for communicating between the dispatcher's office and the pilot of said airplane in both directions and between the monitor's office and said airplane only in a direction from such airplane toward such monitor's office, and means on the dispatcher's panel responsive only to contemporaneous identical manifestations of a proposed route by operation of said manually operable devices on both panels to distinctively indicate the actual route on the dispatcher's panel.

2. In an airplane dispatching system, in combination with a plane location occupied by an airplane, of a dispatcher and monitor location spaced therefrom and including a dispatcher's office and a monitor's office isolated from each other both visually and audibly, a route indicating panel in said dispatcher's office and in said monitor's office including devices manually operable to establish a proposed route and to verify such proposed route into an actual route respectively, means for communicating between the dispatcher's office and the pilot of said airplane in both directions and between the monitor's office and said pilot only in a direction from such pilot toward such monitor's office, and means on the dispatcher's panel responsive only to contemporaneous identical manifestations of a proposed route by operation of said manually operable devices on both panels to distinctively indicate the proposed route on the monitor's panel.

3. In an airplane dispatching system, in combination with a plane location occupied by an airplane, of a dispatcher and monitor location spaced therefrom and including a dispatcher's office and a monitor's office isolated from each other both visually and audibly, a route indicating panel in said dispatcher's office and in said monitor's office including devices manually operable to establish a proposed route and to verify such proposed route into an actual route respectively, means for communicating between the dispatcher's office and the pilot of said airplane in both directions and between the monitor's office and said pilot only in a direction from such pilot toward such monitor's office, and means on the dispatcher's panel responsive only to contemporaneous identical manifestations of a proposed route by operation of said manually operable devices on both panels to distinctively indicate the actual route on both the dispatcher's route indicating panel and the monitor's route indicating panel.

4. In an airplane dispatching system, in combination with a plane location occupied by an airplane, of a dispatcher and monitor location spaced therefrom and including a dispatcher's office and a monitor's office isolated from each other both visually and audibly, a route indicating panel in said dispatcher's office provided with manually operable devices to establish a proposed route on said dispatcher's panel, a route indicating panel in said monitor's office provided with manually operable devices to verify said route by indicating a final route, and route indicating devices on said dispatcher's panel which indicate a route in one manner in response to operation of said manually operable devices on said dispatcher's panel alone and which indicate the same route in a different manner if the operation of said manually operable devices on said dispatcher's panel is supplemented by operation of corresponding manually operable devices on said monitor's panel.

5. In an airplane dispatching system the combination with a dispatcher's board and a monitor's board isolated visually and audibly from each other and each illustrating in miniature a plurality of conflicting air routes by manually operable devices located at corresponding successive points for these routes on each of said boards, communicating means for allowing communication in both directions between the dispatcher and the pilot and allowing the monitor to hear the communication from the pilot to the dispatcher only, an indicating lamp on the dispatcher's board for and associated with each of said manually operable devices on said dispatcher's board, and circuit means for lighting the lamps to define a particular route only if the manually operable devices on the dispatcher's board defining said particular route have been operated and the manually operable devices on the monitor's board defining the same route have been operated by the monitor as in response to information heard by the monitor and transmitted from the pilot of that plane to the dispatcher.

6. In an airplane dispatching system the combination with a dispatcher's board and a monitor's board isolated visually and audibly from each other and each illustrating in miniature a plurality of conficting air routes by manually operable devices located at corresponding successive points for these routes on each of said boards, communicating means for allowing communication in both directions between the dispatcher and the pilot and allowing the monitor to hear the communication from the pilot to the dispatcher only, an indicating lamp on the dispatcher's board for and associated with each of said manually operable devices on said dispatcher's board, and circuit means for lighting the lamps to define a particular proposed route only if the manually operable devices on the dispatcher's board defining that particular route have been operated and to define the same particular but final route only if the manually operable devices on the monitor's board defining the same route have been operated by the monitor as in response to information heard by the monitor and transmitted from the pilot of that plane to the dispatcher.

7. In an airplane dispatching system the combination with a dispatcher's board and a monitor's board isolated visually and audibly from each other and each illustrating in miniature a plurality of conflicting air routes by manually operable devices located at corresponding successive points for these routes on each of said boards, communicating means for allowing communication in both directions between the dispatcher and the pilot of a plane and allowing the monitor to hear the communication from the pilot to the dispatcher, an indicating lamp on the dispatcher's board for and associated with each of said manually operable devices on said dispatcher's board, circuit means for lighting the lamps to define a particular proposed route only if the manually operable devices on the dispatcher's board defining such particular route have been operated and to distinctively indicate said particular route only if the manually operable devices on the monitor's board defining the same route have been operated by the monitor as in response to information heard by the monitor and transmitted from the pilot of that plane to the dispatcher, and means for interlocking said circuit means to prevent a route conflicting with a route already set up from being set up.

8. In combination with an airplane stack having a plurality of airplane routes entering said stack, a route relay means for each route, a single lock relay for said stack having a front contact in the energizing circuit of each of said route relay means, a circuit for said lock relay including a back contact of each of said route relay means in series, said lock relay being slow dropping to an extent that a particular route relay means may be operated to an energized position through a front contact of said lock relay before the route relay means by the operating of a back contact thereof causes said lock relay to assume a deenergized position, route indicating means controlled by said route relay means, and a manually controlled contact in the energizing circuit of each of said route relays.

9. In combination with an airplane stack having a plurality of routes entering said stack, a route relay means for each route, a single lock relay for said stack having a front contact in the energizing circuit of each of said route relay means, a circuit for said lock relay including a back contact of each of said route relay means in series, said lock relay being slow dropping to an extent that a particular route relay means may be operated to an energized position through a front contact of said lock relay before the route relay means by the opening of a back contact thereof causes said lock relay to assume a deenergized position, a route indicating means controlled by each of said route relays means, a plurality of routes leaving said airplane stack each having a route relay means included in an energizing circuit connected to a common bus, and back contacts on each route relay means of each leaving route for disconnecting the energizing circuits of all other route relays means of such leaving routes from such bus when a back contact of a particular route relay means of such leaving routes is open due to the associated route relay means assuming its energized position.

10. In combination with an airplane stack having a plurality of routes entering and leaving said stack, a route relay means for each entering route, a single lock relay for said stack having a front contact in the energizing circuit of each of said route relay means, a circuit for said lock relay including a back contact of each of said route relay means in series, said lock relay being slow dropping to an extent that a particular route relay means may be operated to an energized position through a front contact of said lock relay before the route relay means by the opening of a back contact thereof causes said lock relay to assume a deenergized position, route indicating means controlled by each of said route relay means, a bus for said stack, holding means rendered active when one of said entering route relay means is energized for energizing said bus, a plurality of routes leaving said airplane stack each having a route relay means included in an energizing circuit connected to said common bus, back contacts on each route relay means of each leaving route for disconnecting the energizing circuits of other route relay means of leaving routes from such bus when such back contacts of a particular route relay means is opened due to the associated route relay means assuming its energized position, and a front contact on said particular route relay means for holding said holding means active.

11. In combination, a plurality of adjacent airplane stacks each having a plurality of altitudes, route wires for routes extending from each altitude of each stack to the same altitude and adjacent altitudes of each adjacent stack for each direction of airplane travel, a route relay included in each route wire at the exit end thereof, a lock relay for each stack altitude having a front contact in each route wire having a route relay at that stack altitude, a circuit for each lock relay having in series therein back contacts of all route relays located at that stack, a main bus at each stack-altitude, a stick relay for each stack-altitude for connecting the main bus of an adjacent stack-altitude in the rear to the main bus of said stack-altitude when a route relay at such stack-altitude is picked up by current derived from the main bus of such stack-altitude in the rear, and a stick circuit for said stick relay including a front contact of a route relay at an adjacent stack in advance.

12. In combination, a plurality of adjacent airplane stacks each having a plurality of altitudes; route wires for routes extending from each altitude of each stack to the same altitude and adjacent altitudes of each adjacent stack for each direction of airplane travel; a route relay included in each route wire at the exit end thereof; a lock relay for each stack altitude having a front contact in each route wire having a route relay at that stack-altitude, a circuit for each lock relay having in series therein back contacts of all route relays located at that stack and back contacts of route relays included in route wires extending from that altitude of adjacent stacks to adjacent altitudes of that stack; a main bus at each stack-altitude; a stick relay for each stack-altitude for connecting the main bus of that stack-altitude to the bus of an adjacent stack-altitude when a route relay at such stack-altitude is picked up by current derived from said main bus of said adjacent stack-altitude; and a stick circuit for such stick relay including a front contact of a route relay at another adjacent stack-altitude.

13. In combination, a plurality of adjacent airplane stacks each having a plurality of altitudes; route wires for routes extending from each altitude of each stack to the same altitude and adjacent altitudes of each adjacent stack for each direction of airplane travel; a route relay included in each route wire at the exit end thereof; a lock relay for each stack-altitude having a front contact in each route wire having a route relay at that stack-altitude, a circuit for each lock relay having in series therein back contacts of all route relays located at that stack; back contacts of route relays included in route wires extending from that altitude of adjacent stacks to adjacent altitudes of that stack and back contacts of route relays included in route wires extending from the adjacent altitudes of that stack to that altitude of adjacent stacks; a main bus at each stack-altitude; a stick relay for each stack-altitude for connecting the main bus of that stack-altitude to the bus of an adjacent stack-altitude when a route relay at such stack-altitude is picked up by current derived from said main bus of said adjacent stack-altitude; and a stick circuit for such stick relay including a front contact of a route relay at another adjacent stack-altitude.

14. In combination, a plurality of adjacent airplane stacks each having a plurality of altitudes, route wires extending from each altitude of each stack to the same altitude and adjacent altitudes of each adjacent stack for each direction of airplane travel, a route relay included in each route wire at the exit end thereof, a lock relay for each stack-altitude having a front contact in each route wire having a route relay at that stack-altitude, a circuit for each lock relay having in series therein back contacts of all route relays located at that stack, and back contacts on each of the route relays included in route wires extending from such stack-altitude for opening all of said route wires extending from such stack-altitude except the particular route wire in which such route relay is included, said lock relays being slow dropping to an extent to allow a route relay to be picked up through a front contact of such lock relay before the picking up of such route relay causes dropping of such lock relay.

15. In combination, a plurality of adjacent airplane stacks each having a plurality of altitudes, route wires extending from each altitude of each stack to the same altitude and adjacent altitudes of each adjacent stack for each direction of airplane travel, a route relay included in each route wire at the exit end thereof, a lock relay for each stack-altitude having a front contact in each route wire having a route relay at that stack-altitude, a circuit for each lock relay having in series therein back contacts of all route relays located at that stack and back contacts of route relays included in route wires extending from the altitude of that stack of adjacent stacks to the adjacent altitudes of that stack and back contacts on each of the route relays included in route wires extending from such stack-altitude for opening all of said route wires extending from such stack-altitude except the particular route wire in which such route relay is included, said lock relays being slow dropping to an extent to allow a route relay to be picked up through a front contact of such lock relay before the picking up of such route relay causes dropping of such lock relay.

16. In combination, a plurality of adjacent airplane stacks each having a plurality of altitudes, route wires extending from each altitude of each stack to the same altitude and adjacent altitudes of each adjacent stack for each direction of airplane travel, a route relay included in each route wire at the exit end thereof, a lock relay for each stack-altitude having a front contact in each route wire having a route relay at that stack-altitude, a circuit for each lock relay having in series therein back contacts of all route relays located at that stack and back contacts of route relays included in route wires extending from the altitude of that stack of adjacent stacks to the adjacent altitudes of that stack and back contacts of route relays included in route wires extending from the adjacent altitudes of that stack to that altitude of adjacent stacks, and back contacts on each of the route relays included in route wires extending from such stack-altitude for opening all of said route wires extending from such stack-altitude except the particular route wire in which such route relay is included, said lock relays being slow dropping to an extent to allow a route relay to be picked up through a front contact of such lock relay before the picking up of such route relay causes dropping of such lock relay.

17. In combination, a plurality of adjacent airplane stacks each having a plurality of altitudes, route wires extending from each altitude of each stack to the same altitude and adjacent altitudes of each adjacent stack for each direction of airplane travel, a route relay included in each route wire at the exit end thereof, a lock relay for each stack-altitude having a front contact in each route wire having a route relay at that stack-altitude, a circuit for each lock relay having in series therein back contacts of all route relays located at that stack, and a manually controlled contact in the energizing circuit of each route relay, said lock relays being sufficiently slow dropping to allow the picking up of a route relay through a front contact of such lock relay in spite of the opening of the energizing circuit of such lock relays by the opening of the back contact of such route relay in the energizing circuit of such lock relay.

18. In combination, a plurality of adjacent airplane stacks each having a plurality of altitudes, route wires extending from each altitude of each stack to the same altitude and adjacent altitudes of each adjacent stack for each direction of airplane travel, a route relay included in each route wire at the exit end thereof, a lock relay for each stack-altitude having a front contact in each route wire having a route relay at that stack-altitude and in each route wire extending from the same altitude of an adjacent stack to the adjacent altitude of the same stack a circuit for each lock relay having in series therein back contacts of all route relays located at that stack and also back contacts of route relays at adjacent altitudes of the same stack in route wires for routes extending to that altitude of adjacent stacks, and a manually controlled contact in the energizing circuit of each route relay, said lock relays being sufficiently slow dropping to allow the picking up of a route relay through a front contact of such lock relay in spite of the opening of the energizing circuit of such lock relays by the opening of the back contact of such route relay in the energizing circuit of such lock relay.

19. In combination, a plurality of adjacent airplane stacks each having a plurality of altitudes, route wires extending from each altitude of each stack to the same altitude and adjacent altitudes of each adjacent stack for each direction of airplane travel, a route relay included in each route wire at the exit end thereof, a lock relay for each stack-altitude having a front contact in each route wire having a route relay at that stack-altitude in each route wire extending from the same altitude of an adjacent stack to the adjacent altitude of the same stack and extending from the adjacent altitude of the same stack to said same altitude of an adjacent stack, a circuit for each lock relay having in series therein back contacts of all route relays located at that stack also back contacts of route relays at adjacent altitudes of the same stack in route wires for routes extending to that altitude of adjacent stacks and also back contacts of route relays at that same altitude of adjacent stacks in route wires for routes extending to the adjacent altitudes of that same stack, and a manually controlled contact in the energizing circuit of each route relay, said lock relays being sufficiently slow dropping to allow the picking up of a route relay through a front contact of such lock relay in spite of the opening of the energizing circuit of such lock relays by the opening of the back contact of such route relay in the energizing circuit of such lock relay.

20. In combination, a plurality of adjacent airplane stacks each having a plurality of altitudes, route wires extending from each altitude of each stack to the same altitude and adjacent altitudes of each adjacent stack, a route relay included in each route wire at the exit end thereof, a lock relay for each stack-altitude having a front contact in each route wire having a route relay at that stack-altitude, a circuit for each lock relay having included in series therein back contacts of all route relays included in route wires extending to that altitude of that stack and also having included therein back contacts of route relays of all route wires extending to and from adjacent altitudes of the same stack from and to the same altitudes of adjacent stacks, and a manually controlled contact in the energizing circuit of each route, said lock relays being sufficiently slow dropping to allow the picking up of a route relay through a front contact of such lock relay in spite of the opening of the energizing circuit of such lock relays by the opening of the back contact of such route relay in the energizing circuit of such lock relay.

21. In an airplane dispatching system, the combination with a plurality of manually operable devices, a relay for each device, an indicator for each relay, a token receptacle for each manually operable device, means including a circuit net-work for causing successive energization and picking up of said relays for a particular route from device to device through said devices if a token is inserted in a first token receptacle and the manually operable devices at said first and then at successive token receptacles over said route are operated, and means including another circuit net-work for causing the said indicators associated with energized relays to give one distinctive indication when such token is depressed in its receptacle and to give another distinctive indication when such token is released.

22. In an airplane dispatching system, the combination with a plurality of manually operable devices, a relay for each device, an indicator for each relay, a token receptacle for each manually operable device, means including a circuit net-work for causing successive energization and picking up of said relays and their associated indicators becoming active for a particular route from device to device through said devices if a token is inserted in a first token receptacle and the manually operable devices at said first and then at successive token receptacles over said route are operated, and means including said means for causing said relays to be energized from a source point associated with said first token receptacle when said token is depressed and causing said relays to be energized from a source point associated with the last manually operable device to be operated in such route when said token is released.

23. In an airplane dispatching system, the combination with a lay-out including a plurality of airplane stacks each having a plurality of altitudes, route circuits extending from stack-altitude to stack-altitude of a miniature lay-out, a lock relay for each stack-altitude, and a front contact of said lock relay included in each route circuit extending to the stack-altitude where such lock relay is located.

24. In an airplane dispatching system, the combination with a plurality of indicators which if rendered active define a route, a push button for each indicator which if depressed may render such indicator active, a plurality of token receptacles one for each indicator, a token, means for rendering an indicator inactive in response to the insertion of a token in its associated receptacle, a plurality of contacts arranged in order, an indicating lamp for each contact included in series with such contact, and means for successively closing said contacts to successively energize said indicating lamps in response to the insertion of said token in one of said receptacles.

25. In an airplane dispatching system, the combination with a plurality of indicators which if rendered active define a route, a push button for each indicator which if depressed may render such indicator active, a plurality of token receptacles one between each indicator and the next indicator in advance, a token, means for rendering an indicator inactive in response to the insertion of a token in the token receptacle directly in advance thereof, a plurality of contacts arranged in order in advance of one of said token receptacles, an indicating lamp for each contact included in series with such contact, and means for successively closing said contacts to successively energize said indicating lamps in response to the insertion of said token in said one of said receptacles, whereby the insertion of a token in a receptacle causes the indicators to the rear thereof to be rendered inactive and causes a series of lamps in advance thereof to be successively lighted to symbolize the progress of an airplane.

26. In an airplane dispatching system; the combination with an airplane; of a dispatcher's and monitor's location spaced therefrom and occupied by a dispatcher and monitor respectively and so located that the dispatcher and monitor are isolated from communication with each other; a route indicating panel in said dispatcher's location and a route indicating panel in said monitor's location including devices manually operable to establish proposed routes; means for providing radio communication between the dispatcher and the pilot of said airplane and between the monitor and said pilot only in a direction from such pilot to such monitor and without allowing radio communication between said dispatcher and said monitor; and means including other manually operable devices on both panels responsive only to contemporaneous identical manifestations of the passing of an airplane over a particular point in a route, as reported by said pilot to said dispatcher and monitor, by the operation of said other manually operable devices by said dispatcher and monitor to cause cancellation of a portion of such route.

SEDGWICK N. WIGHT.
OSCAR S. FIELD.